(12) United States Patent
Poltorak

(10) Patent No.: US 12,501,225 B2
(45) Date of Patent: Dec. 16, 2025

(54) BLUETOOTH ENABLED INTERCOM WITH HEARING AID FUNCTIONALITY

(71) Applicant: Poltorak Technologies LLC, Suffern, NY (US)

(72) Inventor: Alexander I. Poltorak, Monsey, NY (US)

(73) Assignee: Poltorak Technologies LLC, Pomona, NY (US)

( * ) Notice: Subject to any disclaimer, the term of this patent is extended or adjusted under 35 U.S.C. 154(b) by 328 days.

(21) Appl. No.: 18/092,425

(22) Filed: Jan. 2, 2023

(65) Prior Publication Data

US 2023/0217195 A1 Jul. 6, 2023

Related U.S. Application Data

(60) Provisional application No. 63/295,928, filed on Jan. 2, 2022.

(51) Int. Cl.
*H04R 25/00* (2006.01)
*G06F 3/16* (2006.01)
*G10L 15/08* (2006.01)
*G10L 15/16* (2006.01)
*G10L 15/22* (2006.01)

(52) U.S. Cl.
CPC ........... *H04R 25/554* (2013.01); *G06F 3/167* (2013.01); *G10L 15/16* (2013.01); *G10L 15/22* (2013.01); *H04R 25/602* (2013.01); *H04R 25/606* (2013.01); *H04R 25/609* (2019.05); *G10L 2015/088* (2013.01); *G10L 2015/223* (2013.01); *H04R 2225/025* (2013.01); *H04R 2225/55* (2013.01); *H04R 2460/13* (2013.01)

(58) Field of Classification Search
CPC .. H04R 25/554; H04R 25/609; H04R 25/602; H04R 25/606; H04R 2225/025; H04R 2225/55; H04R 2460/13; G06F 3/167; G10L 15/16; G10L 2015/088; G10L 2015/223
USPC ........................................................ 381/315
See application file for complete search history.

(56) References Cited

U.S. PATENT DOCUMENTS

| | | | |
|---|---|---|---|
| 6,157,618 A | 12/2000 | Boss | |
| 6,405,027 B1 | 6/2002 | Bell | |
| 6,430,395 B2 | 8/2002 | Arazi | |
| 6,779,111 B1 | 8/2004 | Gehrmann | |
| 6,813,248 B1 | 11/2004 | Boss | |
| 6,859,533 B1 | 2/2005 | Wang | |

(Continued)

FOREIGN PATENT DOCUMENTS

| | | | |
|---|---|---|---|
| CN | 110708615 | 1/2020 | |
| EP | 2890156 A1 * | 7/2015 | ........... H04R 25/554 |

(Continued)

*Primary Examiner* — Sean H Nguyen
(74) *Attorney, Agent, or Firm* — Hoffberg & Associates; Steven M Hoffberg

(57) ABSTRACT

A hearing aid, comprising a microphone configured to produce a microphone output signal representing sounds transduced by the microphone; an earphone speaker configured to convert an equalized output electrical signal into acoustic waves; a Bluetooth wireless transceiver; and an automated processor configured to spot a plurality of different keywords; and selectively control a Bluetooth communication partner dependent on the spotted keyword.

20 Claims, 6 Drawing Sheets

(56) References Cited

U.S. PATENT DOCUMENTS

| | | |
|---|---|---|
| 6,894,609 B2 | 5/2005 | Menard |
| 6,937,726 B1 | 8/2005 | Wang |
| 7,181,017 B1 | 2/2007 | Nagel |
| 7,221,950 B2 | 5/2007 | Frank |
| 7,254,123 B2 | 8/2007 | Jukarainen |
| 7,286,665 B1 | 10/2007 | Wang |
| 7,356,688 B1 | 4/2008 | Wang |
| 7,379,427 B2 | 5/2008 | Boss |
| 7,403,838 B2 | 7/2008 | Deen |
| 7,411,956 B2 | 8/2008 | Irish |
| 7,412,519 B2 | 8/2008 | Wang |
| 7,499,717 B2 | 3/2009 | Arazi |
| 7,542,429 B2 | 6/2009 | Boss |
| 7,546,140 B2 | 6/2009 | Sinai |
| 7,706,750 B2 | 4/2010 | Dandekar |
| 7,809,008 B2 | 10/2010 | Irish |
| 7,817,634 B2 | 10/2010 | Coffman |
| 7,826,821 B2 | 11/2010 | Kim |
| 7,844,295 B1 | 11/2010 | Ngan |
| 7,869,591 B1 | 1/2011 | Nagel |
| 7,970,004 B2 | 6/2011 | Sayenko |
| 8,001,387 B2 | 8/2011 | Lee |
| 8,036,191 B2 | 10/2011 | Kröselberg |
| 8,046,007 B2 | 10/2011 | Frank |
| 8,103,215 B2 | 1/2012 | Rek |
| 8,165,628 B1 | 4/2012 | Sinai |
| 8,190,156 B2 | 5/2012 | Rantanen |
| 8,244,275 B2 | 8/2012 | Islam |
| 8,296,801 B2 | 10/2012 | Takagi |
| 8,307,395 B2 | 11/2012 | Issa |
| 8,319,145 B2 | 11/2012 | Rosario |
| 8,320,591 B1 | 11/2012 | Wurtz |
| 8,386,799 B2 | 2/2013 | Kim |
| 8,452,974 B2 | 5/2013 | Sakumoto |
| 8,457,022 B2 | 6/2013 | Lindh |
| 8,515,417 B2 | 8/2013 | Frank |
| 8,539,225 B2 | 9/2013 | Guo |
| 8,548,492 B2 | 10/2013 | Islam |
| 8,554,200 B2 | 10/2013 | Ribeiro |
| 8,554,255 B2 | 10/2013 | Skov |
| 8,566,247 B1 | 10/2013 | Nagel |
| 8,626,246 B2 | 1/2014 | Shostak |
| 8,626,736 B2 | 1/2014 | Ramer |
| 8,629,789 B2 | 1/2014 | Hoffberg |
| 8,630,291 B2 | 1/2014 | Shaffer |
| 8,630,965 B2 | 1/2014 | Savvides |
| 8,631,018 B2 | 1/2014 | Ramer |
| 8,631,217 B2 | 1/2014 | Basler |
| 8,638,363 B2 | 1/2014 | King |
| 8,638,667 B2 | 1/2014 | Shaffer |
| 8,650,606 B2 | 2/2014 | Nielsen |
| 8,652,038 B2 | 2/2014 | Tran |
| 8,653,979 B2 | 2/2014 | Obenchain |
| 8,655,891 B2 | 2/2014 | Ramer |
| 8,660,355 B2 | 2/2014 | Rodriguez |
| 8,660,891 B2 | 2/2014 | Ramer |
| 8,666,376 B2 | 3/2014 | Ramer |
| 8,667,084 B2 | 3/2014 | Vasseur |
| 8,671,273 B2 | 3/2014 | Roy-Chowdhury |
| 8,676,937 B2 | 3/2014 | Rapaport |
| 8,680,991 B2 | 3/2014 | Tran |
| 8,682,726 B2 | 3/2014 | Hoffberg |
| 8,684,900 B2 | 4/2014 | Tran |
| 8,684,922 B2 | 4/2014 | Tran |
| 8,688,040 B2 | 4/2014 | Jung |
| 8,688,088 B2 | 4/2014 | Ramer |
| 8,688,671 B2 | 4/2014 | Ramer |
| 8,699,333 B2 | 4/2014 | Vasseur |
| 8,699,368 B2 | 4/2014 | Hui |
| 8,708,903 B2 | 4/2014 | Tran |
| 8,711,440 B2 | 4/2014 | Hardy |
| 8,712,395 B2 | 4/2014 | Ramer |
| 8,713,418 B2 | 4/2014 | King |
| 8,718,055 B2 | 5/2014 | Vasseur |
| 8,718,617 B2 | 5/2014 | Ramer |
| 8,724,829 B2 | 5/2014 | Visser |
| 8,725,126 B2 | 5/2014 | Ramer |
| 8,727,978 B2 | 5/2014 | Tran |
| 8,730,828 B2 | 5/2014 | Doppler |
| 8,730,932 B2 | 5/2014 | Islam |
| 8,731,457 B2 | 5/2014 | Islam |
| 8,737,972 B2 | 5/2014 | Ramer |
| 8,737,986 B2 | 5/2014 | Rhoads |
| 8,738,944 B2 | 5/2014 | Addepalli |
| 8,743,768 B2 | 6/2014 | Vasseur |
| 8,747,313 B2 | 6/2014 | Tran |
| 8,747,336 B2 | 6/2014 | Tran |
| 8,755,776 B2 | 6/2014 | Ramer |
| 8,755,837 B2 | 6/2014 | Rhoads |
| 8,756,449 B2 | 6/2014 | Shaffer |
| 8,761,285 B2 | 6/2014 | Addepalli |
| 8,762,152 B2 | 6/2014 | Bennett |
| 8,763,750 B1 | 7/2014 | Berkman |
| 8,764,651 B2 | 7/2014 | Tran |
| 8,768,313 B2 | 7/2014 | Rodriguez |
| 8,768,319 B2 | 7/2014 | Ramer |
| 8,774,050 B2 | 7/2014 | Vasseur |
| 8,774,051 B2 | 7/2014 | Yamamoto |
| 8,774,777 B2 | 7/2014 | Ramer |
| 8,780,953 B2 | 7/2014 | Shaffer |
| 8,787,250 B2 | 7/2014 | Beser |
| 8,787,392 B2 | 7/2014 | Vasseur |
| 8,787,942 B2 | 7/2014 | Hannan |
| 8,788,802 B2 | 7/2014 | Gantman |
| 8,798,592 B2 | 8/2014 | Ramer |
| 8,798,594 B2 | 8/2014 | Ramer |
| 8,798,595 B2 | 8/2014 | Ramer |
| 8,799,510 B2 | 8/2014 | Vasseur |
| 8,800,010 B2 | 8/2014 | Hui |
| 8,805,110 B2 | 8/2014 | Rhoads |
| 8,805,339 B2 | 8/2014 | Ramer |
| 8,805,400 B2 | 8/2014 | Islam |
| 8,806,559 B2 | 8/2014 | Nielsen |
| 8,806,633 B2 | 8/2014 | Shaffer |
| 8,811,191 B2 | 8/2014 | Nielsen |
| 8,812,526 B2 | 8/2014 | Ramer |
| 8,817,665 B2 | 8/2014 | Thubert |
| 8,819,191 B2 | 8/2014 | Hui |
| 8,819,659 B2 | 8/2014 | Ramer |
| 8,824,471 B2 | 9/2014 | Hui |
| 8,826,337 B2 | 9/2014 | Issa |
| 8,830,946 B2 | 9/2014 | Hamiti |
| 8,831,365 B2 | 9/2014 | King |
| 8,832,100 B2 | 9/2014 | Ramer |
| 8,842,630 B2 | 9/2014 | Shaffer |
| 8,843,241 B2 | 9/2014 | Saberi |
| 8,843,395 B2 | 9/2014 | Ramer |
| 8,843,396 B2 | 9/2014 | Ramer |
| 8,849,259 B2 | 9/2014 | Rhoads |
| 8,850,017 B2 | 9/2014 | Ebrahimi |
| 8,855,372 B2 | 10/2014 | Rodriguez |
| 8,855,712 B2 | 10/2014 | Lord |
| 8,861,390 B2 | 10/2014 | Hui |
| 8,867,329 B2 | 10/2014 | Hui |
| 8,873,754 B2 | 10/2014 | Xu |
| 8,873,853 B2 | 10/2014 | Rodriguez |
| 8,874,477 B2 | 10/2014 | Hoffberg |
| 8,874,788 B2 | 10/2014 | Vasseur |
| 8,879,604 B2 | 11/2014 | Woo |
| 8,879,613 B1 | 11/2014 | Hui |
| 8,880,296 B2 | 11/2014 | Breed |
| 8,885,630 B2 | 11/2014 | Pun |
| 8,886,206 B2 | 11/2014 | Lord |
| 8,886,222 B1 | 11/2014 | Rodriguez |
| 8,891,534 B2 | 11/2014 | Vasseur |
| 8,891,588 B1 | 11/2014 | Hui |
| 8,902,815 B2 | 12/2014 | Shatzkamer |
| 8,904,181 B1 | 12/2014 | Felsher |
| 8,908,536 B2 | 12/2014 | Hui |
| 8,908,621 B2 | 12/2014 | Vasseur |
| 8,908,626 B2 | 12/2014 | Hui |
| 8,917,716 B2 | 12/2014 | Tran |
| 8,923,285 B2 | 12/2014 | Wentink |
| 8,923,422 B2 | 12/2014 | Hui |

(56) References Cited

U.S. PATENT DOCUMENTS

| | | |
|---|---|---|
| 8,929,375 B2 | 1/2015 | Iwao |
| 8,929,877 B2 | 1/2015 | Rhoads |
| 8,934,366 B2 | 1/2015 | Hui |
| 8,934,496 B2 | 1/2015 | Vasseur |
| 8,937,886 B2 | 1/2015 | Shaffer |
| 8,938,306 B2 | 1/2015 | Lebel |
| 8,942,197 B2 | 1/2015 | Rudnick |
| 8,942,301 B2 | 1/2015 | Hui |
| 8,948,084 B2 | 2/2015 | Beser |
| 8,948,229 B2 | 2/2015 | Hui |
| 8,948,596 B2 | 2/2015 | Nielsen |
| 8,949,918 B2 | 2/2015 | Totten |
| 8,949,959 B2 | 2/2015 | Mahamuni |
| 8,953,889 B1 | 2/2015 | Worley, III |
| 8,954,582 B2 | 2/2015 | Vasseur |
| 8,958,779 B2 | 2/2015 | Ramer |
| 8,964,762 B2 | 2/2015 | Hui |
| 8,968,195 B2 | 3/2015 | Tran |
| 8,971,188 B2 | 3/2015 | Vasseur |
| 8,971,318 B2 | 3/2015 | Yamada |
| 8,977,132 B2 | 3/2015 | Nielsen |
| 8,977,240 B2 | 3/2015 | Beckmann |
| 8,977,293 B2 | 3/2015 | Rodriguez |
| 8,984,277 B2 | 3/2015 | Dasgupta |
| 8,989,718 B2 | 3/2015 | Ramer |
| 8,990,235 B2 | 3/2015 | King |
| 8,994,591 B2 | 3/2015 | Dupray |
| 8,995,251 B2 | 3/2015 | Huang |
| 8,995,968 B2 | 3/2015 | Ramer |
| 8,995,973 B2 | 3/2015 | Ramer |
| 9,001,645 B2 | 4/2015 | Hellhake |
| 9,001,669 B2 | 4/2015 | Vasseur |
| 9,001,676 B2 | 4/2015 | Hui |
| 9,004,836 B2 | 4/2015 | Wells |
| 9,008,724 B2 | 4/2015 | Lord |
| 9,013,983 B2 | 4/2015 | Vasseur |
| 9,019,846 B2 | 4/2015 | Shaffer |
| 9,019,855 B2 | 4/2015 | Nielsen |
| 9,020,008 B2 | 4/2015 | Hui |
| 9,028,405 B2 | 5/2015 | Tran |
| 9,030,939 B2 | 5/2015 | Hui |
| 9,031,986 B2 | 5/2015 | Ramer |
| 9,036,509 B1 | 5/2015 | Addepalli |
| 9,037,896 B2 | 5/2015 | Addepalli |
| 9,053,708 B2 | 6/2015 | Koch |
| 9,058,406 B2 | 6/2015 | Soroca |
| 9,059,929 B2 | 6/2015 | Sudhaakar |
| 9,060,683 B2 | 6/2015 | Tran |
| 9,071,498 B2 | 6/2015 | Beser |
| 9,071,533 B2 | 6/2015 | Hui |
| 9,072,100 B2 | 6/2015 | Vasseur |
| 9,075,779 B2 | 7/2015 | King |
| 9,076,175 B2 | 7/2015 | Ramer |
| 9,076,448 B2 | 7/2015 | Bennett |
| 9,077,772 B2 | 7/2015 | Hui |
| 9,088,310 B2 | 7/2015 | Nielsen |
| 9,088,929 B2 | 7/2015 | Beser |
| 9,088,983 B2 | 7/2015 | Hui |
| 9,094,324 B2 | 7/2015 | Vasseur |
| 9,097,536 B2 | 8/2015 | Kelly |
| 9,100,305 B2 | 8/2015 | Hui |
| 9,104,915 B2 | 8/2015 | Conwell |
| 9,106,555 B2 | 8/2015 | Agarwal |
| 9,107,586 B2 | 8/2015 | Tran |
| 9,110,996 B2 | 8/2015 | Ramer |
| 9,112,983 B2 | 8/2015 | Lo |
| 9,113,076 B2 | 8/2015 | King |
| 9,118,771 B2 | 8/2015 | Rodriguez |
| 9,119,130 B2 | 8/2015 | Hui |
| 9,124,482 B2 | 9/2015 | Vasseur |
| 9,128,689 B2 | 9/2015 | Shaffer |
| 9,129,505 B2 | 9/2015 | Breed |
| 9,130,863 B2 | 9/2015 | Vasseur |
| 9,137,558 B2 | 9/2015 | Gibbon |
| 9,143,456 B2 | 9/2015 | Shaffer |
| 9,143,638 B2 | 9/2015 | King |
| 9,151,633 B2 | 10/2015 | Hoffberg |
| 9,154,370 B2 | 10/2015 | Hui |
| 9,154,407 B2 | 10/2015 | Hui |
| 9,160,760 B2 | 10/2015 | Vasseur |
| 9,166,845 B2 | 10/2015 | Hui |
| 9,167,427 B2 | 10/2015 | Messana |
| 9,172,613 B2 | 10/2015 | Hui |
| 9,172,636 B2 | 10/2015 | Agarwal |
| 9,172,917 B1 | 10/2015 | Fu |
| 9,173,058 B2 | 10/2015 | Islam |
| 9,176,832 B2 | 11/2015 | Vasseur |
| 9,178,772 B2 | 11/2015 | Dasgupta |
| 9,186,082 B2 | 11/2015 | Wingeier |
| 9,190,063 B2 | 11/2015 | Bennett |
| 9,195,993 B2 | 11/2015 | Ramer |
| 9,197,380 B2 | 11/2015 | Shetty |
| 9,197,736 B2 | 11/2015 | Davis |
| 9,198,203 B2 | 11/2015 | Shaffer |
| 9,201,979 B2 | 12/2015 | Ramer |
| 9,204,038 B2 | 12/2015 | Lord |
| 9,204,796 B2 | 12/2015 | Tran |
| 9,208,384 B2 | 12/2015 | Conwell |
| 9,208,566 B2 | 12/2015 | Chen |
| 9,210,045 B2 | 12/2015 | Shaffer |
| 9,215,583 B2 | 12/2015 | Shostak |
| 9,215,980 B2 | 12/2015 | Tran |
| 9,218,216 B2 | 12/2015 | Vasseur |
| 9,219,682 B2 | 12/2015 | Vasseur |
| 9,223,878 B2 | 12/2015 | Ramer |
| 9,224,096 B2 | 12/2015 | Oppenheimer |
| 9,225,589 B2 | 12/2015 | Hui |
| 9,225,616 B2 | 12/2015 | Vasseur |
| 9,231,757 B2 | 1/2016 | Nyang |
| 9,231,965 B1 | 1/2016 | Vasseur |
| 9,232,389 B2 | 1/2016 | Shukla |
| 9,232,458 B2 | 1/2016 | Vasseur |
| 9,234,744 B2 | 1/2016 | Rhoads |
| 9,236,904 B2 | 1/2016 | Hui |
| 9,240,913 B2 | 1/2016 | Hui |
| 9,252,942 B2 | 2/2016 | Zhang |
| 9,253,021 B2 | 2/2016 | Vasseur |
| 9,256,806 B2 | 2/2016 | Aller |
| 9,264,349 B2 | 2/2016 | Vasseur |
| 9,270,584 B2 | 2/2016 | Hui |
| 9,271,023 B2 | 2/2016 | Ramer |
| 9,271,133 B2 | 2/2016 | Rodriguez |
| 9,275,051 B2 | 3/2016 | King |
| 9,276,845 B2 | 3/2016 | Shaffer |
| 9,281,865 B2 | 3/2016 | Hui |
| 9,286,473 B2 | 3/2016 | Cruz Mota |
| 9,294,488 B2 | 3/2016 | Vasseur |
| 9,306,620 B2 | 4/2016 | Shaffer |
| 9,306,833 B2 | 4/2016 | Shaffer |
| 9,306,841 B2 | 4/2016 | Vasseur |
| 9,311,670 B2 | 4/2016 | Hoffberg |
| 9,314,182 B2 | 4/2016 | Wingeier |
| 9,317,378 B2 | 4/2016 | Vasseur |
| 9,319,555 B2 | 4/2016 | King |
| 9,320,024 B2 | 4/2016 | Lindh |
| 9,331,931 B2 | 5/2016 | Hui |
| 9,332,072 B2 | 5/2016 | Hui |
| 9,338,065 B2 | 5/2016 | Vasseur |
| 9,350,645 B2 | 5/2016 | Hui |
| 9,350,683 B2 | 5/2016 | Hui |
| 9,351,640 B2 | 5/2016 | Tran |
| 9,354,310 B2 | 5/2016 | Visser |
| 9,356,858 B2 | 5/2016 | Vasseur |
| 9,356,875 B2 | 5/2016 | Dasgupta |
| 9,363,358 B2 | 6/2016 | Wang |
| 9,363,670 B2 | 6/2016 | Dougherty |
| 9,369,177 B2 | 6/2016 | Hui |
| 9,369,351 B2 | 6/2016 | Di Pietro |
| 9,374,281 B2 | 6/2016 | Dasgupta |
| 9,384,500 B2 | 7/2016 | Ramer |
| 9,385,933 B2 | 7/2016 | Vasseur |
| 9,386,150 B2 | 7/2016 | Ramer |
| 9,386,502 B2 | 7/2016 | Reynaud |
| 9,389,681 B2 | 7/2016 | Sankar |

(56) References Cited

U.S. PATENT DOCUMENTS

| | | |
|---|---|---|
| 9,390,436 B2 | 7/2016 | Ramer |
| 9,391,784 B2 | 7/2016 | Hui |
| 9,391,878 B2 | 7/2016 | Bade |
| 9,398,035 B2 | 7/2016 | Vasseur |
| 9,401,787 B2 | 7/2016 | Qi |
| 9,401,863 B2 | 7/2016 | Hui |
| 9,407,646 B2 | 8/2016 | Cruz Mota |
| 9,411,916 B2 | 8/2016 | Cruz Mota |
| 9,413,479 B2 | 8/2016 | Wetterwald |
| 9,413,643 B2 | 8/2016 | Hui |
| 9,413,779 B2 | 8/2016 | Vasseur |
| 9,418,340 B2 | 8/2016 | Vasseur |
| 9,419,951 B1 | 8/2016 | Felsher |
| 9,426,020 B2 | 8/2016 | Vasseur |
| 9,426,035 B2 | 8/2016 | Shetty |
| 9,426,040 B2 | 8/2016 | Vasseur |
| 9,426,716 B2 | 8/2016 | Thubert |
| 9,432,248 B2 | 8/2016 | Vasseur |
| 9,432,312 B2 | 8/2016 | Dasgupta |
| 9,436,917 B2 | 9/2016 | Mermoud |
| 9,438,386 B2 | 9/2016 | Wermuth |
| 9,443,204 B2 | 9/2016 | Vasseur |
| 9,444,598 B2 | 9/2016 | Addepalli |
| 9,444,727 B2 | 9/2016 | Vasseur |
| 9,444,924 B2 | 9/2016 | Rodriguez |
| 9,450,642 B2 | 9/2016 | Hui |
| 9,450,972 B2 | 9/2016 | Cruz Mota |
| 9,450,978 B2 | 9/2016 | Vasseur |
| 9,454,312 B2 | 9/2016 | Dobre |
| 9,454,772 B2 | 9/2016 | Ramer |
| 9,460,346 B1 | 10/2016 | King |
| 9,462,040 B2 | 10/2016 | Addepalli |
| 9,462,107 B2 | 10/2016 | Rhoads |
| 9,471,925 B2 | 10/2016 | Ramer |
| 9,473,364 B2 | 10/2016 | Vasseur |
| 9,473,412 B2 | 10/2016 | Hui |
| 9,473,471 B2 | 10/2016 | Xu |
| 9,485,153 B2 | 11/2016 | Vasseur |
| 9,485,170 B2 | 11/2016 | Beser |
| 9,485,174 B2 | 11/2016 | Hui |
| 9,490,419 B2 | 11/2016 | Hui |
| 9,491,051 B2 | 11/2016 | Hui |
| 9,491,076 B2 | 11/2016 | Mermoud |
| 9,497,215 B2 | 11/2016 | Vasseur |
| 9,501,051 B2 | 11/2016 | Wright |
| 9,503,359 B2 | 11/2016 | Dasgupta |
| 9,503,466 B2 | 11/2016 | Vasseur |
| 9,510,264 B2 | 11/2016 | Hui |
| 9,514,211 B2 | 12/2016 | Sengupta |
| 9,515,874 B2 | 12/2016 | Hui |
| 9,516,025 B2 | 12/2016 | Dasgupta |
| 9,519,591 B2 | 12/2016 | Lomet |
| 9,520,042 B2 | 12/2016 | Eck |
| 9,521,158 B2 | 12/2016 | Di Pietro |
| 9,525,617 B2 | 12/2016 | Vasseur |
| 9,529,531 B2 | 12/2016 | Bosshart |
| 9,531,635 B2 | 12/2016 | Vasseur |
| 9,532,186 B2 | 12/2016 | Hsu |
| 9,532,332 B2 | 12/2016 | Fujita |
| 9,533,096 B2 | 1/2017 | Lebel |
| 9,537,593 B2 | 1/2017 | Hui |
| 9,538,495 B2 | 1/2017 | Hannan |
| 9,544,018 B2 | 1/2017 | Hui |
| 9,544,220 B2 | 1/2017 | Dasgupta |
| 9,548,861 B2 | 1/2017 | Isshiki |
| 9,548,918 B2 | 1/2017 | Geiger |
| 9,549,363 B2 | 1/2017 | Hui |
| 9,551,582 B2 | 1/2017 | Hoffberg |
| 9,553,772 B2 | 1/2017 | Dasgupta |
| 9,553,773 B2 | 1/2017 | Vasseur |
| 9,553,796 B2 | 1/2017 | Hui |
| 9,557,162 B2 | 1/2017 | Rodriguez |
| 9,559,750 B2 | 1/2017 | Hui |
| 9,563,440 B2 | 2/2017 | Vasseur |
| 9,563,854 B2 | 2/2017 | Cruz Mota |
| 9,565,108 B2 | 2/2017 | Hui |
| 9,565,111 B2 | 2/2017 | Vasseur |
| 9,565,512 B2 | 2/2017 | Rhoads |
| 9,577,746 B2 | 2/2017 | Nielsen |
| 9,577,914 B2 | 2/2017 | Hui |
| 9,590,790 B2 | 3/2017 | Hui |
| 9,590,896 B2 | 3/2017 | Hui |
| 9,595,115 B1 | 3/2017 | Cederlof |
| 9,600,069 B2 | 3/2017 | Publicover |
| 9,602,379 B2 | 3/2017 | Hui |
| 9,602,420 B2 | 3/2017 | Thubert |
| 9,602,807 B2 | 3/2017 | Crane |
| 9,608,912 B2 | 3/2017 | Thubert |
| 9,609,107 B2 | 3/2017 | Rodriguez |
| 9,609,725 B2 | 3/2017 | Bosua |
| 9,614,770 B2 | 4/2017 | Vasseur |
| 9,615,264 B2 | 4/2017 | Hoffberg |
| 9,615,266 B1 | 4/2017 | Cheadle |
| 9,625,545 B2 | 4/2017 | Dumoulin |
| 9,626,628 B2 | 4/2017 | Dasgupta |
| 9,628,362 B2 | 4/2017 | Vasseur |
| 9,634,982 B2 | 4/2017 | Hui |
| 9,635,050 B2 | 4/2017 | Di Pietro |
| 9,641,340 B2 | 5/2017 | Wang |
| 9,641,382 B2 | 5/2017 | Hui |
| 9,647,494 B2 | 5/2017 | Hui |
| 9,648,496 B2 | 5/2017 | Loughlin-Mchugh |
| 9,652,720 B2 | 5/2017 | Vasseur |
| 9,654,389 B2 | 5/2017 | Hui |
| 9,654,937 B2 | 5/2017 | Addepalli |
| 9,660,729 B2 | 5/2017 | Totten |
| 9,667,501 B2 | 5/2017 | Dasgupta |
| 9,667,536 B2 | 5/2017 | Hui |
| 9,673,858 B2 | 6/2017 | Hui |
| 9,674,207 B2 | 6/2017 | Di Pietro |
| 9,690,949 B1 | 6/2017 | Diorio |
| 9,692,644 B2 | 6/2017 | Hui |
| 9,692,984 B2 | 6/2017 | Lord |
| 9,698,864 B2 | 7/2017 | Shaffer |
| 9,698,867 B2 | 7/2017 | Hui |
| 9,703,892 B2 | 7/2017 | Ramer |
| 9,705,766 B2 | 7/2017 | Vasseur |
| 9,705,914 B2 | 7/2017 | Di Pietro |
| 9,712,433 B2 | 7/2017 | Hui |
| 9,712,662 B2 | 7/2017 | Glezerman |
| 9,716,528 B2 | 7/2017 | Hui |
| 9,722,905 B2 | 8/2017 | Mermoud |
| 9,722,909 B2 | 8/2017 | Hui |
| 9,723,538 B2 | 8/2017 | Shaffer |
| 9,729,311 B2 | 8/2017 | Yao |
| 9,734,457 B2 | 8/2017 | Vasseur |
| 9,746,916 B2 | 8/2017 | Kim |
| 9,749,410 B2 | 8/2017 | Thubert |
| 9,754,287 B2 | 9/2017 | Ramer |
| 9,756,549 B2 | 9/2017 | Perdomo |
| 9,769,821 B2 | 9/2017 | Hui |
| 9,773,167 B2 | 9/2017 | King |
| 9,774,522 B2 | 9/2017 | Vasseur |
| 9,775,520 B2 | 10/2017 | Tran |
| 9,785,509 B2 | 10/2017 | Hui |
| 9,785,764 B2 | 10/2017 | Loughlin-Mchugh |
| 9,785,975 B2 | 10/2017 | Ramer |
| 9,786,145 B2 | 10/2017 | Oppenheimer |
| 9,788,799 B2 | 10/2017 | Wagner |
| 9,793,948 B2 | 10/2017 | Hui |
| 9,794,179 B2 | 10/2017 | Dasgupta |
| 9,794,797 B2 | 10/2017 | Hoffberg |
| 9,801,542 B2 | 10/2017 | Tran |
| 9,804,712 B2 | 10/2017 | Fergusson |
| 9,811,589 B2 | 11/2017 | Ramer |
| 9,811,728 B2 | 11/2017 | King |
| 9,814,425 B2 | 11/2017 | Tran |
| 9,818,136 B1 | 11/2017 | Hoffberg |
| 9,820,657 B2 | 11/2017 | Tran |
| 9,820,658 B2 | 11/2017 | Tran |
| 9,825,924 B2 | 11/2017 | Huang |
| 9,832,242 B2 | 11/2017 | Hui |
| 9,832,674 B2 | 11/2017 | Ghai |
| 9,842,034 B2 | 12/2017 | Heliker |

(56) References Cited

U.S. PATENT DOCUMENTS

| | | |
|---|---|---|
| 9,847,889 B2 | 12/2017 | Vasseur |
| 9,848,422 B2 | 12/2017 | Woo |
| 9,849,364 B2 | 12/2017 | Tran |
| 9,852,285 B2 | 12/2017 | Loughlin-Mchugh |
| 9,853,883 B2 | 12/2017 | Thubert |
| 9,854,288 B2 | 12/2017 | Gibbon |
| 9,858,408 B2 | 1/2018 | Loughlin-Mchugh |
| 9,860,140 B2 | 1/2018 | Vasseur |
| 9,865,176 B2 | 1/2018 | Tran |
| 9,870,537 B2 | 1/2018 | Vasseur |
| 9,875,472 B2 | 1/2018 | Granbery |
| 9,876,747 B2 | 1/2018 | Hui |
| 9,886,845 B2 | 2/2018 | Rhoads |
| 9,888,105 B2 | 2/2018 | Rhoads |
| 9,893,985 B2 | 2/2018 | Hui |
| 9,900,169 B2 | 2/2018 | Thubert |
| 9,900,342 B2 | 2/2018 | Cruz Mota |
| 9,901,252 B2 | 2/2018 | Tran |
| 9,906,291 B1 | 2/2018 | Nakamura |
| 9,907,473 B2 | 3/2018 | Tran |
| 9,916,519 B2 | 3/2018 | Rodriguez |
| 9,917,785 B2 | 3/2018 | Thubert |
| 9,918,183 B2 | 3/2018 | Rhoads |
| 9,922,256 B2 | 3/2018 | Savvides |
| 9,928,264 B2 | 3/2018 | Lomet |
| 9,940,884 B1 | 4/2018 | Musolin |
| 9,941,959 B2 | 4/2018 | Heath |
| 9,946,076 B2 | 4/2018 | Smits |
| 9,949,129 B1 | 4/2018 | Henry |
| 9,952,323 B2 | 4/2018 | Deane |
| 9,955,456 B2 | 4/2018 | Hui |
| 9,961,609 B2 | 5/2018 | Beser |
| 9,967,170 B2 | 5/2018 | Vasseur |
| 9,973,488 B1 | 5/2018 | Roth |
| 9,973,596 B2 | 5/2018 | Hui |
| 9,979,619 B2 | 5/2018 | Vasseur |
| 9,998,850 B2 | 6/2018 | Broadley |
| 10,013,766 B2 | 7/2018 | King |
| 10,015,720 B2 | 7/2018 | Perdomo |
| 10,022,613 B2 | 7/2018 | Tran |
| 10,028,198 B2 | 7/2018 | Fitzek |
| 10,028,357 B2 | 7/2018 | Scordato |
| 10,034,152 B2 | 7/2018 | Wells |
| 10,038,617 B2 | 7/2018 | Hui |
| 10,038,756 B2 | 7/2018 | Ramer |
| 10,038,766 B2 | 7/2018 | Pfister |
| 10,039,046 B2 | 7/2018 | Hui |
| 10,046,228 B2 | 8/2018 | Tran |
| 10,051,358 B2 | 8/2018 | Yamkovoy |
| 10,051,546 B2 | 8/2018 | Kato |
| 10,062,232 B2 | 8/2018 | Allibhoy |
| 10,063,479 B2 | 8/2018 | Kim |
| 10,067,960 B2 | 9/2018 | Levandoski |
| 10,075,360 B2 | 9/2018 | Vasseur |
| 10,075,518 B2 | 9/2018 | Basta |
| 10,084,538 B2 | 9/2018 | Nielsen |
| 10,097,469 B2 | 10/2018 | Hui |
| 10,097,471 B2 | 10/2018 | Vasseur |
| 10,103,970 B2 | 10/2018 | Dasgupta |
| 10,104,712 B2 | 10/2018 | Hui |
| 10,115,041 B2 | 10/2018 | King |
| 10,122,695 B2 | 11/2018 | Zhang |
| 10,127,816 B2 | 11/2018 | Hoffberg |
| 10,142,276 B2 | 11/2018 | Rapaport |
| 10,148,537 B2 | 12/2018 | Vasseur |
| 10,154,295 B2 | 12/2018 | Gibbon |
| 10,156,900 B2 | 12/2018 | Publicover |
| 10,163,137 B2 | 12/2018 | Hoffberg |
| 10,169,625 B1 | 1/2019 | Diorio |
| 10,171,332 B2 | 1/2019 | Mermoud |
| 10,178,019 B2 | 1/2019 | Carofiglio |
| 10,195,513 B2 | 2/2019 | Tran |
| 10,200,404 B2 | 2/2019 | Cruz Mota |
| 10,210,321 B2 | 2/2019 | Loughlin-Mchugh |
| 10,216,629 B2 | 2/2019 | Lomet |
| 10,218,619 B2 | 2/2019 | Hui |
| 10,230,637 B2 | 3/2019 | Speight |
| 10,231,253 B2 | 3/2019 | Thubert |
| 10,242,565 B2 | 3/2019 | Shennib |
| 10,243,652 B2 | 3/2019 | Heath |
| 10,268,634 B1 | 4/2019 | Bosshart |
| 10,270,606 B2 | 4/2019 | Thubert |
| 10,270,896 B2 | 4/2019 | Rhoads |
| 10,277,476 B2 | 4/2019 | Mermoud |
| 10,284,703 B1 | 5/2019 | Lawrence |
| 10,295,669 B2 | 5/2019 | Deane |
| 10,298,986 B2 | 5/2019 | Cross |
| 10,302,810 B2 | 5/2019 | Grosse-Puppendahl |
| 10,303,035 B2 | 5/2019 | Brown |
| 10,305,693 B2 | 5/2019 | Graul |
| 10,307,060 B2 | 6/2019 | Tran |
| 10,310,464 B1 | 6/2019 | Lu |
| 10,310,944 B2 | 6/2019 | Hui |
| 10,320,613 B1 | 6/2019 | Cam-Winget |
| 10,320,657 B2 | 6/2019 | Thubert |
| 10,325,090 B2 | 6/2019 | Loughlin-Mchugh |
| 10,326,617 B2 | 6/2019 | Al-Gharaibeh |
| 10,327,314 B1 | 6/2019 | Shin |
| 10,339,339 B2 | 7/2019 | Jackson |
| 10,354,505 B2 | 7/2019 | Oppenheimer |
| 10,356,111 B2 | 7/2019 | Di Pietro |
| 10,362,940 B2 | 7/2019 | Tran |
| 10,367,674 B2 | 7/2019 | Bolstad |
| 10,368,288 B2 | 7/2019 | Rios Almanza |
| 10,373,462 B2 | 8/2019 | Oppenheimer |
| 10,404,368 B2 | 9/2019 | Heath |
| 10,409,836 B2 | 9/2019 | Sankar |
| 10,412,074 B2 | 9/2019 | Zhang |
| 10,416,264 B2 | 9/2019 | Sofka |
| 10,419,655 B2 | 9/2019 | Sivan |
| 10,420,006 B2 | 9/2019 | Rios Almanza |
| 10,423,862 B2 | 9/2019 | King |
| 10,425,294 B2 | 9/2019 | Vasseur |
| 10,438,415 B2 | 10/2019 | Hendricks |
| 10,454,834 B2 | 10/2019 | Vasseur |
| 10,467,811 B1 | 11/2019 | Cederlof |
| 10,476,589 B2 | 11/2019 | Heath |
| 10,514,273 B2 | 12/2019 | Padrones |
| 10,517,479 B2 | 12/2019 | Tran |
| 10,521,623 B2 | 12/2019 | Rodriguez |
| 10,523,445 B2 | 12/2019 | Rossi |
| 10,532,268 B2 | 1/2020 | Tran |
| 10,534,058 B2 | 1/2020 | Sofka |
| 10,537,291 B2 | 1/2020 | Wagner |
| 10,540,605 B2 | 1/2020 | Mermoud |
| 10,545,845 B1 | 1/2020 | Heliker |
| 10,553,098 B2 | 2/2020 | Hart |
| 10,559,892 B2 | 2/2020 | Kuiper |
| 10,567,975 B2 | 2/2020 | Hoffberg |
| 10,571,925 B1 | 2/2020 | Zhang |
| 10,571,926 B1 | 2/2020 | Zhang |
| 10,575,339 B2 | 2/2020 | Segal |
| 10,575,417 B2 | 2/2020 | Sabbag |
| 10,581,932 B2 | 3/2020 | Addepalli |
| 10,585,156 B2 | 3/2020 | Sofka |
| 10,585,942 B2 | 3/2020 | Ramer |
| 10,587,501 B2 | 3/2020 | Thubert |
| 10,589,087 B2 | 3/2020 | Tyler |
| 10,592,930 B2 | 3/2020 | Ramer |
| 10,594,484 B2 | 3/2020 | Rodriguez |
| 10,594,689 B1 | 3/2020 | Weaver |
| 10,594,916 B2 | 3/2020 | Sivan |
| 10,599,485 B2 | 3/2020 | Levandoski |
| 10,600,088 B2 | 3/2020 | Dittus |
| 10,602,329 B2 | 3/2020 | Addepalli |
| 10,602,424 B2 | 3/2020 | Perdomo |
| 10,605,922 B2 | 3/2020 | Deane |
| 10,610,111 B1 | 4/2020 | Tran |
| 10,620,700 B2 | 4/2020 | Publicover |
| 10,641,861 B2 | 5/2020 | Dupray |
| 10,652,381 B2 | 5/2020 | Yamkovoy |
| 10,659,586 B2 | 5/2020 | Cheng |
| 10,666,784 B2 | 5/2020 | Rhoads |
| 10,681,608 B2 | 6/2020 | Hui |

(56) References Cited

U.S. PATENT DOCUMENTS

| | | |
|---|---|---|
| 10,684,350 B2 | 6/2020 | Dupray |
| 10,685,003 B2 | 6/2020 | Shuman |
| 10,686,689 B2 | 6/2020 | Hui |
| 10,692,085 B2 | 6/2020 | Zagarese |
| 10,693,556 B2 | 6/2020 | Heath |
| 10,713,453 B1 | 7/2020 | Diorio |
| 10,718,842 B2 | 7/2020 | Sofka |
| 10,719,134 B2 | 7/2020 | Aman |
| 10,729,336 B1 | 8/2020 | Tran |
| 10,761,206 B2 | 9/2020 | Chandra |
| 10,764,263 B2 | 9/2020 | Rossi |
| 10,764,809 B2 | 9/2020 | Rios Almanza |
| 10,769,431 B2 | 9/2020 | King |
| 10,771,262 B2 | 9/2020 | Gero |
| 10,785,365 B2 | 9/2020 | Rodriguez |
| 10,785,809 B1 | 9/2020 | Thubert |
| 10,788,836 B2 | 9/2020 | Ebrahimi Afrouzi |
| 10,789,590 B2 | 9/2020 | Tran |
| 10,803,482 B2 | 10/2020 | Ramer |
| 10,805,370 B2 | 10/2020 | Alsina |
| 10,816,629 B2 | 10/2020 | Sofka |
| 10,833,912 B2 | 11/2020 | Au |
| 10,853,592 B2 | 12/2020 | Rodriguez |
| 10,868,625 B2 | 12/2020 | Thubert |
| 10,872,636 B2 | 12/2020 | Smith |
| 10,880,266 B1 | 12/2020 | Shribman |
| 10,887,048 B2 | 1/2021 | Paycher |
| 10,887,851 B1 | 1/2021 | Zhang |
| 10,890,653 B2 | 1/2021 | Giusti |
| 10,902,080 B2 | 1/2021 | Shribman |
| 10,904,097 B2 | 1/2021 | She |
| 10,911,894 B2 | 2/2021 | Ramer |
| 10,912,149 B2 | 2/2021 | Shoji |
| 10,912,480 B2 | 2/2021 | Sridhar |
| 10,916,113 B2 | 2/2021 | Oppenheimer |
| 10,922,957 B2 | 2/2021 | Rhoads |
| 10,925,083 B2 | 2/2021 | Lee |
| 10,928,498 B1 | 2/2021 | Li |
| 10,929,654 B2 | 2/2021 | Iqbal |
| 10,929,987 B2 | 2/2021 | Lv |
| 10,943,273 B2 | 3/2021 | Hoffberg |
| 10,944,669 B1 | 3/2021 | Ramanathan |
| 10,945,188 B2 | 3/2021 | Rios Almanza |
| 10,951,421 B2 | 3/2021 | Rossi |
| 10,955,504 B2 | 3/2021 | Sofka |
| 10,959,157 B2 | 3/2021 | Francisco |
| 10,963,531 B2 | 3/2021 | Shribman |
| 10,965,653 B2 | 3/2021 | Bild |
| 10,969,740 B2 | 4/2021 | Shi |
| 10,977,799 B2 | 4/2021 | King |
| 10,985,934 B2 | 4/2021 | Shribman |
| 11,002,837 B2 | 5/2021 | Barber |
| 11,016,357 B2 | 5/2021 | Brown |
| 11,019,246 B2 | 5/2021 | Sivan |
| 11,023,228 B2 | 6/2021 | Landman |
| 11,031,938 B2 | 6/2021 | Cheadle |
| 11,032,752 B2 | 6/2021 | Glottmann |
| 11,042,719 B2 | 6/2021 | Rodriguez |
| 11,045,271 B1 | 6/2021 | Tran |
| 11,050,671 B2 | 6/2021 | Speight |
| 11,051,704 B1 | 7/2021 | Tran |
| 11,057,670 B2 | 7/2021 | Rivera |
| 11,062,357 B2 | 7/2021 | Ramer |
| 11,067,869 B2 | 7/2021 | Brown |
| 11,069,082 B1 | 7/2021 | Ebrahimi Afrouzi |
| 11,080,252 B1 | 8/2021 | Bosshart |
| 11,082,324 B2 | 8/2021 | Ramanathan |
| 11,082,344 B2 | 8/2021 | Ramanathan |
| 11,089,094 B2 | 8/2021 | Basta |
| 11,089,165 B2 | 8/2021 | Yssa |
| 11,093,865 B2 | 8/2021 | Rubenstein |
| 11,101,819 B2 | 8/2021 | Lagunas |
| 11,102,201 B2 | 8/2021 | Weaver |
| 11,108,998 B2 | 8/2021 | Neshumov |
| 11,110,191 B2 | 9/2021 | Katz |
| 11,115,230 B2 | 9/2021 | Shribman |
| 11,128,554 B1 | 9/2021 | Wang |
| 11,129,045 B2 | 9/2021 | Shoji |
| 11,130,042 B2 | 9/2021 | Tran |
| 11,133,863 B2 | 9/2021 | Heath |
| 11,151,862 B2 | 10/2021 | Farrand |
| 11,153,503 B1 | 10/2021 | Ebrahimi Afrouzi |
| 11,159,430 B2 | 10/2021 | Zhang |
| 11,159,767 B1 | 10/2021 | Kamisetty |
| 11,161,519 B2 | 11/2021 | Phillips |
| 11,170,062 B2 | 11/2021 | Gilula |
| 11,184,157 B1 | 11/2021 | Gueron |
| 11,189,273 B2 | 11/2021 | Bundalo |
| 11,190,374 B2 | 11/2021 | Shribman |
| 11,193,792 B2 | 12/2021 | Padrones |
| 11,195,396 B2 | 12/2021 | Oppenheimer |
| 11,210,220 B2 | 12/2021 | Lomet |
| 11,245,681 B2 | 2/2022 | Roth |
| 11,284,255 B1 | 3/2022 | Akkaya |
| 11,356,423 B2 | 6/2022 | Wang |
| 11,488,152 B2 | 11/2022 | Gaddam |
| 11,531,628 B2 | 12/2022 | Martin |
| 2001/0041594 A1 | 11/2001 | Arazi |
| 2002/0073202 A1 | 6/2002 | Wang |
| 2003/0013503 A1 | 1/2003 | Menard |
| 2003/0016129 A1 | 1/2003 | Menard |
| 2003/0062990 A1 | 4/2003 | Schaeffer |
| 2003/0085997 A1 | 5/2003 | Takagi |
| 2004/0009749 A1 | 1/2004 | Arazi |
| 2004/0086093 A1 | 5/2004 | Schranz |
| 2004/0107271 A1 | 6/2004 | Ahn |
| 2004/0146031 A1 | 7/2004 | Jukarainen |
| 2004/0246960 A1 | 12/2004 | Irish |
| 2005/0099960 A1 | 5/2005 | Boss |
| 2005/0108391 A1 | 5/2005 | Boss |
| 2005/0153624 A1 | 7/2005 | Wieland |
| 2006/0003737 A1 | 1/2006 | Alrabady |
| 2006/0003802 A1 | 1/2006 | Sinai |
| 2006/0142880 A1 | 6/2006 | Deen |
| 2006/0146727 A1 | 7/2006 | Herter |
| 2006/0244825 A1 | 11/2006 | Wang |
| 2006/0276211 A1 | 12/2006 | Gallo |
| 2006/0293092 A1 | 12/2006 | Yard |
| 2007/0171851 A1 | 7/2007 | Beckmann |
| 2007/0250718 A1 | 10/2007 | Lee |
| 2008/0002578 A1 | 1/2008 | Coffman |
| 2008/0003975 A1 | 1/2008 | Kim |
| 2008/0006615 A1 | 1/2008 | Rosario |
| 2008/0026775 A1 | 1/2008 | Arazi |
| 2008/0032664 A1 | 2/2008 | Chou |
| 2008/0037785 A1 | 2/2008 | Gantman |
| 2008/0056232 A1 | 3/2008 | Koon |
| 2008/0126801 A1 | 5/2008 | Lee |
| 2008/0140577 A1 | 6/2008 | Rahman |
| 2008/0159294 A1 | 7/2008 | Irish |
| 2008/0214247 A1 | 9/2008 | Yang |
| 2008/0280559 A1 | 11/2008 | Dandekar |
| 2009/0074006 A1 | 3/2009 | Qi |
| 2009/0077444 A1 | 3/2009 | Qi |
| 2009/0109916 A1 | 4/2009 | Berg |
| 2009/0150982 A1 | 6/2009 | Kim |
| 2009/0182997 A1 | 7/2009 | Gillard |
| 2009/0196304 A1 | 8/2009 | Sayenko |
| 2009/0207819 A1 | 8/2009 | Kröselberg |
| 2009/0216970 A1 | 8/2009 | Basler |
| 2009/0265737 A1 | 10/2009 | Issa |
| 2009/0276841 A1 | 11/2009 | Guo |
| 2009/0310582 A1 | 12/2009 | Beser |
| 2009/0325575 A1 | 12/2009 | Rantanen |
| 2010/0048134 A1 | 2/2010 | McCarthy |
| 2010/0067462 A1 | 3/2010 | Beser |
| 2010/0080152 A1 | 4/2010 | Lindh |
| 2010/0093364 A1 | 4/2010 | Ribeiro |
| 2010/0119069 A1 | 5/2010 | Kamikura |
| 2010/0138671 A1 | 6/2010 | Kim |
| 2010/0220643 A1 | 9/2010 | Qi |
| 2010/0234022 A1 | 9/2010 | Winterbottom |
| 2010/0267386 A1 | 10/2010 | Lim |
| 2010/0278221 A1 | 11/2010 | Ql |

(56) References Cited

U.S. PATENT DOCUMENTS

| | | |
|---|---|---|
| 2010/0281267 A1 | 11/2010 | Sakumoto |
| 2010/0285750 A1 | 11/2010 | Simonelic |
| 2010/0293293 A1 | 11/2010 | Beser |
| 2011/0039589 A1 | 2/2011 | Skov |
| 2011/0069630 A1 | 3/2011 | Doppler |
| 2011/0077001 A1 | 3/2011 | Brown |
| 2011/0090879 A1 | 4/2011 | Hamiti |
| 2011/0103253 A1 | 5/2011 | Qi |
| 2011/0231555 A1 | 9/2011 | Ebrahimi |
| 2011/0248856 A1 | 10/2011 | Obenchain |
| 2011/0289311 A1 | 11/2011 | Roy-Chowdhury |
| 2012/0009939 A1 | 1/2012 | Islam |
| 2012/0009949 A1 | 1/2012 | Islam |
| 2012/0009950 A1 | 1/2012 | Islam |
| 2012/0021739 A1 | 1/2012 | Frank |
| 2012/0127890 A1 | 5/2012 | Islam |
| 2012/0129550 A1 | 5/2012 | Hannan |
| 2012/0129551 A1 | 5/2012 | Islam |
| 2012/0163222 A1 | 6/2012 | Islam |
| 2012/0224474 A1 | 9/2012 | Beser |
| 2013/0010686 A1 | 1/2013 | Shatzkamer |
| 2013/0011215 A1 | 1/2013 | Wells |
| 2013/0038218 A1 | 2/2013 | Xu |
| 2013/0061263 A1 | 3/2013 | Issa |
| 2013/0086378 A1 | 4/2013 | Yao |
| 2013/0148551 A1 | 6/2013 | Lindh |
| 2013/0156188 A1 | 6/2013 | Xu |
| 2013/0275752 A1 | 10/2013 | Zhang |
| 2013/0324155 A1 | 12/2013 | Islam |
| 2014/0006893 A1 | 1/2014 | Shetty |
| 2014/0010542 A1 | 1/2014 | Nielsen |
| 2014/0012664 A1 | 1/2014 | Ramer |
| 2014/0012665 A1 | 1/2014 | Ramer |
| 2014/0016643 A1 | 1/2014 | Vasseur |
| 2014/0022906 A1 | 1/2014 | Vasseur |
| 2014/0025380 A1 | 1/2014 | Koch |
| 2014/0025494 A1 | 1/2014 | Ramer |
| 2014/0025502 A1 | 1/2014 | Ramer |
| 2014/0029432 A1 | 1/2014 | Vasseur |
| 2014/0029445 A1 | 1/2014 | Hui |
| 2014/0029624 A1 | 1/2014 | Vasseur |
| 2014/0036912 A1 | 2/2014 | Hui |
| 2014/0046761 A1 | 2/2014 | Ramer |
| 2014/0047489 A1 | 2/2014 | Nielsen |
| 2014/0055284 A1 | 2/2014 | Tran |
| 2014/0059347 A1 | 2/2014 | Dougherty |
| 2014/0063255 A1 | 3/2014 | Breed |
| 2014/0064172 A1 | 3/2014 | Hui |
| 2014/0068105 A1 | 3/2014 | Thubert |
| 2014/0071272 A1 | 3/2014 | Rodriguez |
| 2014/0077946 A1 | 3/2014 | Tran |
| 2014/0080428 A1 | 3/2014 | Rhoads |
| 2014/0081793 A1 | 3/2014 | Hoffberg |
| 2014/0089089 A1 | 3/2014 | Ramer |
| 2014/0089243 A1 | 3/2014 | Oppenheimer |
| 2014/0092752 A1 | 4/2014 | Hui |
| 2014/0092753 A1 | 4/2014 | Vasseur |
| 2014/0092769 A1 | 4/2014 | Shaffer |
| 2014/0095864 A1 | 4/2014 | Dasgupta |
| 2014/0097957 A1 | 4/2014 | Breed |
| 2014/0098960 A1 | 4/2014 | Xu |
| 2014/0104059 A1 | 4/2014 | Tran |
| 2014/0105015 A1 | 4/2014 | Hui |
| 2014/0105027 A1 | 4/2014 | Shaffer |
| 2014/0105033 A1 | 4/2014 | Vasseur |
| 2014/0105211 A1 | 4/2014 | Hui |
| 2014/0108643 A1 | 4/2014 | Hui |
| 2014/0115321 A1 | 4/2014 | Isshiki |
| 2014/0115322 A1 | 4/2014 | Xu |
| 2014/0120981 A1 | 5/2014 | King |
| 2014/0121476 A1 | 5/2014 | Tran |
| 2014/0122243 A1 | 5/2014 | Ramer |
| 2014/0126348 A1 | 5/2014 | Mahamuni |
| 2014/0126354 A1 | 5/2014 | Hui |
| 2014/0126423 A1 | 5/2014 | Vasseur |
| 2014/0126426 A1 | 5/2014 | Vasseur |
| 2014/0126610 A1 | 5/2014 | Hui |
| 2014/0129332 A1 | 5/2014 | Ramer |
| 2014/0129734 A1 | 5/2014 | Vasseur |
| 2014/0129876 A1 | 5/2014 | Addepalli |
| 2014/0136881 A1 | 5/2014 | Vasseur |
| 2014/0139608 A1 | 5/2014 | Rosario |
| 2014/0143064 A1 | 5/2014 | Tran |
| 2014/0143369 A1 | 5/2014 | Dobre |
| 2014/0143818 A1 | 5/2014 | Nielsen |
| 2014/0163425 A1 | 6/2014 | Tran |
| 2014/0164113 A1 | 6/2014 | Ramer |
| 2014/0168369 A1 | 6/2014 | Crane |
| 2014/0168716 A1 | 6/2014 | King |
| 2014/0169686 A1 | 6/2014 | Conwell |
| 2014/0177901 A1 | 6/2014 | Berkman |
| 2014/0180825 A1 | 6/2014 | Ramer |
| 2014/0181100 A1 | 6/2014 | Ramer |
| 2014/0193087 A1 | 7/2014 | Conwell |
| 2014/0194702 A1 | 7/2014 | Tran |
| 2014/0211943 A1 | 7/2014 | Nyang |
| 2014/0214526 A1 | 7/2014 | Ramer |
| 2014/0214527 A1 | 7/2014 | Ramer |
| 2014/0215513 A1 | 7/2014 | Ramer |
| 2014/0219078 A1 | 8/2014 | Dasgupta |
| 2014/0219103 A1 | 8/2014 | Vasseur |
| 2014/0219114 A1 | 8/2014 | Vasseur |
| 2014/0219133 A1 | 8/2014 | Dasgupta |
| 2014/0219566 A1 | 8/2014 | Rodriguez |
| 2014/0222725 A1 | 8/2014 | Vasseur |
| 2014/0222726 A1 | 8/2014 | Mermoud |
| 2014/0222727 A1 | 8/2014 | Vasseur |
| 2014/0222728 A1 | 8/2014 | Vasseur |
| 2014/0222729 A1 | 8/2014 | Dasgupta |
| 2014/0222730 A1 | 8/2014 | Vasseur |
| 2014/0222731 A1 | 8/2014 | Mermoud |
| 2014/0222748 A1 | 8/2014 | Mermoud |
| 2014/0222975 A1 | 8/2014 | Vasseur |
| 2014/0222983 A1 | 8/2014 | Dasgupta |
| 2014/0222996 A1 | 8/2014 | Vasseur |
| 2014/0222997 A1 | 8/2014 | Mermoud |
| 2014/0222998 A1 | 8/2014 | Vasseur |
| 2014/0223155 A1 | 8/2014 | Vasseur |
| 2014/0226855 A1 | 8/2014 | Savvides |
| 2014/0228049 A1 | 8/2014 | Hannan |
| 2014/0232889 A1 | 8/2014 | King |
| 2014/0236718 A1 | 8/2014 | Ramer |
| 2014/0245055 A1 | 8/2014 | Shaffer |
| 2014/0247804 A1 | 9/2014 | Wermuth |
| 2014/0249429 A1 | 9/2014 | Tran |
| 2014/0253977 A1 | 9/2014 | King |
| 2014/0266787 A1 | 9/2014 | Tran |
| 2014/0269402 A1 | 9/2014 | Vasseur |
| 2014/0269413 A1 | 9/2014 | Hui |
| 2014/0269592 A1 | 9/2014 | Addepalli |
| 2014/0269759 A1 | 9/2014 | Thubert |
| 2014/0273958 A1 | 9/2014 | Messana |
| 2014/0273998 A1 | 9/2014 | Ramer |
| 2014/0281670 A1 | 9/2014 | Vasseur |
| 2014/0282783 A1 | 9/2014 | Totten |
| 2014/0286377 A1 | 9/2014 | Shaffer |
| 2014/0301490 A1 | 10/2014 | Nielsen |
| 2014/0304427 A1 | 10/2014 | Vasseur |
| 2014/0314232 A1 | 10/2014 | Fahrny |
| 2014/0315527 A1 | 10/2014 | Ramer |
| 2014/0316785 A1 | 10/2014 | Bennett |
| 2014/0323142 A1 | 10/2014 | Rodriguez |
| 2014/0324447 A1 | 10/2014 | Dittus |
| 2014/0324572 A1 | 10/2014 | Ramer |
| 2014/0328279 A1 | 11/2014 | Beser |
| 2014/0328346 A1 | 11/2014 | Hui |
| 2014/0330947 A1 | 11/2014 | Hui |
| 2014/0333794 A1 | 11/2014 | Rhoads |
| 2014/0337733 A1 | 11/2014 | Rodriguez |
| 2014/0344065 A1 | 11/2014 | Ramer |
| 2014/0344718 A1 | 11/2014 | Rapaport |
| 2014/0349576 A1 | 11/2014 | Lo |
| 2014/0351765 A1 | 11/2014 | Rodriguez |
| 2014/0354279 A1 | 12/2014 | Dumoulin |

(56) References Cited

U.S. PATENT DOCUMENTS

| | | |
|---|---|---|
| 2014/0372577 A1 | 12/2014 | Hui |
| 2014/0372585 A1 | 12/2014 | Hui |
| 2014/0376361 A1 | 12/2014 | Hui |
| 2014/0376427 A1 | 12/2014 | Hui |
| 2014/0379896 A1 | 12/2014 | Vasseur |
| 2014/0379900 A1 | 12/2014 | Dasgupta |
| 2014/0379991 A1 | 12/2014 | Lomet |
| 2015/0002336 A1 | 1/2015 | Thubert |
| 2015/0003428 A1 | 1/2015 | Woo |
| 2015/0011194 A1 | 1/2015 | Rodriguez |
| 2015/0019329 A1 | 1/2015 | Ramer |
| 2015/0022675 A1 | 1/2015 | Lord |
| 2015/0023174 A1 | 1/2015 | Dasgupta |
| 2015/0023363 A1 | 1/2015 | Hui |
| 2015/0023369 A1 | 1/2015 | Hui |
| 2015/0024800 A1 | 1/2015 | Rodriguez |
| 2015/0026268 A1 | 1/2015 | Hui |
| 2015/0030033 A1 | 1/2015 | Vasseur |
| 2015/0043384 A1 | 2/2015 | Hui |
| 2015/0043519 A1 | 2/2015 | Hui |
| 2015/0043770 A1 | 2/2015 | Chen |
| 2015/0054774 A1 | 2/2015 | Fergusson |
| 2015/0057518 A1 | 2/2015 | Lebel |
| 2015/0063365 A1 | 3/2015 | Hui |
| 2015/0063714 A1 | 3/2015 | King |
| 2015/0068069 A1 | 3/2015 | Tran |
| 2015/0071295 A1 | 3/2015 | Hui |
| 2015/0077240 A1 | 3/2015 | Eck |
| 2015/0081444 A1 | 3/2015 | Hoffberg |
| 2015/0092560 A1 | 4/2015 | Hui |
| 2015/0092667 A1 | 4/2015 | Beser |
| 2015/0099941 A1 | 4/2015 | Tran |
| 2015/0105631 A1 | 4/2015 | Tran |
| 2015/0110159 A1 | 4/2015 | Hui |
| 2015/0111591 A1 | 4/2015 | Hoffberg |
| 2015/0125832 A1 | 5/2015 | Tran |
| 2015/0131490 A1 | 5/2015 | Hsu |
| 2015/0148100 A1 | 5/2015 | Malenotti |
| 2015/0150031 A1 | 5/2015 | Gibbon |
| 2015/0154317 A1 | 6/2015 | Inoue |
| 2015/0155637 A1 | 6/2015 | Kuiper |
| 2015/0156199 A1 | 6/2015 | Dasgupta |
| 2015/0164436 A1 | 6/2015 | Maron |
| 2015/0180772 A1 | 6/2015 | Hui |
| 2015/0186642 A1 | 7/2015 | Cruz Mota |
| 2015/0186775 A1 | 7/2015 | Cruz Mota |
| 2015/0186798 A1 | 7/2015 | Vasseur |
| 2015/0186799 A1 | 7/2015 | Dasgupta |
| 2015/0188751 A1 | 7/2015 | Vasseur |
| 2015/0188801 A1 | 7/2015 | Dasgupta |
| 2015/0188934 A1 | 7/2015 | Vasseur |
| 2015/0188935 A1 | 7/2015 | Vasseur |
| 2015/0188949 A1 | 7/2015 | Mahaffey |
| 2015/0189449 A1* | 7/2015 | Udesen ............. H04R 25/43 381/315 |
| 2015/0193693 A1 | 7/2015 | Vasseur |
| 2015/0193694 A1 | 7/2015 | Vasseur |
| 2015/0193695 A1 | 7/2015 | Cruz Mota |
| 2015/0193696 A1 | 7/2015 | Vasseur |
| 2015/0193697 A1 | 7/2015 | Vasseur |
| 2015/0195126 A1 | 7/2015 | Vasseur |
| 2015/0195136 A1 | 7/2015 | Mermoud |
| 2015/0195144 A1 | 7/2015 | Vasseur |
| 2015/0195145 A1 | 7/2015 | Di Pietro |
| 2015/0195146 A1 | 7/2015 | Di Pietro |
| 2015/0195149 A1 | 7/2015 | Vasseur |
| 2015/0195171 A1 | 7/2015 | Mermoud |
| 2015/0195176 A1 | 7/2015 | Vasseur |
| 2015/0195184 A1 | 7/2015 | Vasseur |
| 2015/0195185 A1 | 7/2015 | Dasgupta |
| 2015/0195192 A1 | 7/2015 | Vasseur |
| 2015/0195212 A1 | 7/2015 | Vasseur |
| 2015/0195216 A1 | 7/2015 | Di Pietro |
| 2015/0195296 A1 | 7/2015 | Vasseur |
| 2015/0200713 A1 | 7/2015 | Hui |
| 2015/0200738 A1 | 7/2015 | Wetterwald |
| 2015/0200810 A1 | 7/2015 | Vasseur |
| 2015/0200840 A1 | 7/2015 | Beser |
| 2015/0200846 A1 | 7/2015 | Hui |
| 2015/0201060 A1 | 7/2015 | Wang |
| 2015/0207725 A1 | 7/2015 | Hui |
| 2015/0207846 A1 | 7/2015 | Famaey |
| 2015/0222358 A1 | 8/2015 | Totten |
| 2015/0222648 A1 | 8/2015 | Kim |
| 2015/0227890 A1 | 8/2015 | Bednarek |
| 2015/0228004 A1 | 8/2015 | Bednarek |
| 2015/0237130 A1 | 8/2015 | Hui |
| 2015/0237519 A1 | 8/2015 | Ghai |
| 2015/0244850 A1 | 8/2015 | Rodriguez |
| 2015/0249595 A1 | 9/2015 | Geiger |
| 2015/0250393 A1 | 9/2015 | Tran |
| 2015/0264554 A1 | 9/2015 | Addepalli |
| 2015/0264626 A1 | 9/2015 | Perdomo |
| 2015/0264627 A1 | 9/2015 | Perdomo |
| 2015/0269825 A1 | 9/2015 | Tran |
| 2015/0271899 A1 | 9/2015 | Bosua |
| 2015/0271900 A1 | 9/2015 | Wright |
| 2015/0285625 A1 | 10/2015 | Deane |
| 2015/0290453 A1 | 10/2015 | Tyler |
| 2015/0290454 A1 | 10/2015 | Tyler |
| 2015/0304797 A1 | 10/2015 | Rhoads |
| 2015/0311948 A1 | 10/2015 | Hui |
| 2015/0318892 A1 | 11/2015 | Hui |
| 2015/0319077 A1 | 11/2015 | Vasseur |
| 2015/0324568 A1 | 11/2015 | Publicover |
| 2015/0326570 A1 | 11/2015 | Publicover |
| 2015/0327260 A1 | 11/2015 | Hui |
| 2015/0333997 A1 | 11/2015 | Mermoud |
| 2015/0334031 A1 | 11/2015 | Vasseur |
| 2015/0338915 A1 | 11/2015 | Publicover |
| 2015/0341140 A1 | 11/2015 | Hui |
| 2015/0341275 A1 | 11/2015 | Hui |
| 2015/0350018 A1 | 12/2015 | Hui |
| 2015/0350727 A1 | 12/2015 | Gibbon |
| 2015/0358167 A1 | 12/2015 | Wang |
| 2015/0358525 A1 | 12/2015 | Lord |
| 2015/0359467 A1 | 12/2015 | Tran |
| 2015/0372903 A1 | 12/2015 | Hui |
| 2015/0373615 A1 | 12/2015 | Hampel |
| 2015/0381588 A1 | 12/2015 | Huang |
| 2016/0019279 A1 | 1/2016 | Sengupta |
| 2016/0019526 A1 | 1/2016 | Granbery |
| 2016/0020988 A1 | 1/2016 | Hui |
| 2016/0020997 A1 | 1/2016 | Hui |
| 2016/0021009 A1 | 1/2016 | Hui |
| 2016/0021010 A1 | 1/2016 | Vasseur |
| 2016/0021013 A1 | 1/2016 | Vasseur |
| 2016/0021018 A1 | 1/2016 | Hui |
| 2016/0021596 A1 | 1/2016 | Hui |
| 2016/0021599 A1 | 1/2016 | Fitzek |
| 2016/0021647 A1 | 1/2016 | Hui |
| 2016/0025500 A1 | 1/2016 | Hoffberg |
| 2016/0026542 A1 | 1/2016 | Vasseur |
| 2016/0028609 A1 | 1/2016 | Hui |
| 2016/0028750 A1 | 1/2016 | Di Pietro |
| 2016/0028751 A1 | 1/2016 | Cruz Mota |
| 2016/0028752 A1 | 1/2016 | Di Pietro |
| 2016/0028754 A1 | 1/2016 | Cruz Mota |
| 2016/0028755 A1 | 1/2016 | Vasseur |
| 2016/0028762 A1 | 1/2016 | Di Pietro |
| 2016/0028763 A1 | 1/2016 | Cruz Mota |
| 2016/0028764 A1 | 1/2016 | Vasseur |
| 2016/0035082 A1 | 2/2016 | King |
| 2016/0066788 A1 | 3/2016 | Tran |
| 2016/0080030 A1 | 3/2016 | Hui |
| 2016/0085999 A1 | 3/2016 | Oppenheimer |
| 2016/0098198 A1 | 4/2016 | Bosshart |
| 2016/0099872 A1 | 4/2016 | Kim |
| 2016/0110403 A1 | 4/2016 | Lomet |
| 2016/0110975 A1 | 4/2016 | Oppenheimer |
| 2016/0120432 A1 | 5/2016 | Sridhar |
| 2016/0132397 A1 | 5/2016 | Hui |
| 2016/0134161 A1 | 5/2016 | Hui |
| 2016/0134539 A1 | 5/2016 | Hui |

(56) References Cited

U.S. PATENT DOCUMENTS

| | | |
|---|---|---|
| 2016/0140834 A1 | 5/2016 | Tran |
| 2016/0142248 A1 | 5/2016 | Thubert |
| 2016/0149805 A1 | 5/2016 | Hui |
| 2016/0150501 A1 | 5/2016 | Hui |
| 2016/0154290 A1 | 6/2016 | Brown |
| 2016/0156450 A1 | 6/2016 | Hui |
| 2016/0167164 A9 | 6/2016 | Rosario |
| 2016/0173195 A1 | 6/2016 | Nielsen |
| 2016/0180384 A1 | 6/2016 | Ramer |
| 2016/0182121 A1 | 6/2016 | Shaffer |
| 2016/0196703 A1 | 7/2016 | Jean |
| 2016/0204917 A1 | 7/2016 | Lindh |
| 2016/0212740 A1 | 7/2016 | Hui |
| 2016/0224951 A1 | 8/2016 | Hoffberg |
| 2016/0225027 A1 | 8/2016 | Ramer |
| 2016/0234272 A1 | 8/2016 | Hui |
| 2016/0239653 A1 | 8/2016 | Loughlin-Mchugh |
| 2016/0239657 A1 | 8/2016 | Loughlin-Mchugh |
| 2016/0239658 A1 | 8/2016 | Loughlin-Mchugh |
| 2016/0241531 A1 | 8/2016 | Loughlin-Mchugh |
| 2016/0241532 A1 | 8/2016 | Loughlin-Mchugh |
| 2016/0242148 A1 | 8/2016 | Reed |
| 2016/0248661 A1 | 8/2016 | Dasgupta |
| 2016/0253342 A1 | 9/2016 | Ramer |
| 2016/0277201 A1 | 9/2016 | Thubert |
| 2016/0287166 A1 | 10/2016 | Tran |
| 2016/0294999 A1 | 10/2016 | Glezerman |
| 2016/0295062 A9 | 10/2016 | King |
| 2016/0299959 A1 | 10/2016 | Sankar |
| 2016/0302029 A1 | 10/2016 | Broadley |
| 2016/0330107 A1 | 11/2016 | Thubert |
| 2016/0357791 A1 | 12/2016 | Levandoski |
| 2016/0360965 A1 | 12/2016 | Tran |
| 2016/0373891 A1 | 12/2016 | Ramer |
| 2016/0373909 A1 | 12/2016 | Rasmussen |
| 2016/0379082 A1 | 12/2016 | Rodriguez |
| 2016/0380776 A1 | 12/2016 | Thubert |
| 2016/0381087 A1 | 12/2016 | Addepalli |
| 2017/0017837 A1 | 1/2017 | King |
| 2017/0034041 A1 | 2/2017 | Carofiglio |
| 2017/0054644 A1 | 2/2017 | Dasgupta |
| 2017/0054717 A1 | 2/2017 | Matsuda |
| 2017/0055130 A1 | 2/2017 | LeBlanc |
| 2017/0074652 A1 | 3/2017 | Send |
| 2017/0075778 A1 | 3/2017 | Heliker |
| 2017/0078170 A1 | 3/2017 | Vasseur |
| 2017/0099226 A1 | 4/2017 | Vasseur |
| 2017/0099684 A1 | 4/2017 | Hui |
| 2017/0126647 A1 | 5/2017 | Zhang |
| 2017/0132931 A1 | 5/2017 | Hoffberg |
| 2017/0140219 A1 | 5/2017 | King |
| 2017/0149639 A1 | 5/2017 | Vasseur |
| 2017/0163527 A1 | 6/2017 | Vasseur |
| 2017/0164264 A1 | 6/2017 | Kato |
| 2017/0180262 A1 | 6/2017 | Thubert |
| 2017/0187661 A1 | 6/2017 | Hui |
| 2017/0199818 A1 | 7/2017 | Lomet |
| 2017/0206512 A1 | 7/2017 | Hoffberg |
| 2017/0215028 A1 | 7/2017 | Rhoads |
| 2017/0228559 A1 | 8/2017 | Jackson |
| 2017/0232300 A1 | 8/2017 | Tran |
| 2017/0235931 A1 | 8/2017 | Publicover |
| 2017/0236407 A1 | 8/2017 | Rhoads |
| 2017/0237484 A1 | 8/2017 | Heath |
| 2017/0237669 A1 | 8/2017 | Hui |
| 2017/0251339 A1 | 8/2017 | Addepalli |
| 2017/0255769 A1 | 9/2017 | Loughlin-Mchugh |
| 2017/0257474 A1 | 9/2017 | Rhoads |
| 2017/0272361 A1 | 9/2017 | Speight |
| 2017/0289341 A1 | 10/2017 | Rodriguez |
| 2017/0295081 A1 | 10/2017 | Mermoud |
| 2017/0295226 A1 | 10/2017 | Basta |
| 2017/0302478 A1 | 10/2017 | Al-Gharaibeh |
| 2017/0324849 A1 | 11/2017 | Pfister |
| 2017/0347886 A1 | 12/2017 | Tran |
| 2017/0362585 A1 | 12/2017 | Wang |
| 2017/0364409 A1 | 12/2017 | Hui |
| 2017/0364746 A1 | 12/2017 | King |
| 2017/0373979 A1 | 12/2017 | Speight |
| 2018/0004743 A1 | 1/2018 | Shuman |
| 2018/0006833 A1 | 1/2018 | Tatlicioglu |
| 2018/0013630 A1 | 1/2018 | Tatlicioglu |
| 2018/0014241 A1 | 1/2018 | Perdomo |
| 2018/0020530 A1 | 1/2018 | Scordato |
| 2018/0025010 A1 | 1/2018 | Ramer |
| 2018/0035207 A1 | 2/2018 | Hsu |
| 2018/0049043 A1 | 2/2018 | Hoffberg |
| 2018/0054508 A1 | 2/2018 | Yamkovoy |
| 2018/0054667 A1 | 2/2018 | Yamkovoy |
| 2018/0054683 A1 | 2/2018 | Pedersen |
| 2018/0054771 A1 | 2/2018 | Rios Almanza |
| 2018/0054853 A1 | 2/2018 | Rios Almanza |
| 2018/0068358 A1 | 3/2018 | Hoffberg |
| 2018/0078843 A1 | 3/2018 | Tran |
| 2018/0083816 A1 | 3/2018 | Bolstad |
| 2018/0083862 A1 | 3/2018 | Thubert |
| 2018/0089419 A1 | 3/2018 | Loughlin-Mchugh |
| 2018/0096203 A1 | 4/2018 | King |
| 2018/0104141 A1 | 4/2018 | Shaw |
| 2018/0106640 A1 | 4/2018 | Padrones |
| 2018/0109954 A1 | 4/2018 | Henry |
| 2018/0115794 A1 | 4/2018 | Gibbon |
| 2018/0117446 A1 | 5/2018 | Tran |
| 2018/0117447 A1 | 5/2018 | Tran |
| 2018/0123802 A1 | 5/2018 | Graul |
| 2018/0124812 A1 | 5/2018 | Thubert |
| 2018/0139481 A1 | 5/2018 | Cross |
| 2018/0143275 A1 | 5/2018 | Sofka |
| 2018/0143281 A1 | 5/2018 | Sofka |
| 2018/0144467 A1 | 5/2018 | Sofka |
| 2018/0145841 A1 | 5/2018 | Thubert |
| 2018/0146007 A1 | 5/2018 | Cruz Mota |
| 2018/0152299 A1 | 5/2018 | Rossi |
| 2018/0152300 A1 | 5/2018 | Rossi |
| 2018/0152426 A1 | 5/2018 | Rossi |
| 2018/0153481 A1 | 6/2018 | Wagner |
| 2018/0165781 A1 | 6/2018 | Rodriguez |
| 2018/0168459 A1 | 6/2018 | Tran |
| 2018/0173906 A1 | 6/2018 | Rodriguez |
| 2018/0176017 A1 | 6/2018 | Rodriguez |
| 2018/0181964 A1 | 6/2018 | Zagarese |
| 2018/0184907 A1 | 7/2018 | Tran |
| 2018/0189352 A1 | 7/2018 | Ghafourifar |
| 2018/0189356 A1 | 7/2018 | Ghafourifar |
| 2018/0191860 A1 | 7/2018 | Ghafourifar |
| 2018/0198520 A1 | 7/2018 | Heath |
| 2018/0211395 A1 | 7/2018 | King |
| 2018/0217292 A1 | 8/2018 | Grosse-Puppendahl |
| 2018/0231660 A1 | 8/2018 | Deane |
| 2018/0233028 A1 | 8/2018 | Rhoads |
| 2018/0248995 A1 | 8/2018 | Rhoads |
| 2018/0262485 A1 | 9/2018 | Roth |
| 2018/0264347 A1 | 9/2018 | Tran |
| 2018/0268062 A1 | 9/2018 | Gilula |
| 2018/0293802 A1 | 10/2018 | Hendricks |
| 2018/0302312 A1 | 10/2018 | Hui |
| 2018/0302836 A1 | 10/2018 | Fitzek |
| 2018/0310222 A1 | 10/2018 | Hui |
| 2018/0316676 A1 | 11/2018 | Gilpin |
| 2018/0326291 A1 | 11/2018 | Tran |
| 2018/0329511 A1 | 11/2018 | Aman |
| 2018/0337860 A1 | 11/2018 | Kim |
| 2018/0343304 A1 | 11/2018 | Binder |
| 2018/0352014 A1 | 12/2018 | Alsina |
| 2018/0352581 A1 | 12/2018 | Segal |
| 2018/0373200 A1 | 12/2018 | Shi |
| 2018/0376368 A1 | 12/2018 | Shoji |
| 2019/0005953 A1 | 1/2019 | Bundalo |
| 2019/0007059 A1 | 1/2019 | Lagunas |
| 2019/0011521 A1 | 1/2019 | Sofka |
| 2019/0020530 A1 | 1/2019 | Au |
| 2019/0020712 A1 | 1/2019 | Basta |
| 2019/0033414 A1 | 1/2019 | Sofka |
| 2019/0033415 A1 | 1/2019 | Sofka |

(56) References Cited

U.S. PATENT DOCUMENTS

| | | |
|---|---|---|
| 2019/0035245 A1 | 1/2019 | Oppenheimer |
| 2019/0036900 A1 | 1/2019 | Zhang |
| 2019/0038133 A1 | 2/2019 | Tran |
| 2019/0057509 A1 | 2/2019 | Lv |
| 2019/0059041 A1 | 2/2019 | Francisco |
| 2019/0087656 A1 | 3/2019 | King |
| 2019/0109810 A1 | 4/2019 | Rapaport |
| 2019/0116544 A1 | 4/2019 | Glottmann |
| 2019/0117809 A1 | 4/2019 | Katz |
| 2019/0122266 A1 | 4/2019 | Ramer |
| 2019/0123820 A1 | 4/2019 | Heath |
| 2019/0146917 A1 | 5/2019 | Lomet |
| 2019/0154439 A1 | 5/2019 | Binder |
| 2019/0155122 A1 | 5/2019 | Brown |
| 2019/0156162 A1 | 5/2019 | King |
| 2019/0158176 A1 | 5/2019 | Heath |
| 2019/0173200 A1 | 6/2019 | Kuiper |
| 2019/0182415 A1 | 6/2019 | Sivan |
| 2019/0230207 A1 | 7/2019 | Cheng |
| 2019/0235933 A1 | 8/2019 | Levandoski |
| 2019/0243206 A1 | 8/2019 | Brown |
| 2019/0243207 A1 | 8/2019 | Brown |
| 2019/0253261 A1 | 8/2019 | Gero |
| 2019/0277970 A1 | 9/2019 | Deane |
| 2019/0278091 A1 | 9/2019 | Smits |
| 2019/0278983 A1 | 9/2019 | Iqbal |
| 2019/0297004 A1 | 9/2019 | Fenoglio |
| 2019/0297556 A1 | 9/2019 | Rios Almanza |
| 2019/0297670 A1 | 9/2019 | Shoji |
| 2019/0306124 A1 | 10/2019 | Bild |
| 2019/0307328 A1 | 10/2019 | Tran |
| 2019/0317749 A1 | 10/2019 | Hu |
| 2019/0320056 A1 | 10/2019 | Rhoads |
| 2019/0326986 A1 | 10/2019 | Heath |
| 2019/0334644 A1 | 10/2019 | Thubert |
| 2019/0342817 A1 | 11/2019 | Rios Almanza |
| 2019/0349728 A1 | 11/2019 | Oppenheimer |
| 2019/0358515 A1 | 11/2019 | Tran |
| 2019/0361917 A1 | 11/2019 | Tran |
| 2019/0362610 A1 | 11/2019 | Oppenheimer |
| 2019/0363951 A1 | 11/2019 | Vasseur |
| 2019/0363976 A1 | 11/2019 | Thubert |
| 2019/0387104 A1 | 12/2019 | Yssa |
| 2019/0387152 A1 | 12/2019 | Sivan |
| 2020/0015146 A1 | 1/2020 | Francisco |
| 2020/0020171 A1 | 1/2020 | Hendricks |
| 2020/0020356 A1 | 1/2020 | Smith |
| 2020/0026141 A1 | 1/2020 | Brown |
| 2020/0026741 A1 | 1/2020 | Gilula |
| 2020/0052997 A1 | 2/2020 | Ramanathan |
| 2020/0064458 A1 | 2/2020 | Giusti |
| 2020/0077892 A1 | 3/2020 | Tran |
| 2020/0082198 A1 | 3/2020 | Yao |
| 2020/0101981 A1 | 4/2020 | Phillips |
| 2020/0106552 A1 | 4/2020 | Paycher |
| 2020/0110170 A1 | 4/2020 | Chandra |
| 2020/0111028 A1 | 4/2020 | Mermoud |
| 2020/0116893 A1 | 4/2020 | Grosse-Puppendahl |
| 2020/0119921 A1 | 4/2020 | Rodriguez |
| 2020/0127988 A1 | 4/2020 | Bradley |
| 2020/0151206 A1 | 5/2020 | Balakavi |
| 2020/0182995 A1 | 6/2020 | Zeng |
| 2020/0187018 A1 | 6/2020 | Hoffberg |
| 2020/0192388 A1 | 6/2020 | Zhang |
| 2020/0193640 A1 | 6/2020 | Mathy |
| 2020/0195833 A1 | 6/2020 | Sivan |
| 2020/0219378 A1 | 7/2020 | Farrand |
| 2020/0220746 A1 | 7/2020 | Shribman |
| 2020/0221487 A1 | 7/2020 | Lee |
| 2020/0225673 A1 | 7/2020 | Ebrahimi Afrouzi |
| 2020/0232815 A1 | 7/2020 | Padrones |
| 2020/0244357 A1 | 7/2020 | Heath |
| 2020/0259416 A1 | 8/2020 | Yamkovoy |
| 2020/0264310 A1 | 8/2020 | Le Dortz |
| 2020/0264311 A1 | 8/2020 | Le Dortz |
| 2020/0281480 A1 | 9/2020 | Tran |
| 2020/0284883 A1 | 9/2020 | Ferreira |
| 2020/0285464 A1 | 9/2020 | Brebner |
| 2020/0285788 A1 | 9/2020 | Brebner |
| 2020/0285855 A1 | 9/2020 | Brebner |
| 2020/0285912 A1 | 9/2020 | Brebner |
| 2020/0285977 A1 | 9/2020 | Brebner |
| 2020/0286505 A1 | 9/2020 | Osborne |
| 2020/0287834 A1 | 9/2020 | Ramanathan |
| 2020/0287898 A1 | 9/2020 | Weaver |
| 2020/0296001 A1 | 9/2020 | She |
| 2020/0309930 A1 | 10/2020 | Zhou |
| 2020/0320776 A1 | 10/2020 | Doyle |
| 2020/0333426 A1 | 10/2020 | Dupray |
| 2020/0341095 A1 | 10/2020 | Sofka |
| 2020/0344084 A1 | 10/2020 | Shribman |
| 2020/0356618 A1 | 11/2020 | Shribman |
| 2020/0358636 A1 | 11/2020 | Shribman |
| 2020/0358858 A1 | 11/2020 | Shribman |
| 2020/0358872 A1 | 11/2020 | Shribman |
| 2020/0358879 A1 | 11/2020 | Shribman |
| 2020/0359296 A1 | 11/2020 | Dugaev |
| 2020/0363241 A1 | 11/2020 | Anderson |
| 2020/0363815 A1 | 11/2020 | Mousavian |
| 2020/0379079 A1 | 12/2020 | Dupray |
| 2020/0384264 A1 | 12/2020 | Tyler |
| 2020/0387896 A1 | 12/2020 | Tran |
| 2020/0389429 A1 | 12/2020 | Shribman |
| 2020/0394246 A1 | 12/2020 | Shribman |
| 2020/0409376 A1 | 12/2020 | Ebrahimi Afrouzi |
| 2020/0412691 A1 | 12/2020 | Shribman |
| 2021/0012282 A1 | 1/2021 | Smith |
| 2021/0018604 A1 | 1/2021 | Barber |
| 2021/0019143 A1 | 1/2021 | Landman |
| 2021/0021570 A1 | 1/2021 | Shribman |
| 2021/0029038 A1 | 1/2021 | Zhang |
| 2021/0029080 A1 | 1/2021 | Shribman |
| 2021/0029184 A1 | 1/2021 | Alsina |
| 2021/0029653 A1 | 1/2021 | Zhang |
| 2021/0034386 A1 | 2/2021 | Ghafourifar |
| 2021/0044781 A1 | 2/2021 | Neshumov |
| 2021/0058367 A1 | 2/2021 | Shribman |
| 2021/0067577 A1 | 3/2021 | Shribman |
| 2021/0072370 A1 | 3/2021 | Giusti |
| 2021/0081752 A1 | 3/2021 | Chao |
| 2021/0089040 A1 | 3/2021 | Ebrahimi Afrouzi |
| 2021/0105668 A1 | 4/2021 | Thubert |
| 2021/0109974 A1 | 4/2021 | Shekhar |
| 2021/0112154 A1 | 4/2021 | Rodriguez |
| 2021/0112391 A1 | 4/2021 | Livano |
| 2021/0113099 A1 | 4/2021 | Rogers |
| 2021/0117214 A1 | 4/2021 | Presant |
| 2021/0117479 A1 | 4/2021 | Liu |
| 2021/0117623 A1 | 4/2021 | Aly |
| 2021/0117624 A1 | 4/2021 | Aghajanyan |
| 2021/0117661 A1 | 4/2021 | Iqbal |
| 2021/0117681 A1 | 4/2021 | Poddar |
| 2021/0117712 A1 | 4/2021 | Huang |
| 2021/0117780 A1 | 4/2021 | Malik |
| 2021/0118440 A1 | 4/2021 | Peng |
| 2021/0118442 A1 | 4/2021 | Poddar |
| 2021/0119955 A1 | 4/2021 | Penov |
| 2021/0120206 A1 | 4/2021 | Liu |
| 2021/0126642 A1 | 4/2021 | Cheadle |
| 2021/0127415 A1 | 4/2021 | Lee |
| 2021/0133272 A1 | 5/2021 | Shribman |
| 2021/0133568 A1 | 5/2021 | Voelker |
| 2021/0134286 A1 | 5/2021 | Burton |
| 2021/0144015 A1 | 5/2021 | Rossi |
| 2021/0144517 A1 | 5/2021 | Guim Bernat |
| 2021/0149266 A1 | 5/2021 | Brown |
| 2021/0150736 A1 | 5/2021 | Lv |
| 2021/0166159 A1 | 6/2021 | Rubenstein |
| 2021/0181674 A1 | 6/2021 | Huang |
| 2021/0182422 A1 | 6/2021 | Basu |
| 2021/0183406 A1 | 6/2021 | Rogers |
| 2021/0186329 A1 | 6/2021 | Tran |
| 2021/0192582 A1 | 6/2021 | Hoffberg |
| 2021/0193179 A1 | 6/2021 | Smith |

(56) References Cited

U.S. PATENT DOCUMENTS

| | | |
|---|---|---|
| 2021/0195457 A1 | 6/2021 | Kim |
| 2021/0200830 A1 | 7/2021 | Shribman |
| 2021/0207974 A1 | 7/2021 | Zhou |
| 2021/0218538 A1 | 7/2021 | Myung |
| 2021/0218714 A1 | 7/2021 | Wang |
| 2021/0224658 A1 | 7/2021 | Mathew |
| 2021/0232015 A1 | 7/2021 | Brown |
| 2021/0234719 A1 | 7/2021 | Shribman |
| 2021/0234720 A1 | 7/2021 | Shribman |
| 2021/0234721 A1 | 7/2021 | Shribman |
| 2021/0241607 A1 | 8/2021 | Rhoads |
| 2021/0243671 A1 | 8/2021 | Paillet |
| 2021/0248090 A1 | 8/2021 | Martin |
| 2021/0255294 A1 | 8/2021 | Barber |
| 2021/0256825 A1 | 8/2021 | Oppenheimer |
| 2021/0274526 A1 | 9/2021 | Shin |
| 2021/0282736 A1 | 9/2021 | Stamatopoulos |
| 2021/0286618 A1 | 9/2021 | Landman |
| 2021/0287430 A1 | 9/2021 | Li |
| 2021/0298049 A1 | 9/2021 | Myung |
| 2021/0307036 A1 | 9/2021 | Myung |
| 2021/0314523 A1 | 10/2021 | Kamisetty |
| 2021/0314925 A1 | 10/2021 | Shin |
| 2021/0319192 A1 | 10/2021 | Rodriguez |
| 2021/0342890 A1 | 11/2021 | Ramer |
| 2021/0352690 A1 | 11/2021 | Shin |
| 2021/0358193 A1 | 11/2021 | Oz |
| 2021/0358194 A1 | 11/2021 | Oz |
| 2021/0358195 A1 | 11/2021 | Oz |
| 2021/0358227 A1 | 11/2021 | Oz |
| 2021/0360195 A1 | 11/2021 | Oz |
| 2021/0360196 A1 | 11/2021 | Oz |
| 2021/0360197 A1 | 11/2021 | Oz |
| 2021/0360198 A1 | 11/2021 | Oz |
| 2021/0360199 A1 | 11/2021 | Oz |
| 2021/0360673 A1 | 11/2021 | Myung |
| 2021/0367804 A1 | 11/2021 | Shribman |
| 2021/0367878 A1 | 11/2021 | Ramanathan |
| 2021/0367889 A1 | 11/2021 | Ramanathan |
| 2021/0374547 A1 | 12/2021 | Wang |
| 2021/0392175 A1 | 12/2021 | Gronau |
| 2021/0392231 A1 | 12/2021 | Gronau |
| 2021/0392295 A1 | 12/2021 | Gronau |
| 2021/0392296 A1 | 12/2021 | Rabinovich |
| 2021/0400235 A1 | 12/2021 | Kamisetty |
| 2021/0407229 A1 | 12/2021 | Schoenfelder |
| 2021/0409234 A1 | 12/2021 | Behar |
| 2022/0044233 A1 | 2/2022 | Gaddam |
| 2022/0045997 A1 | 2/2022 | Gaddam |
| 2022/0114578 A1 | 4/2022 | Jentzsch |
| 2022/0116214 A1 | 4/2022 | Jentzsch |
| 2022/0207053 A1 | 6/2022 | Mankad |
| 2022/0270088 A1 | 8/2022 | Gaddam |
| 2022/0303251 A1 | 9/2022 | Wang |

FOREIGN PATENT DOCUMENTS

| | | |
|---|---|---|
| EP | 3095252 | 11/2016 |
| WO | WO2015109002 | 7/2015 |
| WO | WO2019114531 | 6/2019 |

\* cited by examiner

BLUETOOTH ENABLED INTERCOM WITH HEARING AID FUNCTIONALITY

CROSS REFERENCE TO RELATED APPLICATIONS

The present application is a non-provisional of, and claims benefit of priority under 35 U.S.C. § 119 (e) from U.S. Patent Application No. 63/295,928, filed Jan. 2, 2022, the entirety of which is expressly incorporated herein by reference.

TECHNICAL FIELD OF THE INVENTION

The present invention relates generally to intercom aid devices, more particularly to hearing aids with voice inter-communication ("intercom").

INCORPORATION BY REFERENCE AND INTERPRETATION OF LANGUAGE

Citation or identification of any reference herein, in any section of this application, shall not be construed as an admission that such reference is necessarily available as prior art to the present application. The disclosures of each reference disclosed herein, whether U.S. or foreign patent literature, or non-patent literature, are hereby incorporated by reference in their entirety in this application, and shall be treated as if the entirety thereof forms a part of this application.

All cited or identified references are provided for their disclosure of technologies to enable practice of the present invention, to provide basis for claim language, and to make clear applicant's possession of the invention with respect to the various aggregates, combinations, and subcombinations of the respective disclosures or portions thereof (within a particular reference or across multiple references). The citation of references is intended to be part of the disclosure of the invention, and not merely supplementary background information. The incorporation by reference does not extend to teachings which are inconsistent with the invention as expressly described herein (which may be treated as counter examples), and is evidence of a proper interpretation by persons of ordinary skill in the art of the terms, phrase and concepts discussed herein, without being limiting as the sole interpretation available.

The present specification is not to be interpreted by recourse to lay dictionaries in preference to field-specific dictionaries or usage. Where a conflict of interpretation exists, the hierarchy of resolution shall be the express specification, references cited for propositions, incorporated references, the inventors' prior publications, the scrivener's prior publications relating to the field, academic literature in the field, commercial literature in the field, field-specific dictionaries, lay literature in the field, general purpose dictionaries, and common understanding. Where the issue of interpretation of claim amendments arises, the hierarchy is modified to include arguments made during the prosecution and accepted without retained recourse.

BACKGROUND OF THE INVENTION

About 18 percent of adults aged 20-69 have speech-frequency hearing loss in both ears from among those who report 5 or more years of exposure to very loud noise at work, as compared to 5.5 percent of adults with speech-frequency hearing loss in both ears who report no occupational noise exposure (Hoffman H J, Dobie R A, Losonczy K G, Themann C L, Flamme G A. Declining Prevalence of Hearing Loss in US Adults Aged 20 to 69 Years. JAMA Otolaryngology-Head & Neck Surgery. December 2016 online). One in eight people in the United States (13 percent, or 30 million) aged 12 years or older has hearing loss in both ears, based on standard hearing examinations (Lin F R, Niparko J K, Ferrucci L. Hearing loss prevalence in the United States [Letter] Arch Intern Med. 2011 Nov. 14; 171 (20): 1851-1852). While, based on one another calculation, about 2 percent of adults aged 45 to 54 have disabling hearing loss. The rate increases to 8.5 percent for adults aged 55 to 64. Nearly 25 percent of those aged 65 to 74 and 50 percent of those who are 75 and older have disabling hearing loss According to one state, about 28.8 million U.S. adults could benefit from using hearing aids. (NIDCD Epidemiology and Statistics Program based on December 2015 Census Bureau estimates of the non-institutionalized U.S. population, personal communication; May 2016). 28.5 percent of hearing impaired Americans uses hearing aids. Among adults aged 70 and older with hearing loss that could benefit from hearing aids, fewer than one in three (30 percent) has ever used them. (Based on calculations by NIDCD Epidemiology and Statistics Program staff. See www.nidcd.nih.gov/health/statistics/quick-statistics-hearing #6).

The hearing aid devices normally include at least one microphone to transduce sound signals surrounding s user. But, the sound intensity in such conventional hearing aid devices significantly decreases with increase in distance. It has been demonstrated that listeners wearing the hearing aid should be no more than 1.8 meters away from the signal of interest for optimal speech intelligibility. Therefore, when hearing impaired people are in a domestic environment, and wearing hearing aids, communication difficulties may persist.

The intelligibility of a signal of interest may further diminish when environmental noise and reverberation is present in the background of the hearing impaired listeners. Hearing impaired couple people living together have to be within a specific range to listen to each. This makes communication challenging even though they are in close proximity.

Further, conventional hearing aids are not effective in communication in a scenario when a couple or a group of people are travelling and need to be in continuous communication with each other.

Hearing aids are known with Bluetooth connectivity, and which can pair with a Bluetooth telephone. Hearing aids have limited or absent user interfaces, and therefore from a user perspective, the Bluetooth compatible hearing aid must simply pair with the phone, automatically answer and terminate a call.

Similar problem may be faced by a group of bikers travelling together communicating to each other while riding the motorcycles and wearing helmets. The group of bikers may require being in continuous communication to give directions to each other or provide essential information about their well being in order to avoid any accidents. The helmets may prevent the biker in communicating easily with each other. The conventional intercoms present in the market to allow communication while wearing a helmet provide both short range intercom and connectivity to Bluetooth host devices such as smartphones. See, www.fodsports.com/fx6-intercom/

US20180035207 describes a hearing aid headphone intercom system is provided which includes one primary headphone, at least one secondary headphone and a terminal device. The primary headphone is disposed with a first Bluetooth module, a first ISM (Industrial Scientific Medical) module, a first microphone set, and a first wired connection module. The secondary headphone is arranged with a second Bluetooth module, a second ISM (Industrial Scientific Medical) module, and a second microphone set. The secondary headphone is connected to the primary headphone by the second ISM module while the terminal device is connected to either the primary headphone or the secondary headphone by a third Bluetooth module or an input cable. Audio signals received by the primary headphone are shared with the secondary headphone. Users of the primary headphone and the secondary headphone can interact with each other.

U.S. Pat. No. 9,712,662 discloses a method of extending an intercom communication range in which during the pairing process between a first headset communication device and a second headset communication device, cellular related parameters are provided and stored in a memory module of each headset communication device. The parameters include common Bluetooth required parameters, such that the cellular related parameters of the first headset including cellular phone number associated with the second headset and vice versa. An intercom communication between both headsets is established via a Bluetooth channel and in case of intercom communication loss at said Bluetooth channel or unavailable Bluetooth link during said intercom communication, the intercom communication is temporarily routed to an alternate cellular communication channel by initiating a cellular call using the stored cellular phone number of the second headset.

US20150201060 describes a wireless Bluetooth apparatus with intercom and broadcasting functions, and an associated operating method in which the wireless Bluetooth apparatus receives a voice message from a first user, divides it into a first partial voice message and a second partial voice message, and transmits them to a first electronic apparatus corresponding to the wireless Bluetooth apparatus through wireless Bluetooth technology. The first electronic apparatus uses a communication application program to transmit the second partial voice message to a second electronic apparatus corresponding to a second user corresponding to the first partial voice message. The second electronic apparatus uses the communication application program to receive the second partial voice message and transmits the second partial voice message to another wireless Bluetooth apparatus corresponding to the second electronic apparatus through wireless Bluetooth technology. Voice recognition is discussed. See also U.S. Pat. No. 9,363,358; and TW 1519087.

US20150148100 describes intercom handset for cellular phones and smartphones with e.m.f. shield with a ferritic layer for shielding against the electromagnetic field or e.m.f. emitted by mobile phone devices. The intercom handset can be rapidly inserted onto the cellular phone and used directly connected to the latter by means of an extensible and retractable cable, contained inside its body, or by means of a Bluetooth connection. The intercom handset can also be used separated from the phone, by means of said extensible and retractable cable, contained inside its body, or by means of a wireless connection by means of the built-in Bluetooth module, whose battery is charged by means of an inductive load system that charges the battery of the built-in Bluetooth module, using the radio transmission energy of the cellular phone or smartphone, normally dispersed in the air during the periodic search for the cellular transmission network and during the telephone conversation.

US 2018/0054683 discusses a body worn hearing system comprises a hearing device, e.g. a hearing aid, and a separate microphone unit for picking up a voice of the user. The hearing device comprises a forward path comprising an input unit for providing an electric input signal representative of sound in the environment, a signal processing unit for providing a processed signal, and an output unit for generating stimuli perceivable as sound when presented to the user based on said processed signal. The microphone unit comprises a multitude M of microphones, and a multi-input noise reduction system for providing an estimate § of a target signal s comprising the user's voice, and comprising a multi-input beamformer filtering unit operationally coupled to said multitude of microphones. The hearing device and the microphone unit are configured to receive and transmit an audio signal from/to a communication device, respectively, and for establishing a communication link between them for exchanging information. The hearing system comprises a control unit configured to estimate a current distance between the user's mouth and the microphone unit, and to control the multi-input noise reduction system in dependence of said distance.

WO2019/114531 provides a Bluetooth chip having a hearing aid function, and a Bluetooth headset. The Bluetooth chip comprises a chip main body, an audio interface module being integrated in the chip main body, the audio interface module comprising an audio input unit and an audio output unit, the audio input unit being connected to a microphone, and the audio output unit being connected to a receiver, characterized in that the chip main body is further internally integrated with a hearing aid module connected to the audio interface module, the hearing aid module receiving an audio signal inputted by the audio input unit, performing hearing aid processing, and then returning same to the audio output unit. The present invention solves the drawbacks in the prior art that a Bluetooth chip and a hearing-aid chip of a Bluetooth hearing-aid headset need to work independently or to work by means of an app on a mobile phone.

U.S. Pat. No. 9,520,042 describes a smoke detector has enhanced audio and communications capabilities that allow audio content to be provided at each smoke detector location. This audio content may be music, intercom, doorbell actuation and radio programs. The smoke detector may also include a microphone for monitoring and two way communications between two or more smoke detectors, a intercom panel at a doorbell location, controlling lights in an area of the smoke detector with voice commands, and further providing for speakerphone answering and communications capabilities. Audio content and control may be provided to the smoke detector with a software program application running on a personal computer, tablet computer and a smart cell phone. A smoke detector may further be controlled with a Bluetooth or infrared handheld controller located in an area proximate to the smoke detector.

U.S. Pat. No. 10,242,565 describes examples of systems and methods of wireless remote control of appliances using a hearing device, for example upon manual activation of a switch placed in the concha cavity behind the tragus. In some examples, the hearing device includes one or more manually activated switches, a wireless antenna, and a battery cell. In some examples, the wireless electronics include low energy Bluetooth capability. The appliance may be any device with wireless control capability, for example an electronic lock, a thermostat, an electronic lighting, a telephone, a kitchen appliance, a medical alert system, a television, a medical device, and a smart glass.

US20100285750 describes a wireless audio stereo and intercom system in which standard Bluetooth wireless audio features are extended to provide full wireless stereo headset capabilities, and maintain backward compatibility with standard Bluetooth devices. The system is a full duplex, high fidelity, low latency, two-way digital wireless audio headset with microphone intercom communication system that deploys custom programmed Bluetooth radio transceiver devices.

US20060244825 describes a multi-function communication and navigation system including a GPS and MCU module, a memory module, a sensor module, a power module, a HUD module, an audio input/output module and a Bluetooth module. The system can be a recorder for recording relevant mobile information in the memory module. The HUD module can project relevant information such as velocity, direction, time, date etc. onto a display area. Moreover, the communication message can be transformed into audible sounds for broadcasting, so that the system can be a wireless intercom device for communicating with other systems. Moreover, when a sensor module of the system receives a vibrating message such as a collision message, the system can automatically dial an emergency number and provide relevant location information via the Bluetooth module.

U.S. Pat. No. 10,284,703 discloses a portable full duplex intercom system using Bluetooth and in particular to a portable full duplex intercom system using Bluetooth that may be used in a vehicle to allow the people in the vehicle to communicate with each other.

U.S. Pat. No. 6,405,027 discloses a mobile communication handset which is configured for communicating by a cellular or PCS or cordless call over a first wireless link to a base station, and is also configured for communicating with one or more other communication devices over other respective wireless direct device-to-device second links implemented by the Bluetooth Intercom Profile, is provided with functionality to carry on a group call by appropriately combining speech signals carried by the various links and by the handset. The first wireless link may be a cordless link which is implemented by the Bluetooth Telephony Profile. Alternatively, the first link may also be configured as wireless direct device-to-device link, in which case all wireless links involved in the group call are implemented by the Bluetooth Intercom Profile.

CN 110708615 discloses an intercom system and an intercom method realized based on TWS earphones, the system comprises a mobile terminal and the TWS earphones, the TWS earphones comprise a left earphone and a right earphone, the left earphone and the right earphone are respectively provided with a first Bluetooth module, a loudspeaker, a microphone and a key, the mobile terminal is provided with a wireless communication module, an intercom object setting module, a noise reduction module and a main control module, and the wireless communication module comprises a second Bluetooth module. The method comprises the following steps: 1) the TWS earphone is connected with the mobile terminal through Bluetooth; 2) setting a target earphone through a talkback object setting module; 3) pressing a key, and sending recording request information to the mobile terminal; 4) a main control module of the mobile terminal determines to send the earphone; 5) recording by a microphone to obtain a first audio frequency; 6) the noise reduction module performs noise reduction processing on the first audio to obtain a second audio; 7) the target earpiece plays the first audio and the second audio. The invention can reduce the cost of talkback and improve the quality of talkback. Voice recognition at a server is disclosed.

U.S. Pat. No. 10,028,357 discloses a networked light for illumination and intercom for communications in a single housing, with voice command and control, hands-free. The system in a housing configured to conventional looking lamp, bulb, fixture, lighting devices, suitable for a direct replacement of conventional illuminating devices typical found in homes or buildings. A network of such voice command and control systems may be further monitored and controlled from a base station that facilitates programming, communications, and higher functionality therebetween. The system provides speech recognition for powering on and off, dimming, brightening, and adjusting the lighting to preset, night and emergency settings. The voice recognition command controls the intercom to be active and attentive to requests, connecting two or more locations within a home or building structure, for speech exchanges in communications, via radio frequency transmitting and receiving of signal messages between the individual light and intercom system devices within a network of devices.

EP-3095252 and WO 2015109002 disclose a universal wearable computing device relates to a hearing assistance system, device, method, and apparatus that provide a discreet approach to user hearing assistance, without relying on a conventional hearing aid. The hearing assistance system and the requisite electronics may be incorporated into frames that also function as eyeglasses with earphone(s) that may be connected to the frame to assist user hearing. An earphone may be configured with minimal electronics, such that a power source enable sound transmissions to the ear, is provided by a connection to the frame of the eyeglasses. In another example, the earphone is configured without any electronics and sound is transmitted to the user/listener's ear(s) via a psychoacoustic system. The sound quality of the transmissions to the earphones may be optimized using a tuning/equalizer application operating from a computing device, such as an app on a mobile device. The tuning/equalizer application can be used by the user/listener to optimize volume input levels to the earphone(s).

The Dialog Semiconductor DA14585 provides Bluetooth® low energy 5.0 SoC with Audio Interface for use e.g., in remote controls.

The Qualcomm QCS 403, ACS 404, QCS405 and QCS407 provide Bluetooth processors with audio functions (and in advanced versions, video), including key-phrase detection.

The TI CC13x) and CC26x0 SimpleLink™ Wireless MCU, e.g., CC2640R2L provides an ARM Cortex-M processor with Bluetooth radio.

The Ambiq Apollo 2, 3, 4 (and plus versions), e.g., Apollo 3 Blue SoC, provide Bluetooth functionality with always-on keyword spotting or "Voice-on-SPOT (VOS)". The Vesper VM3011 is a MEMS microphone which draws 10 pA when in "wake on sound" mode. The processor is an ARM Cortex M4 with FPU and BLE 5. The core hardware for a voice command interface consists of a microphone array, and a processor that can receive, and interpret the audio signals from the microphones. Depending on the type of device, various other components may be needed, such as a wireless interface for Blue-tooth Low Energy or Wi-Fi, plus speakers, amplifiers, LEDs, and displays to provide user feedback. See, Paul Beckmann, Aaron Grassian, Matt Crowley, White Paper "Advancing Always-On Voice Command Systems with Ultra-Low Power Solutions" Ambiq (2020).

Although it is possible to use a single microphone in a voice command product, most such products use a beamforming array of two to seven microphones to isolate the speaker from ambient noise better. The array allows the audio processor to focus the pickup pattern of the microphones on the user's voice, which improves the signal-to-noise ratio of the user's voice relative to the surrounding environmental noise. However, the demands placed by the form factors of portable and battery-powered products present many challenges not found in products designed to be plugged in.

The DSP Concepts white paper, "Designing Optimized Microphone Beamformers," found that achieving the best possible signal-to-noise ratio is critical to the accuracy, and reliability of a voice command product. The white paper also found that using microphones with tighter sensitivity tolerances could help performance by using microphones with ±1 dB tolerance, rather than the more typical ±3 dB. Since each microphone in an array may be in a different acoustical environment, due to the product's physical design, it is better to match the processor's microphone sensitivity rather than in the microphones themselves. DSP Concepts' research demonstrated that increasing the number of microphones improves voice user interface (UI) reliability. The more closely matched the sensitivity of the microphones are, the better the performance of the beamformer. The more closely matched the sensitivity of the microphones are, the better the performance of the beamformer. The most practical way to achieve this is to balance the microphone sensitivity in the hardware after the microphones are installed. This way, the sensitivity adjustment compensates not only for the differing gain of the mics, typically specified to a precision of ±3 dB, but also for the acoustical effects of the enclosure on the microphones. However, few portable products and almost no wearables have the space for such an array. True wireless earphones, for example, typically have room for only two mics in each earpiece with available microphone spacing of only 10 to 20 mm between the microphone pair. Also, the processing power required for such an array may be beyond the capabilities of the relatively small processors used in most portable devices. Therefore, software algorithms that perform beamforming and other voice UI optimization functions, must have the capability of being optimized for two or at most three microphones.

A piezoelectric microphone element in the VM3011, is monitored by a very low-power analog circuit, which monitors and tracks the ambient sound level to activate the system only when a sound is detected above the background noise. A WoS (Wake On Sound) threshold allows optimizing the VM3011 for the best performance in a variety of noise environments. A Passband-filter helps to narrow the selection of specific sounds of interest, between 200 Hz and 8 KHz, to pick up human voices better and reject environmental noises such as machinery rumbles, and wind noise. This circuit is known as "Adaptive ZPL." A single piezoelectric microphone can trigger the microphone array, audio processing circuitry, and Internet connection (if applicable) of a voice command product.

In any voice-command product, the audio processor-whether a dedicated Digital Signal Processor (DSP) or a processing core within an SoC-must have the necessary computational capability to process the signals from all of the microphones in an array, and to run all of the algorithms necessary for voice recognition. The audio processor must be able to process the signals from all the microphones, and run all the voice-recognition algorithms. The more advanced algorithms and the more microphones the chip can accommodate, the better the signal-to-noise ratio, and the more accurate the voice recognition is. In portable and battery-powered products, however, the processor must also consume as little power as possible to maintain adequate battery life in the product.

One processor line, explicitly designed to handle substantial audio processing tasks in battery-powered products with small form factors, and battery power is Ambiq's Apollo line. These microcontroller units (MCUs) and systems-on-a-chip (SoCs) are designed using Ambiq's SPOT (Subthreshold Power Optimized Technology) platform, which allows them to run on less than $\frac{1}{10}$th of the current of a typical audio processor.

Ambiq's SPOT-based Apollo2 is a 48 MHz Arm® Cortex® M4F-based MCU focused on sensor and voice processing that consumes only 10 uA/MHz. Apollo2 Blue is available with a Bluetooth Low Energy channel for voice assistants. Apollo3 Blue further lowers power to 6 uA/MHz and increases frequency to 96 MHz. Its Blue-tooth Low Energy radio is 5.0 compliant. The Apollo2, Apollo2 Blue, Apollo3 Blue, and Apollo3 Blue Plus processors are capable of handling signals from multi-microphone arrays using DSP Concept's Voice UI algorithms, making them appropriate for ultra-low-power hearable, wearable, remote control, and other mobile applications. All of these processors have the compact size needed for products such as bands, smartwatches, and earbuds, and they measure from 2.5 mm, to 5.3 mm square depending on the package.

Beyond the microphone array and audio processor, a voice command product includes additional components. Specific components depend on the application and form factor, but there are a few that almost every voice command product uses. As with the microphones and processors, these components must be chosen not only for their functions and performance, but also for their small size and low power consumption.

Voice command products typically send and receive data from external servers (by accessing the Internet) to offer additional capabilities. Smart speakers designed for home use connect through Wi-Fi to a LAN. With portable voice-command products, the connection occurs through Bluetooth or BLE (Bluetooth Low Energy) to a smartphone or tablet, which then connects to the Internet through a cellular data network or Wi-Fi. Voice command products send and receive data from external servers to offer more than the most basic capabilities.

Most voice command products incorporate some form of user feedback to: confirm that the device is active, heard and understood the user's command correctly, and that it carried out the desired action. These devices can be LEDs, such as the flashing lights atop the Amazon Echo and Google Home smart speakers. They can also be alphanumeric or graphical displays, which may be found on many remotes, and home automation wall panels.

These devices typically have audio feedback as well, which may confirm the user's command through alert tones or voice synthesis-yet another load placed on the processor. The unit employs an amplifier and a speaker of some sort to reproduce the voice, and sometimes alert tones. Some products may even use multiple drivers with a beamforming algorithm to direct the response back at the listener.

There are many different algorithms at work in always-on voice command products, all of which must be tuned to suit the product's design and application. These algorithms must listen for the wake word 24/7/365, isolate the user's voice from the surrounding noise when a voice is detected, and then produce a clean signal for the wake-word detection engine to recognize the wake word reliably. Typically, a Vesper Adaptive ZPL monitors the signal from a single microphone. When the signal level exceeds a certain threshold-such as when a user speaks the wake word—the microphone sends a signal to power up the rest of the system, it is critical in portable products because it allows the shutdown of other components to save power. When a microphone's signal level exceeds a certain threshold, a comparator sends a command to boot up the rest of the system. This function must also occur quickly so that the system can receive the wake word. For example, with the Vesper microphone, the microphone wakes up within 200 ps, much less than the time it takes to utter the first letter in any keyword. Therefore, no audio buffer is needed.

To implement voice detection in noisy environments, such as a typical household, Vesper has designed "Adaptive ZPL." The user can program this ultra-low-power analog circuit through I2C. Adaptive ZPL configuration can be changed on the fly, and it is easy to use, therefore integrating with any application processors with available PDM and I2C interfaces. The adaptive ZPL circuit filters out unwanted sounds or noise outside of the user-programmed audio band filter. Meanwhile, it latches a DOUT pin only when a sound is detected above the user-programmed WoS threshold. In the Adaptive ZPL, the WoS threshold continuously traces and follows the RMS background noise with a refresh rate of 0.5 sec/1 sec (also user programmable), which drastically reduces false rejects.

Because voice command products use multiple microphones, the primary factors in microphone selection for these products are usually size, cost, and quality. However, in portable and battery-powered products, lowering the system power consumption becomes essential. For a microphone array to focus on a user's voice, it must first determine where the user is relative to the product. The microphone array must also include precedence logic that rejects reflections of the user's voice from nearby objects. It must also adjust its operating threshold to compensate for ambient noise level, so environmental noise does not create false directional cues. Determining the direction of arrival may not be necessary for products such as earphones, in which the physical position of the user's mouth relative to the microphone array is already known.

A microphone array can process the signals from multiple microphones so that the array becomes directional. It accepts sounds coming from the determined direction of arrival while rejecting sounds coming from other directions. With some products, such as earphones and automotive audio systems, the direction of the user's voice relative to the microphone array is known, so the beamformer's direction may be permanently fixed. In devices such as smart speakers, remote controls, and home automation wall panels, the beamformer's desired direction of focus has to be determined, and the response of the array adjusts to focus in the direction of the user.

Acoustic echo canceling (AEC) rejects the sounds (such as music or announcements) coming from the device itself so that the microphone array can pick up the user's voice more clearly. Because the original signal and the response of the device's internal speaker are known, the device knows to reject the signal that comes back through the microphone. AEC rejects the sounds coming from the device itself so that the microphone array can pick up the user's voice more clearly. Selecting microphones with a high overload point, and minimizing the speaker distortion in the playback path, is crucial to achieving excellent AEC performance. This, in turn, results in a better music barge—in performance, particularly when playing low-frequency content at loud playback. DSP Concepts stereo AEC algorithms cancel out 35 dB of echo during music barge, which results in high wake word detection accuracies and improved user experience.

AEC is typically not necessary for products such as headphones and earphones because the sound coming from the product's speakers is confined, and typically not enough of it leaks out to affect the performance of the product's microphones. However, in a room, there may be natural echoes from a sound emission that can distort or make intelligibility difficult.

An Adaptive Interference Canceller (AIC) rejects the interfering sounds, such as a TV playing in the living room, or microwave noise in the kitchen that are hard to cancel out with a traditional beamformer described above. Unlike other adaptive cancellation techniques, DSP Concepts' AIC algorithm does not require a reference signal to cancel out the interfering noises. Instead, it uses a combination of beamforming, adaptive signal processing, and machine learning to cancel out 30 dB of interference noise, while also preserving the desired speech signal. AIC is necessary for products, such as remote controls, and smart speakers, that are typically operated in living room environments, where there are interfering noises and moderate to high reverb conditions. For example, when a user is operating a TV remote control, AIC will be able to cancel out the TV sound from the audio stream, to present the speech signal to the wake-word detection engine as if there was no interfering noise present.

Once the system detects sound and powers up, it must record the incoming audio and compare it to a stored digital file of the wake word (such as "Alexa" for the Amazon Echo). If the waveform of the incoming audio is sufficiently close to the stored file, the device becomes receptive to voice commands. If the waveform of the incoming audio is sufficiently close to the stored file, the device becomes receptive to voice commands. In contrast to portable products, smart home speakers only need to recognize its wake word, as they offload other voice recognition tasks to an external, Internet-connected server. The wake-word detection model typically runs locally on the device, while some service providers such as Amazon, can enable additional wake word checks in the cloud.

The hearing aid may interface with a standard set of voice services, such as Amazon Alexa, OK Google, Microsoft Cortana, or Samsung Bixby, or implement its own proprietary speech assistant. When interfacing with a standard system, a customized skill is provided or employed to permit specific control over the hearing aid and its environment.

Because portable products cannot rely on an Internet connection as today's smart speakers do, they need to recognize a certain number of basic function commands on their own without the help of external servers. Portable products need to recognize a certain number of basic function commands without the help of external servers. These commands are typically limited to basic functions such as play, pause, skip tracks, repeat, and answer calls. Recognition of these commands works in the same way as wake-word detection does. However, even though the command set is limited, the need for a local command set recognition increases the load on the processor compared with a smart home speaker. Portable devices, such as wearable headsets, can communicate over a Bluetooth or WiFi link with a mobile phone, which then performs the command processing.

The function of each of the above algorithms is complex. It must be adjusted to suit the application—especially in portable products, where the environment and use patterns are likely to be different from those of home products. Here are the algorithm functions that need tuning for optimum voice recognition accuracy:

The threshold levels for sound detection and wake-word detection must be set high enough to minimize false triggering of the device, but low enough that the user can address the device at an average speaking level. These wakeup thresholds also depend on the use case. For example, a remote control that is 2-3 feet from the user should be set to a lower threshold, whereas a wearable device has to be set to a higher threshold to reduce false positives. In portable products, especially, it may be desirable for these levels to be adjusted dynamically so that the performance adjusts to compensate for varying levels of ambient sound. The function of the dynamic compensation will itself have to be tuned. The wake threshold must minimize false device triggering but still allow users to address the device at an average speaking level.

Devices can be tuned to reject different types of noises depending on their application. For example, manufacturers know the spectrum of any given car's road and engine noise at different speeds, so the voice recognition system can be tuned to reject these sounds. The noise reduction or cancelling algorithms can also function dynamically by adapting to the changing environment. However, this dynamic function also requires tuning. Devices with always-on voice command can be tuned to reject different types of noises depending on their application.

The tighter the beamwidth of the beamformer, the better it rejects environmental sounds, and reflections of the user's voice from other objects. However, setting the beamwidth too tight causes the unit to reject the user's voice if the user moves slightly. The tighter the beamwidth of the beamformer, the better it rejects environmental sounds and reflections of the user's voice. In products such as earphones and headphones, where the direction of arrival of the user's voice does not vary, it can set a tight beamwidth. However, in products such as remote controls and home automation panels, the beamwidth must be set wider to accommodate the movement of the user while the user is speaking.

A key goal when minimizing power consumption is to put the device to sleep as often as possible, and to keep it asleep for as long as possible. However, this goal requires trade-offs. If the device is put to sleep too quickly after use, it may miss commands that follow the wake word, and require the user to speak the wake word again, which usually leads to frustrated users. However, if the device stays awake longer than necessary, it consumes more power than it needs to. To minimize power consumption, the voice command device should sleep as often as possible, and be kept asleep as long as possible.

The Voice-on-SPOT reference design combines the Vesper Microphones Wake-on-Sound capability, with the Ambiq Apollo MCU running DSP Concepts' TalkTo algorithms.

Therefore, there exists a requirement for an intercom system for short range domestic use to facilitate members of a family or a group of people, more specifically people with hearing impairments, to enable an effective communication with each other even when present in different rooms or at different floors. Further, there exists a need of hearing aid devices providing effective intercommunication.

Bluetooth (IEEE-802.15.1) is a short-range wireless technology standard that is used for exchanging data between fixed and mobile devices over short distances using UHF radio waves in the ISM bands, from 2.402 GHz to 2.48 GHZ, and building personal area networks (PANs). In the most widely used mode, transmission power is limited to 2.5 milliwatts, giving it a very short range of up to 10 meters (30 feet). en.wikipedia.org/wiki/Bluetooth.

Bluetooth operates at frequencies between 2.402 and 2.480 GHz, or 2.400 and 2.4835 GHz including guard bands 2 MHz wide at the bottom end and 3.5 MHz wide at the top. This is in the globally unlicensed (but not unregulated) industrial, scientific and medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 1600 hops per second, with adaptive frequency-hopping (AFH) enabled. Bluetooth Low Energy uses 2 MHz spacing, which accommodates 40 channels.

Originally, Gaussian frequency-shift keying (GFSK) modulation was the only modulation scheme available. Since the introduction of Bluetooth 2.0+EDR, π/4-DQPSK (differential quadrature phase-shift keying) and 8-DPSK modulation may also be used between compatible devices. Devices functioning with GFSK are said to be operating in basic rate (BR) mode, where an instantaneous bit rate of 1 Mbit/s is possible. The term Enhanced Data Rate (EDR) is used to describe π/4-DPSK (EDR2) and 8-DPSK (EDR3) schemes, each giving 2 and 3 Mbit/s respectively. The combination of these (BR and EDR) modes in Bluetooth radio technology is classified as a BR/EDR radio. In 2019, Apple published an extension called HDR which supports data rates of 4 (HDR4) and 8 (HDR8) Mbit/s using π/4-DQPSK modulation on 4 MHz channels with forward error correction (FEC).

Bluetooth is a packet-based protocol with a master/slave architecture. One master may communicate with up to seven slaves in a piconet. All devices within a given piconet use the clock provided by the master as the base for packet exchange. The master clock ticks with a period of 312.5 µs, two clock ticks then make up a slot of 625 µs, and two slots make up a slot pair of 1250 µs. In the simple case of single-slot packets, the master transmits in even slots and receives in odd slots. The slave, conversely, receives in even slots and transmits in odd slots. Packets may be 1, 3, or 5 slots long, but in all cases, the master's transmission begins in even slots and the slave's in odd slots.

The above excludes Bluetooth Low Energy, introduced in the 4.0 specification, which uses the same spectrum but somewhat differently.

The master BR/EDR Bluetooth device can communicate with a maximum of seven devices in a piconet (an ad hoc computer network using Bluetooth technology), though not all devices reach this maximum. The devices can switch roles, by agreement, and the slave can become the master (for example, a headset initiating a connection to a phone necessarily begins as master—as an initiator of the connection—but may subsequently operate as the slave).

The Bluetooth Core Specification provides for the connection of two or more piconets to form a scatternet, in which certain devices simultaneously play the master role in one piconet and the slave role in another.

At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is (in theory) supposed to listen in each receive slot, being a master is a lighter burden than being a slave. Being a master of seven slaves is possible; being a slave of more than one master is possible. The specification is vague as to required behavior in scatternets.

Officially Class 3 radios have a range of up to 1 meter (3 ft), Class 2, most commonly found in mobile devices, 10 meters (33 ft), and Class 1, primarily for industrial use cases, 100 meters (300 ft). Bluetooth Marketing qualifies that Class 1 range is in most cases 20-30 meters (66-98 ft), and Class 2 range 5-10 meters (16-33 ft). The actual range achieved by a given link will depend on the qualities of the devices at both ends of the link, as well as the air conditions in between, and other factors.

Most Bluetooth applications are battery-powered Class 2 devices, with little difference in range whether the other end of the link is a Class 1 or Class 2 device as the lower-powered device tends to set the range limit. In some cases the effective range of the data link can be extended when a Class 2 device is connecting to a Class 1 transceiver with both higher sensitivity and transmission power than a typical Class 2 device. Mostly, however, the Class 1 devices have a similar sensitivity to Class 2 devices. Connecting two Class 1 devices with both high sensitivity and high power can allow ranges far in excess of the typical 100 m, depending on the throughput required by the application. Some such devices allow open field ranges of up to 1 km and beyond between two similar devices without exceeding legal emission limits.

Bluetooth and Wi-Fi (IEEE 802.11 standards) have some similar applications: setting up networks, printing, or transferring files. Wi-Fi is intended as a replacement for high-speed cabling for general local area network access in work areas or home. This category of applications is sometimes called wireless local area networks (WLAN). Bluetooth was intended for portable equipment and its applications. The category of applications is outlined as the wireless personal area network (WPAN). Bluetooth is a replacement for cabling in various personally carried applications in any setting and also works for fixed location applications such as smart energy functionality in the home (thermostats, etc.).

Wi-Fi and Bluetooth are to some extent complementary in their applications and usage. Wi-Fi is usually access point-centered, with an asymmetrical client-server connection with all traffic routed through the access point, while Bluetooth is usually symmetrical, between two Bluetooth devices. Bluetooth serves well in simple applications where two devices need to connect with a minimal configuration like a button press, as in headsets and speakers.

The Bluetooth SIG completed the Bluetooth Core Specification version 4.0 (called Bluetooth Smart) and has been adopted as of 30 Jun. 2010. It includes Classic Bluetooth, Bluetooth high speed and Bluetooth Low Energy (BLE) protocols. Bluetooth high speed is based on Wi-Fi, and Classic Bluetooth consists of legacy Bluetooth protocols.

Bluetooth Low Energy, previously known as Wibree, is a subset of Bluetooth v4.0 with an entirely new protocol stack for rapid build-up of simple links. As an alternative to the Bluetooth standard protocols that were introduced in Bluetooth v1.0 to v3.0, it is aimed at very low power applications powered by a coin cell. Chip designs allow for two types of implementation, dual-mode, single-mode and enhanced past versions. Compared to Classic Bluetooth, Bluetooth Low Energy is intended to provide considerably reduced power consumption and cost while maintaining a similar communication range. In terms of lengthening the battery life of Bluetooth devices, BLE represents a significant progression. In a single-mode implementation, only the low energy protocol stack is implemented. In a dual-mode implementation, Bluetooth Smart functionality is integrated into an existing Classic Bluetooth controller.

Bluetooth 5 provides, for BLE, options that can double the speed (2 Mbit/s burst) at the expense of range, or provide up to four times the range at the expense of data rate.

Bluetooth 5.3 provides high-level protocols such as the SDP (Protocol used to find other Bluetooth devices within the communication range, also responsible for detecting the function of devices in range), RFCOMM (Protocol used to emulate serial port connections) and TCS (Telephony control protocol) interact with the baseband controller through the L2CAP (Logical Link Control and Adaptation Protocol). The L2CAP protocol is responsible for the segmentation and reassembly of the packets.

The hardware that makes up the Bluetooth device is made up of, logically, two parts; which may or may not be physically separate. A radio device, responsible for modulating and transmitting the signal; and a digital controller. The digital controller is likely a CPU, one of whose functions is to run a Link Controller; and interfaces with the host device; but some functions may be delegated to hardware. The Link Controller is responsible for the processing of the baseband and the management of ARQ and physical layer FEC protocols. In addition, it handles the transfer functions (both asynchronous and synchronous), audio coding (e.g. SBC (codec)) and data encryption. The CPU of the device is responsible for attending the instructions related to Bluetooth of the host device, in order to simplify its operation. To do this, the CPU runs software called Link Manager that has the function of communicating with other devices through the LMP protocol.

Bluetooth is defined as a layer protocol architecture consisting of core protocols, cable replacement protocols, telephony control protocols, and adopted protocols. Mandatory protocols for all Bluetooth stacks are LMP, L2CAP and SDP. In addition, devices that communicate with Bluetooth almost universally can use these protocols: HCI and RFCOMM.

The Link Manager (LM) is the system that manages establishing the connection between devices. It is responsible for the establishment, authentication and configuration of the link. The Link Manager locates other managers and communicates with them via the management protocol of the LMP link. To perform its function as a service provider, the LM uses the services included in the Link Controller (LC). The Link Manager Protocol basically consists of several PDUs (Protocol Data Units) that are sent from one device to another. The following is a list of supported services:

The Host Controller Interface provides a command interface for the controller and for the link manager, which allows access to the hardware status and control registers. This interface provides an access layer for all Bluetooth devices. The HCI layer of the machine exchanges commands and data with the HCI firmware present in the Bluetooth device. One of the most important HCI tasks that must be performed is the automatic discovery of other Bluetooth devices that are within the coverage radius.

The Logical Link Control and Adaptation Protocol (L2CAP) is used to multiplex multiple logical connections between two devices using different higher level protocols. Provides segmentation and reassembly of on-air packets. In Basic mode, L2CAP provides packets with a payload configurable up to 64 KB, with 672 bytes as the default MTU, and 48 bytes as the minimum mandatory supported MTU. In Retransmission and Flow Control modes, L2CAP can be configured either for isochronous data or reliable data per channel by performing retransmissions and CRC checks. Bluetooth Core Specification Addendum 1 adds two additional L2CAP modes to the core specification. Streaming Mode (SM) is a very simple mode, with no retransmission or flow control. This mode provides an unreliable L2CAP channel. Reliability in any of these modes is optionally and/or additionally guaranteed by the lower layer Bluetooth BDR/EDR air interface by configuring the number of retransmissions and flush timeout (time after which the radio flushes packets). In-order sequencing is guaranteed by the lower layer. Only L2CAP channels configured in ER™ or SM may be operated over AMP logical links.

The Service Discovery Protocol (SDP) allows a device to discover services offered by other devices, and their associated parameters. For example, when you use a mobile phone with a Bluetooth headset, the phone uses SDP to determine which Bluetooth profiles the headset can use (Headset Profile, Hands Free Profile (HFP), Advanced Audio Distribution Profile (A2DP) etc.) and the protocol multiplexer settings needed for the phone to connect to the headset using each of them. Each service is identified by a Universally Unique Identifier (UUID), with official services (Bluetooth profiles) assigned a short form UUID (16 bits rather than the full 128).

Radio Frequency Communications (RFCOMM) is a cable replacement protocol used for generating a virtual serial data stream. RFCOMM provides for binary data transport and emulates EIA-232 (formerly RS-232) control signals over the Bluetooth baseband layer, i.e., it is a serial port emulation. RFCOMM provides a simple, reliable, data stream to the user, similar to TCP. It is used directly by many telephony related profiles as a carrier for AT commands, as well as being a transport layer for OBEX over Bluetooth. Many Bluetooth applications use RFCOMM because of its widespread support and publicly available API on most operating systems. Additionally, applications that used a serial port to communicate can be quickly ported to use RFCOMM.

The Bluetooth Network Encapsulation Protocol (BNEP) is used for transferring another protocol stack's data via an L2CAP channel. Its main purpose is the transmission of IP packets in the Personal Area Networking Profile. BNEP performs a similar function to SNAP in Wireless LAN.

The Audio/Video Control Transport Protocol (AVCTP) is used by the remote control profile to transfer AV/C commands over an L2CAP channel. The music control buttons on a stereo headset use this protocol to control the music player.

The Audio/Video Distribution Transport Protocol (AVDTP) is used by the advanced audio distribution (A2DP) profile to stream music to stereo headsets over an L2CAP channel intended for video distribution profile in the Bluetooth transmission.

The Telephony Control Protocol-Binary (TCS BIN) is the bit-oriented protocol that defines the call control signaling for the establishment of voice and data calls between Bluetooth devices. Additionally, "TCS BIN defines mobility management procedures for handling groups of Bluetooth TCS devices."

Depending on packet type, individual packets may be protected by error correction, either ⅓ rate forward error correction (FEC) or ⅔ rate. In addition, packets with CRC will be retransmitted until acknowledged by automatic repeat request (ARQ).

Any Bluetooth device in discoverable mode transmits the following information on demand: Device name, Device class, List of services, and Technical information (for example: device features, manufacturer, Bluetooth specification used, clock offset). Any device may perform an inquiry to find other devices to connect to, and any device can be configured to respond to such inquiries. However, if the device trying to connect knows the address of the device, it always responds to direct connection requests and transmits the information shown in the list above if requested. Use of a device's services may require pairing or acceptance by its owner, but the connection itself can be initiated by any device and held until it goes out of range. Some devices can be connected to only one device at a time, and connecting to them prevents them from connecting to other devices and appearing in inquiries until they disconnect from the other device. Every device has a unique 48-bit address. However, these addresses are generally not shown in inquiries. Instead, friendly Bluetooth names are used, which can be set by the user. This name appears when another user scans for devices and in lists of paired devices.

Many services offered over Bluetooth can expose private data or let a connecting party control the Bluetooth device. Security reasons make it necessary to recognize specific devices, and thus enable control over which devices can connect to a given Bluetooth device. At the same time, it is useful for Bluetooth devices to be able to establish a connection without user intervention (for example, as soon as in range). To resolve this conflict, Bluetooth uses a process called bonding, and a bond is generated through a process called pairing. The pairing process is triggered either by a specific request from a user to generate a bond (for example, the user explicitly requests to "Add a Bluetooth device"), or it is triggered automatically when connecting to a service where (for the first time) the identity of a device is required for security purposes. These two cases are referred to as dedicated bonding and general bonding respectively.

Pairing often involves some level of user interaction. This user interaction confirms the identity of the devices. When pairing completes, a bond forms between the two devices, enabling those two devices to connect in the future without repeating the pairing process to confirm device identities. When desired, the user can remove the bonding relationship. During pairing, the two devices establish a relationship by creating a shared secret known as a link key. If both devices store the same link key, they are said to be paired or bonded. A device that wants to communicate only with a bonded device can cryptographically authenticate the identity of the other device, ensuring it is the same device it previously paired with. Once a link key is generated, an authenticated Asynchronous Connection-Less (ACL) link between the devices may be encrypted to protect exchanged data against eavesdropping. Users can delete link keys from either device, which removes the bond between the devices-so it is possible for one device to have a stored link key for a device it is no longer paired with. Bluetooth services generally require either encryption or authentication and as such require pairing before they let a remote device connect. Some services, such as the Object Push Profile, elect not to explicitly require authentication or encryption so that pairing does not interfere with the user experience associated with the service use-cases. Pairing mechanisms changed significantly with the introduction of Secure Simple Pairing in Bluetooth v2.1. The following summarizes the pairing mechanisms:

Legacy pairing is the only method available in Bluetooth v2.0 and before. Each device must enter a PIN code; pairing is only successful if both devices enter the same PIN code. Any 16-byte UTF-8 string may be used as a PIN code; however, not all devices may be capable of entering all possible PIN codes. Limited input devices may have a fixed PIN, for example "0000" or "1234", that are hard-coded into the device.

Secure Simple Pairing (SSP) is required by Bluetooth v2.1, although a Bluetooth v2.1 device may only use legacy pairing to interoperate with a v2.0 or earlier device. Secure Simple Pairing uses a form of public-key cryptography, and some types can help protect against man in the middle, or MI™ attacks. SSP has the following authentication mechanisms:

"Just works" provides pairing with no user interaction. However, a device may prompt the user to confirm the pairing process. This method is typically used by headsets with minimal IO capabilities, and is more secure than the fixed PIN mechanism this limited set of devices uses for legacy pairing. This method provides no man-in-the-middle (MI™) protection.

If both devices have a display, and at least one can accept a binary yes/no user input, they may use Numeric Comparison. This method displays a 6-digit numeric code on each device. The user should compare the numbers to ensure they are identical. If the comparison succeeds, the user(s) should confirm pairing on the device(s) that can accept an input. This method provides MI™ protection, assuming the user confirms on both devices and actually performs the comparison properly.

Passkey Entry may be used between a device with a display and a device with numeric keypad entry (such as a keyboard), or two devices with numeric keypad entry. In the first case, the display presents a 6-digit numeric code to the user, who then enters the code on the keypad. In the second case, the user of each device enters the same 6-digit number. Both of these cases provide MI™ protection.

The Out of band (OOB) method uses an external means of communication, such as near-field communication (NFC) to exchange some information used in the pairing process. Pairing is completed using the Bluetooth radio, but requires information from the OOB mechanism. This provides only the level of MI™ protection that is present in the OOB mechanism.

SSP is considered simple for the following reasons: In most cases, it does not require a user to generate a passkey. For use cases not requiring MI™ protection, user interaction can be eliminated. For numeric comparison, MI™ protection can be achieved with a simple equality comparison by the user.

Using OOB with NFC enables pairing when devices simply get close, rather than requiring a lengthy discovery process.

Bluetooth uses the radio frequency spectrum in the 2.402 GHz to 2.480 GHz range, which is non-ionizing radiation, of similar bandwidth to the one used by wireless and mobile phones. No specific harm has been demonstrated, even though wireless transmission has been included by IARC in the possible carcinogen list. Maximum power output from a Bluetooth radio is 100 mW for class 1, 2.5 mW for class 2, and 1 mW for class 3 devices.

Bluetooth Mesh is a computer mesh networking standard based on Bluetooth Low Energy that allows for many-to-many communication over Bluetooth radio. The Bluetooth Mesh specifications were defined in the Mesh Profile and Mesh Model specifications by the Bluetooth Special Interest Group (Bluetooth SIG). Bluetooth Mesh was conceived in 2014 and adopted on Jul. 13, 2017.

Bluetooth Mesh is a mesh networking standard that operates on a flood network principle. It's based on the nodes relaying the messages: every relay node that receives a network packet that authenticates against a known network key that is not in message cache, that has a TTL ≥2 can be retransmitted with TTL=TTL 1. Message caching is used to prevent relaying messages recently seen. en.wikipedia.org/wiki/Bluetooth_mesh_networking.

Communication is carried in the messages that may be up to 384 bytes long, when using Segmentation and Reassembly (SAR) mechanism, but most of the messages fit in one segment, that is 11 bytes. Each message starts with an opcode, which may be a single byte (for special messages), 2 bytes (for standard messages), or 3 bytes (for vendor-specific messages).

Every message has a source and a destination address, determining which devices process messages. Devices publish messages to destinations which can be single things/groups of things/everything. Each message has a sequence number that protects the network against replay attacks. Each message is encrypted and authenticated. Two keys are used to secure messages: (1) network keys-allocated to a single mesh network, (2) application keys-specific for a given application functionality, e.g., turning the light on vs reconfiguring the light. Messages have a time to live (TTL). Each time message is received and retransmitted, TTL is decremented which limits the number of "hops", eliminating endless loops.

Bluetooth Mesh has a layered architecture, with multiple layers as discussed below.

The Model Layer defines a standard way to exchange application specific messages. For example, a Light Lightness Model defines an interoperable way to control lightness. There are mandatory models, called Foundation Models, defining states and messages needed to manage a mesh network.

The Access Layer defines mechanism to ensure that data is transmitted and received in the right context of a model and its associated application keys.

The Upper Transport Layer defines authenticated encryption of access layer packets using an application (or device specific key). It also defines some control messages to manage Friendship or to notify the behavior of node using Heartbeat messages.

The Lower Transport Layer defines a reliable (through a Block Acknowledgement) Segmented transmission upper layer packets, when a complete upper layer packet can't be carried in a single network layer packet. It also defines a mechanism to reassemble segments on the receiver.

The Network Layer defines how transport packets are addressed over network to one or more nodes. It defines relay functionality for forwarding messages by a relay node to extended the range. It handles the network layer authenticated encryption using network key.

The Bearer Layer defines how the network packets are exchanged between nodes. Mesh Profile Specification defines BLE advert bearer and BLE GATT bearer. Mesh Profile defines Proxy Protocol, through which mesh packets can be exchanged via other bearers like TCP/IP.

Bluetooth mesh, officially launched in July 2017, is a highly anticipated addition to the Internet of Things (IoT) connectivity space. Bluetooth is a widely used short-range technology found in smartphones, tablets and consumer electronics, and the Bluetooth Special Interest Group (SIG) has a strong reputation for delivering specifications and tools that guarantee global, multi-vendor interoperability. www.ericsson.com/en/reports-and-papers/white-papers/bluetooth-mesh-networking.

Relaying in a Bluetooth mesh network is based on a managed flooding communication model. With managed flooding, a message injected in the mesh network can potentially be forwarded by multiple relay nodes. This approach offers flexibility in deployment and operation, but has the drawback of high congestion, resulting in packet loss for contention-based access in the unlicensed spectrum. It is therefore important to determine the supported traffic and QoS of Bluetooth mesh.

Bluetooth mesh provides several ways to configure the network based on the characteristics of the deployment and the requirements of the application, and the impact of such network configurations scales with the network size and throughput. Examples of configuration options include configuration of the relay feature, use of acknowledged or unacknowledged transmissions, message repetition schemes and transmission randomization.

To support standardization, validate implementation recommendations and assess the performance of a Bluetooth mesh network comprising of hundreds of devices, we carried out a full stack implementation of the Bluetooth Mesh Profile in a system-level simulator.

A capillary network is a LAN that uses short-range radio-access technologies to provide groups of devices with wide area connectivity. Capillary networks therefore extend the range of the wide area mobile networks to constraint devices. FIG. 1 illustrates the Bluetooth capillary gateway concept. As a capillary radio, Bluetooth standardizes the messages and behaviors of a variety of user scenarios that require sensing and/or actuation commands for constraint nodes. The relaying of these commands over multiple hops in the mesh also enables communication between nodes that are not within direct radio reach of each other. The presence of capillary gateways such as smartphones and/or proxy nodes that support both Bluetooth and cellular connectivity in the mesh area network extends the accessibility of extremely low-power, storage and memory constrained devices into the core network up and to the cloud.

The Bluetooth Mesh Profile builds on the broadcasting of data over the Bluetooth low-energy advertising channels, as specified in the Bluetooth core specification [2]. Since the Bluetooth Mesh Profile is based on Bluetooth Core v4.0 and later versions, it works on existing devices after a simple firmware update.

All nodes are asynchronously deployed and can talk to each other directly. After provisioning them, the network simply starts working and does not require any centralized operation-no coordination is required and there is no single point of failure. A group of nodes can be efficiently addressed with a single command, making dissemination and collection of information fast and reliable.

Bluetooth mesh has several characteristics, including:

The publish/subscribe model: The exchange of data within the mesh network is described as using a publish/subscribe paradigm. Nodes that generate messages publish the messages to an address, and nodes that are interested in receiving the messages will subscribe to such an address. This allows for flexible address assignment and group casting.

Two-layer security: Messages are authenticated and encrypted using two types of security keys. A network layer key provides security for all communication within a mesh network, and an application key is used to provide confidentiality and authentication of application data sent between the intended devices. The application key makes it possible to use intermediary devices to transmit data. Messages can be authenticated for relay without enabling the intermediary devices to read or change the application data. For example, a light bulb should not be able to unlock doors, even if the unlock command needs to be routed though the light bulb to reach the lock.

Flooding with restricted relaying: Flooding is the most simple and straightforward way to propagate messages in a network using broadcast. When a device transmits a message, that message may be received by multiple relays that in turn forward it further. Bluetooth mesh includes rules to restrict devices from re-relaying messages that they have recently seen and to prevent messages from being relayed through many hops.

Power saving with "friendship": Devices that need low-power support can associate themselves with an always-on device that stores and relays messages on their behalf, using the concept known as friendship. Friendship is a special relationship between a low-power node and one neighboring "friend" node. Friendship is first established by the low-power node; once established, the friend node performs actions that help reduce the power consumption on the low-power node. The friend node maintains a cache that stores all incoming messages addressed to the low-power node and delivers those messages to the low-power node when requested. In addition, the friend node delivers security updates to the low-power node.

Bluetooth Low Energy Proxy: Some Bluetooth devices such as smartphones may not support the advertising bearer defined by Bluetooth mesh natively. To enable those devices within the mesh network, Bluetooth Mesh Profile specifies a proxy protocol using legacy Bluetooth connectivity, over which mesh messages can be exchanged.

Seven different protocol layers have been defined, known as the bearer layer, the network layer, the lower transport layer, the upper transport layer, the access layer, the foundation model layer and the model layer.

Each layer has its own functions and responsibilities, and it provides certain services to the layer above it. Full details on the layers and their functionalities can be found in the Bluetooth Mesh specifications.

The network and transport layers are essential for network design and deployment strategies. The network layer handles aspects such as the addressing and relaying of messages, as well as network layer encryption and authentication. The lower transport layer handles segmentation and reassembly, and provides acknowledged or unacknowledged transport of messages to the peer device at the receiving end. The upper transport layer encrypts and authenticates access messages, and defines transport control procedures and messages. The latter is used to set up and manage the friendship feature, for example.

The choice of utilizing acknowledged or unacknowledged transport at the transport layer, and the selection of repetition scheme at the network layer, both represent means of controlling message delivery reliability and should be considered jointly. The reliability of the mesh network also depends on the performance of the lower layers and the utilization of the frequency resources used by the advertising channels.

All Bluetooth mesh nodes can transmit and receive messages. In addition, the nodes in a Bluetooth mesh network may support a set of optional features known as the relay, proxy, low-power and friend features. Nodes that support the relay feature can forward messages over the advertising bearer, facilitating communication between mesh nodes that are not within direct radio range. The proxy feature is used to forward messages between the advertising bearer and the GATT bearer (legacy Bluetooth Low Energy connections), so that even nodes with no support for the advertising bearer can be included in the mesh network.

The low-power feature facilitates low duty cycle operation of constrained mesh nodes. A node that makes use of the low-power feature must always be supported by a friend node, which stores incoming messages to the low-power node. Thanks to the assistance of the friend node, the low-power node can spend most of the time in sleep mode to save the battery.

With the flooding option, a message injected in the mesh network is potentially forwarded by every relay node that receives it. To avoid loops with infinite retransmissions, the Bluetooth mesh network layer introduces restrictions to the relaying of messages. The network cache method of doing this checks a received message against a cache of previously received messages, and relaying is restricted to messages that are not present in the cache. Time to live (TTL) can also be used to limit the number of times a message can be forwarded. The initial TTL value is determined by the source node, and decremented by one every time the message is relayed. Relay nodes only forward messages with a TTL value greater than one.

The Bluetooth Mesh Profile specification also allows for message repetitions at the network layer as a way of providing an appropriate level of reliability in the network. For example, when relaying a message, the network layer can be configured to send every network layer packet several times to the bearer layer below. The time between such message repetitions is configurable and should typically include a random component. As a recommended option to enhance the performance of mesh, the source repeats each message three times, whereas relays only retransmit each message once. The intuition behind this enhanced scheme is that the bottleneck of Bluetooth mesh in the considered scenario is often the first hop to inject the packet in the network. Once the neighboring relays receive the packet, there is a high chance that the packet propagates further to the intended destination due to the plurality of alternative paths in the mesh. Repetitions, however, have a negative impact in terms of advertising channel congestion for coexisting Bluetooth devices utilizing the same channels. As a general indication, the density of neighboring relays and the number of retransmissions at each relay need to be considered together to maximize network performance.

Randomization is the third option. By default, relay nodes scan the advertising channels for messages from neighboring nodes. The initial advertising channel to scan on is selected randomly (among the three advertising channels) and all channels are scanned periodically. When transmitting a message, nodes utilize advertising packets transmitted over all three advertising channels (channels 37, 38 and 39). It is recommended to add a random delay component within an advertising event. The use of a random time within the same advertising event is not explicitly defined by the Bluetooth Core v4.x specifications, and therefore it may not be implemented by some existing chipsets. However, adding a random delay is allowed if the total interval between advertising packets is shorter than 10 ms. Adding a random delay decreases the probability of collisions on all channels simultaneously. For mesh, assuming that multiple receiving relays are scanning on different channels, it increases the probability that a packet is propagated in the network.

Relays should be selected only among the powered nodes. As a best practice, relay nodes can be selected among nodes deployed in open areas, with preference given to corridors, so that every node is well within coverage of at least one relay node and that the network of relay nodes is connected. It is therefore possible to find a path between an arbitrary pair of nodes. Due to the uncertain propagation conditions, it is not always possible to optimize the deployment of the relays, and some redundant designs often need to be considered.

"Bluetooth 5" spec coming next week with 4× more range and 2× better speed [Updated]". 10 Jun. 2016.

"Adopted Specification; Bluetooth Technology Website". Bluetooth.com. 4 Dec. 2013.

"Affix Bluetooth Protocol Stack for Linux". Affix.

"Basics|Bluetooth Technology Website". Bluetooth.com. 23 May 2010.

"BlueNRG Bluetooth® low energy wireless network processor STMicroelectronics". st.com.

"Bluetooth 5 standard brings range, speed and capacity boost for IoT".

"Bluetooth 5: everything you need to know". 10 Jun. 2016.

"Bluetooth Core Specification Addendum (CSA) 1".

"Bluetooth Core Specification v5.0" (PDF download). www.bluetooth.org.

"Bluetooth Core Specification Version 5.2 Feature Overview".

"Bluetooth Core Specification Version 5.3 Feature Enhancements" (PDF).

"Bluetooth Core Version 3.0+HS specification".

"Bluetooth for Programmers" (PDF). MIT Computer Science And Artificial Intelligence Laboratory.

"Bluetooth protocol (RFCOMM, L2CAP and ACL)". Stack Overflow.

"Bluetooth Radio Interface, Modulation & Channels". Radio-Electronics.com.

"Bluetooth Range: 100 m, 1 km, or 10 km?". bluair.pl.

"Bluetooth Revisited". www.techpayout.com. 27 Mar. 2014.

"Bluetooth SIG unveils Smart Marks, explains v4.0 compatibility with unnecessary complexity". Engadget.

"Bluetooth Specification Version 5.0". Bluetooth Special Interest Group.

"Bluetooth Technology". mobileinfo.com.

"Bluetooth Wireless Technology FAQ-2010".

"Bluetooth® 5 Quadruples Range, Doubles Speed, Increases Data Broadcasting Capacity by 800% Bluetooth Technology Website". www.bluetooth.com.

"Broadcom.com-BCM20702-Single-Chip Bluetooth® 4.0 HCI Solution with Bluetooth Low Energy (BLE) Support". Broadcom.

"CSR.com". CSR.

"Hearing Aid Audio Support Using Bluetooth LE". Android Open Source Project.

"How Bluetooth Technology Works". Bluetooth SIG.

"Low Energy: Mesh|Bluetooth Technology Website". www.bluetooth.com.

"Mesh Model Bluetooth® Specification". Bluetooth Technology Website. 2017 Jul. 13.

"Milestones in the Bluetooth advance". Ericsson Technology Licensing. 22 Mar. 2004.

"Nordicsemi.com". Nordic Semiconductor.

"Portable Wireless Bluetooth Compatible Speakers". Trusound Audio.

"Range Limitation? What Range Limitation? Introducing Mesh Networks|Bluetooth Technology Website". blog.bluetooth.com.

"Real Time Location Systems" (PDF). clarinox.

"Samsung Omnia II: How to Transfer Files with Bluetooth FTP". YouTube. 11 Dec. 2009.

"Security Weaknesses in Bluetooth". RSA Security Conf.—Cryptographer's Track. CiteSeerX 10.1.1.23.7357.

"Simple Pairing Whitepaper" (PDF). Version V10r00. Bluetooth SIG. 3 Aug. 2006.

"Specification Documents". Bluetooth.com. Bluetooth SIG. 30 Jun. 2010.

"Traditional Profile Specifications". Bluetooth.com.

"Wibree forum merges with Bluetooth SIG" (PDF) (Press release). Nokia. 12 Jun. 2007.

"Wireless Data and Power Transfer of an Optogenetic Implantable Visual Cortex Stimulator (PDF Download Available)". ResearchGate.

"Wireless waves used to track travel times". CTV Calgary News. 26 Nov. 2012.

Ahmed, Shimaa, Ilia Shumailov, Nicolas Papernot, and Kassem Fawaz. "Towards More Robust Keyword Spotting for Voice Assistants." 2021;

Ailani, Sanchit, Yashil Handa, Aditya Ganguli, and Gaurav Rohilla. "Developing a low-cost Bluetooth assisted hearing aid." (2016): 2-6.

Alvarez, Raziel, and Hyun-Jin Park. "End-to-end streaming keyword spotting." In ICASSP 2019-2019 IEEE International Conference on Acoustics, Speech and Signal Processing (ICASSP), pp. 6336-6340. IEEE, 2019.

Amoh, Justice, and Kofi M. Odame. "An optimized recurrent unit for ultra-low-power keyword spotting." Proceedings of the ACM on Interactive, Mobile, Wearable and Ubiquitous Technologies 3, no. 2 (2019): 1-17.

Andreas Becker (16 Aug. 2007). "Bluetooth Security & Hacks" (PDF). Ruhr-Universität Bochum.

Antonioli, Daniele; Tippenhauer, Nils Ole; Rasmussen, Kasper B. (15 Aug. 2019). The KNOB is Broken: Exploiting Low Entropy in the Encryption Key Negotiation Of Bluetooth BR/EDR (PDF). Santa Clara: University of Oxford. ISBN 9781939133069.

Arik, Sercan O., Markus Kliegl, Rewon Child, Joel Hestness, Andrew Gibiansky, Chris Fougner, Ryan Prenger, and Adam Coates. "Convolutional recurrent neural networks for small-footprint keyword spotting." arXiv preprint arXiv: 1703.05390 (2017).

Benelli, Gionata, Gabriele Meoni, and Luca Fanucci. "A low power keyword spotting algorithm for memory constrained embedded systems." In 2018 IFIP/IEEE International Conference on Very Large Scale Integration (VLSI-SoC), pp. 267-272. IEEE, 2018.

Benisty, Hadas, Itamar Katz, Koby Crammer, and David Malah. "Discriminative Keyword Spotting for limited-data applications." Speech Communication 99 (2018): 1-11.

Bergsma, Boris, Minhao Yang, and Milos Cernak. "Power efficient analog features for audio recognition." arXiv preprint arXiv: 2110.03715 (2021).

Bernardo, Paul Palomero, Christoph Gerum, Adrian Frischknecht, Konstantin Lübeck, and Oliver Bringmann. "Ultratrail: A configurable ultralow-power tc-resnet ai accelerator for efficient keyword spotting." IEEE Transactions on Computer-Aided Design of Integrated Circuits and Systems 39, no. 11 (2020): 4240-4251.

Blouw, Peter, Gurshaant Malik, Benjamin Morcos, Aaron R. Voelker, and Chris Eliasmith. "Hardware Aware Training for Efficient Keyword Spotting on General Purpose and Specialized Hardware." arXiv preprint arXiv: 2009.04465 (2020).

Blouw, Peter, Xuan Choo, Eric Hunsberger, and Chris Eliasmith. "Benchmarking keyword spotting efficiency on neuromorphic hardware." In Proceedings of the 7th Annual Neuro-inspired Computational Elements Workshop, pp. 1-8. 2019.

Bonet, David, Guillermo Cámbara, Fernando López, Pablo Gómez, Carlos Segura, and Jordi Luque. "Speech Enhancement for Wake-Up-Word detection in Voice Assistants." arXiv preprint arXiv: 2101.12732 (2021).

Bryant, Carl. Receiver Front-Ends in CMOS with Ultra-Low Power Consumption. Lund University, 2013.

Chen, Guoguo, Carolina Parada, and Georg Heigold. "Small-footprint keyword spotting using deep neural networks." In 2014 IEEE International Conference on Acoustics, Speech and Signal Processing (ICASSP), pp. 4087-4091. IEEE, 2014.

Chen, Xi, Shouyi Yin, Dandan Song, Peng Ouyang, Leibo Liu, and Shaojun Wei. "Small-footprint keyword spotting with graph convolutional network." In 2019 IEEE Automatic Speech Recognition and Understanding Workshop (ASRU), pp. 539-546. IEEE, 2019.

Chen, Zhehuai, Yanmin Qian, and Kai Yu. "Sequence discriminative training for deep learning based acoustic keyword spotting." Speech Communication 102 (2018): 100-111.

Choi, Mi-Lim, Tae-hyun Ahn, Nam-Chil Paik, Young-Man Kwon, Myung-Jae Lim, and Dong-Kun Chung. "Implementation of Digital Hearing Aid Using Bluetooth Audio Digital Signal Processor." International Journal of Internet, Broadcasting and Communication 9, no. 2 (2017): 58-63.

Choi, Seungwoo, Seokjun Seo, Beomjun Shin, Hyeongmin Byun, Martin Kersner, Beomsu Kim, Dongyoung Kim, and Sungjoo Ha. "Temporal convolution for real-time keyword spotting on mobile devices." arXiv preprint arXiv: 1904.03814 (2019).

Chundi, Pavan Kumar, Dewei Wang, Sung Justin Kim, Minhao Yang, Joao Pedro Cerqueira, Joonsung Kang, Seungchul Jung, Sangjoon Kim, and Mingoo Seok. "Always-On Sub-Microwatt Spiking Neural Network Based on Spike-Driven Clock- and Power-Gating for an Ultra-Low-Power Intelligent Device." Frontiers in Neuroscience (2021): 880.

Clover, Juli. "Bluetooth SIG Announces 'LE Audio' With Audio Sharing, Lower Data Consumption, Hearing Aid Support and More". www.macrumors.com.

cnxsoft (10 Jun. 2016). "Bluetooth 5 Promises Four times the Range, Twice the Speed of Bluetooth 4.0 LE Transmissions".

Coucke, Alice, Mohammed Chlieh, Thibault Gisselbrecht, David Leroy, Mathieu Poumeyrol, and Thibaut Lavril. "Efficient keyword spotting using dilated convolutions and gating." In ICASSP 2019-2019 IEEE International Conference on Acoustics, Speech and Signal Processing (ICASSP), pp. 6351-6355. IEEE, 2019.

Darroudi, Seyed Mahdi, Raul Caldera-Sanchez, and Carles Gomez. "Bluetooth mesh energy consumption: A model." Sensors 19, no. 5 (2019): 1238.

David Meyer (22 Apr. 2009). "Bluetooth 3.0 released without ultrawideband". zdnet.co.uk.

Eggimann, Manuel, Abbas Rahimi, and Luca Benini. "A 5\mu W Standard Cell Memory-based Configurable Hyperdimensional Computing Accelerator for Always-on Smart Sensing." arXiv preprint arXiv: 2102.02758 (2021).

Fariselli, Marco, Manuele Rusci, Joel Cambonie, and Eric Flamand. "Integer-Only Approximated MFCC for Ultra-Low Power Audio NN Processing on Multi-Core MCUs." In 2021 IEEE 3rd International Conference on Artificial Intelligence Circuits and Systems (AICAS), pp. 1-4. IEEE, 2021.

Fernández, Santiago, Alex Graves, and Jürgen Schmidhuber. "An application of recurrent neural networks to discriminative keyword spotting." In International Conference on Artificial Neural Networks, pp. 220-229. Springer, Berlin, Heidelberg, 2007.

Gales, Mark J F, Kate M. Knill, and Anton Ragni. "Low-resource speech recognition and keyword-spotting." In International Conference on Speech and Computer, pp. 3-19. Springer, Cham, 2017.

Giraldo, Juan Sebastian P., and Marian Verhelst. "Laika: A 5 uW programmable LSTM accelerator for always-on keyword spotting in 65 nm CMOS." In ESSCIRC 2018-IEEE 44th European Solid State Circuits Conference (ESSCIRC), pp. 166-169. IEEE, 2018.

Giraldo, Juan Sebastian P., Steven Lauwereins, Komail Badami, and Marian Verhelst. "Vocell: A 65-nm Speech-Triggered Wake-Up SoC for 10-uW Keyword Spotting and Speaker Verification." IEEE Journal of Solid-State Circuits 55, no. 4 (2020): 868-878.

Gomez, Carles; Oller, Joaquim; Paradells, Josep (29 Aug. 2012). "Overview and Evaluation of Bluetooth Low Energy: An Emerging Low-Power Wireless Technology". Sensors. 12 (9): 11734-11753. Bibcode: 2012Senso . . . 1211734G. doi: 10.3390/s120911734. ISSN 1424-8220. PMC 3478807.

Guo, Jinxi, Kenichi Kumatani, Ming Sun, Minhua Wu, Anirudh Raju, Nikko Ström, and Arindam Mandal. "Time-delayed bottleneck highway networks using a dft feature for keyword spotting." In 2018 IEEE International Conference on Acoustics, Speech and Signal Processing (ICASSP), pp. 5489-5493. IEEE, 2018.

Gutierrez, Eric, Carlos Perez, Fernando Hernandez, and Luis Hernandez. "Time-Encoding-Based Ultra-Low Power Features Extraction Circuit for Speech Recognition Tasks." Electronics 9, no. 3 (2020): 418.

Guy Kewney (16 Nov. 2004). "High speed Bluetooth comes a step closer: enhanced data rate approved". Newswireless.net.

Hard, Andrew, Kurt Partridge, Cameron Nguyen, Niranjan Subrahmanya, Aishanee Shah, Pai Zhu, Ignacio Lopez Moreno, and Rajiv Mathews. "Training keyword spotting models on non-IID data with federated learning." arXiv preprint arXiv: 2005.10406 (2020).

Hardy, Emmanuel, and Franck Badets. "An Ultra-low Power RNN Classifier for Always-On Voice Wake-Up Detection Robust to Real-World Scenarios." arXiv preprint arXiv: 2103.04792 (2021).

He, Yanzhang, Rohit Prabhavalkar, Kanishka Rao, Wei Li, Anton Bakhtin, and Ian McGraw. "Streaming small-footprint keyword spotting using sequence-to-sequence models." In 2017 IEEE Automatic Speech Recognition and Understanding Workshop (ASRU), pp. 474-481. IEEE, 2017.

Hou, Jingyong, Li Zhang, Yihui Fu, Qing Wang, Zhanheng Yang, Qijie Shao, and Lei Xie. "The npu system for the 2020 personalized voice trigger challenge." arXiv preprint arXiv: 2102.13552 (2021).

Hou, Jingyong, Pengcheng Guo, Sining Sun, Frank K. Soong, Wenping Hu, and Lei Xie. "Domain adversarial training for improving keyword spotting performance of esl speech." In ICASSP 2019-2019 IEEE International Conference on Acoustics, Speech and Signal Processing (ICASSP), pp. 8122-8126. IEEE, 2019.

Hou, Jingyong, Yangyang Shi, Mari Ostendorf, Mei-Yuh Hwang, and Lei Xie. "Region proposal network based small-footprint keyword spotting." IEEE Signal Processing Letters 26, no. 10 (2019): 1471-1475.

Hou, Jingyong, Yangyang Shi, Mari Ostendorf, Mei-Yuh Hwang, and Lei Xie. "Mining effective negative training samples for keyword spotting." In ICASSP 2020-2020 IEEE International Conference on Acoustics, Speech and Signal Processing (ICASSP), pp. 7444-7448. IEEE, 2020.

Huang, Yiteng Arden, Turaj Z. Shabestary, and Alexander Gruenstein. "Hotword cleaner: dual-microphone adaptive noise cancellation with deferred filter coefficients for robust keyword spotting." In ICASSP 2019-2019 IEEE International Conference on Acoustics, Speech and Signal Processing (ICASSP), pp. 6346-6350. IEEE, 2019.

Huh, Jaesung, Minjae Lee, Heesoo Heo, Seongkyu Mun, and Joon Son Chung. "Metric learning for keyword spotting." In 2021 IEEE Spoken Language Technology Workshop (SLT), pp. 133-140. IEEE, 2021.

IEEE Std 802.15.1-2002-IEEE Standard for Information technology-Telecommunications and information exchange between systems-Local and metropolitan area networks-Specific requirements Part 15.1: Wireless Medium Access Control (MAC) and Physical Layer (PHY) Specifications for Wireless Personal Area Networks (WPANs). 2002. doi: 10.1109/IEEESTD.2002.93621. ISBN 978-0-7381-3335-5.

IEEE Std 802.15.1-2005-IEEE Standard for Information technology-Telecommunications and information exchange between systems-Local and metropolitan area networks-Specific requirements Part 15.1: Wireless Medium Access Control (MAC) and Physical Layer (PHY) Specifications for Wireless Personal Area Networks (W Pans). doi: 10.1109/IEEESTD.2005.96290. ISBN 978-0-7381-4708-6.

Juha T. Vainio (25 May 2000). "Bluetooth Security" (PDF). Helsinki University of Technology.

Karakos, Damianos, Richard Schwartz, Stavros Tsakalidis, Le Zhang, Shivesh Ranjan, Tim Ng, Roger Hsiao et al. "Score normalization and system combination for improved keyword spotting." In 2013 IEEE Workshop on Automatic Speech Recognition and Understanding, pp. 210-215. IEEE, 2013.

Keshet, Joseph, David Grangier, and Samy Bengio. "Discriminative keyword spotting." Speech Communication 51, no. 4 (2009): 317-329.

Kodali, Sreela, Patrick Hansen, Niamh Mulholland, Paul Whatmough, David Brooks, and Gu-Yeon Wei. "Applications of deep neural networks for ultra low power IoT." In 2017 IEEE International Conference on Computer Design (ICCD), pp. 589-592. IEEE, 2017.

Kurawar, Arwa; Koul, Ayushi; Patil, Viki Tukaram (August 2014). "Survey of Bluetooth and Applications". International Journal of Advanced Research in Computer Engineering & Technology. 3:2832-2837. ISSN 2278-1323.

Lei, Jie, Tousif Rahman, Rishad Shafik, Adrian Wheeldon, Alex Yakovlev, Ole-Christoffer Granmo, Fahim Kawsar, and Akhil Mathur. "Low-Power Audio Keyword Spotting using Tsetlin Machines." Journal of Low Power Electronics and Applications 11, no. 2 (2021): 18.

Leroy, David, Alice Coucke, Thibaut Lavril, Thibault Gisselbrecht, and Joseph Dureau. "Federated learning for keyword spotting." In ICASSP 2019-2019 IEEE International Conference on Acoustics, Speech and Signal Processing (ICASSP), pp. 6341-6345. IEEE, 2019.

Lezzoum, Narimene, Ghyslain Gagnon, and Jérémie Voix. "Voice activity detection system for smart earphones." IEEE Transactions on Consumer Electronics 60, no. 4 (2014): 737-744.

Li, Yingdan, Fei Chen, Zhuoyi Sun, Zhaoyang Weng, Xian Tang, Hanjun Jiang, and Zhihua Wang. "A smart binaural hearing aid architecture based on a mobile computing platform." Electronics 8, no. 7 (2019): 811.

Liu, Bo, Zhen Wang, Hu Fan, Jing Yang, Wentao Zhu, Lepeng Huang, Yu Gong, Wei Ge, and Longxing Shi. "EERA-KWS: A 163 TOPS/W always-on keyword spotting accelerator in 28 nm CMOS using binary weight network and precision self-adaptive approximate computing." IEEE Access 7 (2019): 82453-82465, discloses a micropower keyword spotting accelerator device with a power consumption of 77.8-115.9 µW. The Processor is a ARM 7 TDMI, With a deep neural network algorithm for keyword spotting. See also, Liu, Bo, Zhen Wang, Wentao Zhu, Yuhao Sun, Zeyu Shen, Lepeng Huang, Yan Li, Yu Gong, and Wei Ge. "An ultra-low power always-on keyword spotting accelerator using quantized convolutional neural network and voltage-domain analog switching network-based approximate computing." IEEE Access 7 (2019): 186456-186469.

Liu, Hongyi, Apurva Abhyankar, Yuriy Mishchenko, Thibaud Sénéchal, Gengshen Fu, Brian Kulis, Noah D. Stein, Anish Shah, and Shiv Naga Prasad Vitaladevuni. "Metadata-Aware End-to-End Keyword Spotting." In INTERSPEECH, pp. 2282-2286. 2020.

López-Espejo, Iván, Zheng-Hua Tan, and Jesper Jensen. "Improved External Speaker-Robust Keyword Spotting for Hearing Assistive Devices." IEEE/ACM Transactions on Audio, Speech, and Language Processing 28 (2020): 1233-1247.

López-Espejo, Iván, Zheng-Hua Tan, and Jesper Jensen. "Keyword spotting for hearing assistive devices robust to external speakers." arXiv preprint arXiv: 1906.09417 (2019).

López-Espejo, Iván, Zheng-Hua Tan, John Hansen, and Jesper Jensen. "Deep Spoken Keyword Spotting: An Overview." arXiv preprint arXiv: 2111.10592 (2021).

Lostanlen, Vincent, Antoine Bernabeu, Jean-Luc Béchennec, Mikaël Briday, Sébastien Faucou, and Mathieu Lagrange. "Energy Efficiency is Not Enough: Towards a Batteryless Internet of Sounds." In Audio Mostly 2021, pp. 147-155. 2021.

Lounis, Karim; Zulkernine, Mohammad (2019). "Connection Dumping Vulnerability Affecting Bluetooth Availability". 13th International Conference on Risks and Security of Internet and Systems-CRISIS 2018. Lecture Notes in Computer Science. 11391. Springer. pp. 188-204. doi: 10.1007/978-3-030-12143-3_16. ISBN 978-3-030-12142-6. S2CID 59248863.

Luo, Yi, Cong Han, and Nima Mesgarani. "Ultra-lightweight speech separation via group communication." In ICASSP 2021-2021 IEEE International Conference on Acoustics, Speech and Signal Processing (ICASSP), pp. 16-20. IEEE, 2021.

Macoskey, Jon, Grant P. Strimel, and Ariya Rastrow. "Bifocal neural ASR: Exploiting keyword spotting for inference optimization." In ICASSP 2021-2021 IEEE International Conference on Acoustics, Speech and Signal Processing (ICASSP), pp. 5999-6003. IEEE, 2021.

Mazlin, Irwan, Zan Azma Nasruddin, Wan Adilah Wan Adnan, and Fariza Hanis Abdul Razak. "Arabic Phonemes Recognition Using Convolutional Neural Network." In International Conference on Soft Computing in Data Science, pp. 262-271. Springer, Singapore, 2019.

Mazzawi, Hanna, Xavi Gonzalvo, Aleks Kracun, Prashant Sridhar, Niranjan Subrahmanya, Ignacio Lopez-Moreno, Hyun-Jin Park, and Patrick Violette. "Improving Keyword Spotting and Language Identification via Neural Architecture Search at Scale." In Interspeech, pp. 1278-1282. 2019.

Michaely, Assaf Hurwitz, Xuedong Zhang, Gabor Simko, Carolina Parada, and Petar Aleksic. "Keyword spotting for Google assistant using contextual speech recognition." In 2017 IEEE Automatic Speech Recognition and Understanding Workshop (ASRU), pp. 272-278. IEEE, 2017.

Mishchenko, Yuriy, Yusuf Goren, Ming Sun, Chris Beauchene, Spyros Matsoukas, Oleg Rybakov, and Shiv Naga Prasad Vitaladevuni. "Low-bit quantization and quantization-aware training for small-footprint keyword spotting." In 2019 18th IEEE International Conference On Machine Learning And Applications (ICMLA), pp. 706-711. IEEE, 2019.

Mittermaier, Simon, Ludwig Kürzinger, Bernd Waschneck, and Gerhard Rigoll. "Small-footprint keyword spotting on raw audio data with sinc-convolutions." In ICASSP 2020-2020 IEEE International Conference on Acoustics, Speech and Signal Processing (ICASSP), pp. 7454-7458. IEEE, 2020.

Mo, Tong, Yakun Yu, Mohammad Salameh, Di Niu, and Shangling Jui. "Neural architecture search for keyword spotting." arXiv preprint arXiv: 2009.00165 (2020).

Mroz, Mandy (21 May 2018). "Bluetooth hearing aids: Hearing aids with Bluetooth technology use today's wireless technology to help you easily stay connected to iOS and Android phones, televisions, tablets and other favorite audio devices". Healthy Hearing.

Muller, Nathan J. (2002). Networking A to Z. McGraw-Hill Professional. pp. 45-47. ISBN 9780071429139.

Myers, James, and Ben Conrad. MONO: An Ultra Low Power Sub-threshold Microcontroller. Arm Inc Austin United States, 2019.

Neumann, Lior; Biham, Eli (2020). "Breaking the Bluetooth Pairing—The Fixed Coordinate Invalid Curve Attack". Selected Areas in Cryptography-SAC 2019. Lecture Notes in Computer Science. 11959. Technion-Israel Institute of Technology. pp. 250-273. doi: 10.1007/978-3-030-38471-5_11. ISBN 978-3-030-38470-8. S2CID 51757249.

Pekcokguler, Naci, Dominique Morche, Adrian Frischknecht, Christoph Gerum, Andreas Burg, and Catherine Dehollain. "Dynamic Range and Complexity Optimization of Mixed-Signal Machine Learning Systems." In 2021 IEEE International Symposium on Circuits and Systems (ISCAS), pp. 1-5. IEEE, 2021.

Penttinen, Jyrki T. J. (16 Mar. 2015). The Telecommunications Handbook: Engineering Guidelines for Fixed, Mobile and Satellite Systems. John Wiley & Sons. p. 129. ISBN 978-1-119-94488-1.

Pérez-Díaz-De-Cerio, David, Mario García-Lozano, Antonio Valdovinos Bardají, and José-Luis Valenzuela.

"Bluetooth Mesh Analysis, Issues, and Challenges." IEEE Access 8 (2020): 53784-53800.

Pertilä, Pasi, Eemi Fagerlund, Anu Huttunen, and Ville Myllylä. "Online Own Voice Detection for a Multi-channel Multi-sensor In-Ear Device." IEEE Sensors Journal (2021).

Peter, David, Wolfgang Roth, and Franz Pernkopf. "Resource-efficient DNNs for Keyword Spotting using Neural Architecture Search and Quantization." In 2020 25th International Conference on Pattern Recognition (ICPR), pp. 9273-9279. IEEE, 2021.

Petrovsky, Alexander, Wanggen Wan, Manuel Rosa-Zurera, and Alexey Karpov. "Signal Processing Platforms and Algorithms for Real-Life Communications and Listening to Digital Audio." Journal of Electrical and Computer Engineering 2017 (2017).

Prabhat, Pranay, Benoît Labbe, Graham Knight, Anand Savanth, Jonas Svedas, Matthew J. Walker, Supreet Jeloka et al. "27.2 MONO: A performance-regulated 0.8-to-38 MHz DVFS ARM cortex-M33 SIMD MCU with 10 nW sleep power." In 2020 IEEE International Solid-State Circuits Conference-(ISSCC), pp. 422-424. IEEE, 2020.

Price, Michael, James Glass, and Anantha P. Chandrakasan. "A low-power speech recognizer and voice activity detector using deep neural networks." IEEE Journal of Solid-State Circuits 53, no. 1 (2017): 66-75.

Raju, Anirudh, Sankaran Panchapagesan, Xing Liu, Arindam Mandal, and Nikko Strom. "Data augmentation for robust keyword spotting under playback interference." arXiv preprint arXiv: 1808.00563 (2018).

Rebai, Ilyes, Yassine BenAyed, and Walid Mahdi. "A novel keyword rescoring method for improved spoken keyword spotting." Procedia Computer Science 126 (2018): 312-320.

Retsinas, George, Georgios Louloudis, Nikolaos Stamatopoulos, and Basilis Gatos. "Efficient learning-free keyword spotting." IEEE transactions on pattern analysis and machine intelligence 41, no. 7 (2018): 1587-1600.

Retsinas, George, Giorgos Sfikas, Nikolaos Stamatopoulos, Georgios Louloudis, and Basilis Gatos. "Exploring critical aspects of CNN-based keyword spotting. a PHOCNet study." In 2018 13th IAPR International Workshop on Document Analysis Systems (DAS), pp. 13-18. IEEE, 2018.

Rybakov, Oleg, Natasha Kononenko, Niranjan Subrahmanya, Mirko Visontai, and Stella Laurenzo. "Streaming keyword spotting on mobile devices." arXiv preprint arXiv: 2005.06720 (2020).

Sahu, Surya Kant, Sai Mitheran, Juhi Kamdar, and Meet Gandhi. "Audiomer: A Convolutional Transformer for Keyword Spotting." arXiv preprint arXiv: 2109.10252 (2021).

Sainath, Tara, and Carolina Parada. "Convolutional neural networks for small-footprint keyword spotting." (2015).

Sauter, Martin (2 Aug. 2017). From GSM to LTE-Advanced Pro and 5G: An Introduction to Mobile Networks and Mobile Broadband. John Wiley & Sons. p. 491. ISBN 978-1-119-34690-6.

Scarfone, K. & Padgette, J. (September 2008). "Guide to Bluetooth Security" (PDF). National Institute of Standards and Technology.

Shan, Changhao, Junbo Zhang, Yujun Wang, and Lei Xie. "Attention-based end-to-end models for small-footprint keyword spotting." arXiv preprint arXiv: 1803.10916 (2018).

Shan, Weiwei, Minhao Yang, Jiaming Xu, Yicheng Lu, Shuai Zhang, Tao Wang, Jun Yang, Longxing Shi, and Mingoo Seok. "14.1 A 510 nW 0.41 V low-memory low-computation keyword-spotting chip using serial FFT-based MFCC and binarized depthwise separable convolutional neural network in 28 nm CMOS." In 2020 IEEE International Solid-State Circuits Conference-(ISSCC), pp. 230-232. IEEE, 2020.

Shan, Weiwei, Minhao Yang, Tao Wang, Yicheng Lu, Hao Cai, Lixuan Zhu, Jiaming Xu, Chengjun Wu, Longxing Shi, and Jun Yang. "A 510-nw wake-up keyword-spotting chip using serial-fft-based mfcc and binarized depthwise separable cnn in 28-nm cmos." IEEE Journal of Solid-State Circuits 56, no. 1 (2020): 151-164.

Shi, Xian, Pan Zhou, Wei Chen, and Lei Xie. "Efficient Gradient-Based Neural Architecture Search For End-to-End ASR." In Companion Publication of the 2021 International Conference on Multimodal Interaction, pp. 91-96. 2021.

Shi, Xian, Pan Zhou, Wei Chen, and Lei Xie. "Darts-Conformer: Towards Efficient Gradient-Based Neural Architecture Search For End-to-End ASR." arXiv preprint arXiv: 2104.02868 (2021).

Song, Shuang, Mario Konijnenburg, Roland van Wegberg, Jiawei Xu, Hyunsoo Ha, Wim Sijbers, Stefano Stanzione et al. "A 769 µW battery-powered single-chip SoC with BLE for multi-modal vital sign monitoring health patches." IEEE transactions on biomedical circuits and systems 13, no. 6 (2019): 1506-1517.

Sørensen, Peter Mølgaard, Bastian Epp, and Tobias May. "A depthwise separable convolutional neural network for keyword spotting on an embedded system." EURASIP Journal on Audio, Speech, and Music Processing 2020, no. 1 (2020): 1-14.

Soro, Stanislava. "TinyML for Ubiquitous Edge AI." arXiv preprint arXiv: 2102.01255 (2021).

Stallings, William (2005). Wireless communications & networks. Upper Saddle River, NJ: Pearson Prentice Hall. ISBN 9788132231561.

Stauffer, Michael, Andreas Fischer, and Kaspar Riesen. "Speeding-up graph-based keyword spotting by quadtree segmentations." In International conference on computer analysis of images and patterns, pp. 304-315. Springer, Cham, 2017.

Sun, Ming, David Snyder, Yixin Gao, Varun K. Nagaraja, Mike Rodehorst, Sankaran Panchapagesan, Nikko Strom, Spyros Matsoukas, and Shiv Vitaladevuni. "Compressed Time Delay Neural Network for Small-Footprint Keyword Spotting." In Interspeech, pp. 3607-3611. 2017.

Szöke, Igor, Petr Schwarz, Pavel Matejka, Lukás Burget, Martin Karafiát, Michal Fapso, and Jan Cernocký. "Comparison of keyword spotting approaches for informal continuous speech." In Interspeech, pp. 633-636. 2005.

Tang, Raphael, and Jimmy Lin. "Deep residual learning for small-footprint keyword spotting." In 2018 IEEE International Conference on Acoustics, Speech and Signal Processing (ICASSP), pp. 5484-5488. IEEE, 2018.

Tang, Raphael, and Jimmy Lin. "Honk: A pytorch reimplementation of convolutional neural networks for keyword spotting." arXiv preprint arXiv: 1710.06554 (2017).

Tang, Raphael, Weijie Wang, Zhucheng Tu, and Jimmy Lin. "An experimental analysis of the power consumption of convolutional neural networks for keyword spotting." In 2018 IEEE International Conference on Acoustics, Speech and Signal Processing (ICASSP), pp. 5479-5483. IEEE, 2018.

Trac, Thanh, Jack Ciroli, Marino Bertone, and Jason White. "The Role of the "Internet of Things" in Hearing Research and Clinical Otology." (2021).

Tucker, George, Minhua Wu, Ming Sun, Sankaran Panchapagesan, Gengshen Fu, and Shiv Vitaladevuni. "Model Compression Applied to Small-Footprint Keyword Spotting." In Interspeech, pp. 1878-1882. 2016.

Ulkar, Mehmet Gorkem, and Osman Erman Okman. "Ultra-Low Power Keyword Spotting at the Edge." arXiv preprint arXiv: 2111.04988 (2021).

Veendrick, Harry J. M. (2017). Nanometer CMOS ICs: From Basics to ASICs. Springer. p. 243. ISBN 9783319475974.

Veniat, Tom, Olivier Schwander, and Ludovic Denoyer. "Stochastic adaptive neural architecture search for keyword spotting." In ICASSP 2019-2019 IEEE International Conference on Acoustics, Speech and Signal Processing (ICASSP), pp. 2842-2846. IEEE, 2019.

Villamizar, Daniel Augusto, Dante Gabriel Muratore, James B. Wieser, and Boris Murmann. "An 800 nW Switched-Capacitor Feature Extraction Filterbank for Sound Classification." IEEE Transactions on Circuits and Systems I: Regular Papers 68, no. 4 (2021): 1578-1588.

Wang, Dewei, Pavan Kumar Chundi, Sung Justin Kim, Minhao Yang, Joao Pedro Cerqueira, Joonsung Kang, Seungchul Jung, Sangjoon Kim, and Mingoo Seok. "Always-On, Sub-300-nW, Event-Driven Spiking Neural Network based on Spike-Driven Clock-Generation and Clock- and Power-Gating for an Ultra-Low-Power Intelligent Device." In 2020 IEEE Asian Solid-State Circuits Conference (A-SSCC), pp. 1-4. IEEE, 2020.

Wang, Xiong, Sining Sun, and Lei Xie. "Virtual adversarial training for ds-cnn based small-footprint keyword spotting." In 2019 IEEE Automatic Speech Recognition and Understanding Workshop (ASRU), pp. 607-612. IEEE, 2019.

Wang, Xiong, Sining Sun, Changhao Shan, Jingyong Hou, Lei Xie, Shen Li, and Xin Lei. "Adversarial examples for improving end-to-end attention-based small-footprint keyword spotting." In ICASSP 2019-2019 IEEE International Conference on Acoustics, Speech and Signal Processing (ICASSP), pp. 6366-6370. IEEE, 2019.

Wang, Yiming, Hang Lv, Daniel Povey, Lei Xie, and Sanjeev Khudanpur. "Wake word detection with streaming transformers." In ICASSP 2021-2021 IEEE International Conference on Acoustics, Speech and Signal Processing (ICASSP), pp. 5864-5868. IEEE, 2021.

Wang, Yuxuan, Pascal Getreuer, Thad Hughes, Richard F. Lyon, and Rif A. Saurous. "Trainable frontend for robust and far-field keyword spotting." In 2017 IEEE International Conference on Acoustics, Speech and Signal Processing (ICASSP), pp. 5670-5674. IEEE, 2017.

Wang, Zhixuan, Hao Zhang, Yihan Zhang, Linxiao Shen, Jiayoon Ru, Haitao Fan, Zhichao Tan, Yangyuan Wang, Le Ye, and Ru Huang. "A Software-Defined Always-On System With 57-75-nW Wake-Up Function Using Asynchronous Clock-Free Pipelined Event-Driven Architecture and Time-Shielding Level-Crossing ADC." IEEE Journal of Solid-State Circuits (2021).

Weintraub, Mitchel. "LVCSR log-likelihood ratio scoring for keyword spotting." In 1995 International Conference on Acoustics, Speech, and Signal Processing, vol. 1, pp. 297-300. IEEE, 1995.

Xu, Menglong, and Xiao-Lei Zhang. "Depthwise separable convolutional resnet with squeeze-and-excitation blocks for small-footprint keyword spotting." arXiv preprint arXiv: 2004.12200 (2020).

Xu, Menglong, Shengqiang Li, Chengdong Liang, and Xiao-Lei Zhang. "AUC Optimization for Robust Small-footprint Keyword Spotting with Limited Training Data." arXiv preprint arXiv: 2107.05859 (2021).

Yan, Yexin, Terrence C. Stewart, Xuan Choo, Bernhard Vogginger, Johannes Partzsch, Sebastian Hoeppner, Florian Kelber, Chris Eliasmith, Steve Furber, and Christian Mayr. "Low-Power Low-Latency Keyword Spotting and Adaptive Control with a SpinNaker 2 Prototype and Comparison with Loihi." arXiv preprint arXiv: 2009.08921 (2020).

Yang, Minhao, Chung-Heng Yeh, Yiyin Zhou, Joao P. Cerqueira, Aurel A. Lazar, and Mingoo Seok. "Design of an Always-On Deep Neural Network-Based 1-$\mu$ W Voice Activity Detector Aided With a Customized Software Model for Analog Feature Extraction." IEEE Journal of Solid-State Circuits 54, no. 6 (2019): 1764-1777.

Yılmaz, Emre, Ozgür Bora Gevrek, Jibin Wu, Yuxiang Chen, Xuanbo Meng, and Haizhou Li. "Deep convolutional spiking neural networks for keyword spotting." In Proceedings of Interspeech, pp. 2557-2561. 2020.

Yuan, Yougen, Zhiqiang Lv, Shen Huang, and Lei Xie. "Verifying deep keyword spotting detection with acoustic word embeddings." In 2019 IEEE Automatic Speech Recognition and Understanding Workshop (ASRU), pp. 613-620. IEEE, 2019.

Zeng, Mengjun, and Nanfeng Xiao. "Effective combination of DenseNet and BILS™ for keyword spotting." IEEE Access 7 (2019): 10767-10775.

Zhang, Bo, Wenfeng Li, Qingyuan Li, Weiji Zhuang, Xiangxiang Chu, and Yujun Wang. "Autokws: Keyword spotting with differentiable architecture search." In ICASSP 2021-2021 IEEE International Conference on Acoustics, Speech and Signal Processing (ICASSP), pp. 2830-2834. IEEE, 2021.

Zhang, Yundong, Naveen Suda, Liangzhen Lai, and Vikas Chandra. "Hello edge: Keyword spotting on microcontrollers." arXiv preprint arXiv: 1711.07128 (2017).

Zhou, Chuteng, Fernando Garcia Redondo, Julian Büchel, Irem Boybat, Xavier Timoneda Comas, S. R. Nandakumar, Shidhartha Das, Abu Sebastian, Manuel Le Gallo, and Paul N. Whatmough. "AnalogNets: ML-HW Co-Design of Noise-robust TinyML Models and Always-On Analog Compute-in-Memory Accelerator." arXiv preprint arXiv: 2111.06503 (2021).

Zhu, Lixuan, Weiwei Shan, Jiaming Xu, and Yicheng Lu. "AAD-KWS: a sub-uW keyword spotting chip with a zero-cost, acoustic activity detector from a 170 nW MFCC feature extractor in 28 nm CMOS."

See, U.S. Patent and Pub. application Nos. 20010041594; 20030013503; 20030016129; 20030062990; 20040009749;

20040086093; 20040107271; 20040146031; 20060003737; 20060003802; 20060142880; 20060146727; 20060244825; 20060276211; 20060293092; 20080003975; 20080026775; 20080032664; 20080056232; 20080214247; 20100048134; 20100285750; 20110077001; 20110248856; 20120021739; 20130038218; 20140177901; 20140349576; 20140354279; 20150077240; 20150131490; 20150148100; 20150164436; 20150201060; 20150271900; 20160019526; 20160196703; 20160242148; 20160294999; 20160302029; 20160373909; 20180020530; 20180035207; 20180054508; 20180054667; 20180104141; 20180106640; 20180153481; 20180343304; 20190230207; 20190387104; 20200106552; 20200219378; 20200232815; 20200259416; 20210044781; 20210112391; 20210407229; U.S. Pat. Nos. 6,405,027; 6,430,395; 6,894,609; 7,221,950; 7,254,123; 7,403,838; 7,499,717; 7,546,140; 7,826,821; 7,844,295; 8,046,007; 8,103,215; 8,165,628; 8,320,591; 8,515,417; 8,653,979; 8,688,040; 8,763,750; 9,112,983; 9,172,917; 9,363,358; 9,501,051; 9,520,042; 9,532,186; 9,625,545; 9,712,662; 9,788,799; 9,875,472; 9,940,884; 9,998,850; 10,028,357; 10,034,152; 10,051,358; 10,062,232; 10,284,703; 10,310,464; 10,327,314; 10,514,273; 10,537,291; 10,553,098; 10,575,417; 10,652,381; 10,659,586; 10,887,048; 11,057,670; 11,089,165; 11,108,998; 11,151,862; 11,193,792; and foreign Patent Nos. AT411703; AT412309; AT490640; AT520900; AU2002215231; AU2003203591; AU2004313213; AU2011367368; AU2013290340; AU2014254308; BR102012012710; BR102019011656; BR102019022658; BR102020002397; BR112021001221; BR202017021851; BRMU9101539U2; CA2879110; CA2954351; CA2960449; CA3023575; CH706487; CN100585657; CN101001359; CN101036412; CN101364819; CN101477346; CN101588945; CN101616504; CN101742636; CN101815274; CN101825890; CN101826930; CN101860582; CN101909107; CN101925194; CN101953172; CN102063759; CN102183694; CN102236684; CN102467795; CN102486929; CN102547486; CN102572615; CN102684753; CN103002270; CN103079118; CN103281514; CN103308887; CN103322446; CN103359013; CN103501185; CN103634039; CN103646522; CN103731491; CN103747390; CN103843046; CN103903321; CN103945340; CN104020740; CN104184759; CN104202580; CN104219727; CN104254879; CN104300999; CN104335556; CN104426934; CN104468933; CN104504598; CN104535115; CN104581719; CN104581720; CN104618220; CN104635687; CN104637320; CN104637325; CN104661280; CN104663369; CN104780305; CN104796178; CN104809786; CN104837075; CN104853072; CN104868941; CN104874135; CN104883210; CN104914730; CN104952467; CN104993892; CN104994326; CN105007462; CN105024716; CN105120202; CN105120374; CN105227200; CN105228094; CN105278372; CN105303863; CN105391880; CN105433528; CN105474282; CN105511640; CN105554691; CN105577215; CN105584545; CN105634529; CN105657483; CN105722039; CN105766003; CN105785597; CN105792048; CN105793876; CN105933893; CN105939462; CN106028274; CN106056728; CN106127997; CN106230460; CN106285418; CN106331901; CN106331921; CN106339236; CN106341797; CN106371384; CN106382085; CN106384471; CN106408712; CN106453251; CN106550286; CN106658235; CN106664772; CN106686337; CN106792280; CN106846757; CN106952599; CN106997695; CN107147416; CN107154812; CN107171691; CN107197113; CN107211203; CN107395239; CN107426453; CN107484143; CN107508612; CN107707525; CN107767584; CN107920221; CN107951117; CN108059044; CN108134619; CN108235224; CN108266625; CN108282634; CN108337483; CN108466896; CN108549248; CN108682164; CN108777846; CN108833231; CN108858231; CN108960758; CN109147102; CN109150226; CN109327275; CN109393662; CN109547985; CN109615836; CN109688372; CN109788455; CN109905552; CN110099103; CN110266336; CN110473324; CN110589639; CN110740419; CN110856123; CN111091636; CN111243614; CN111354120; CN111446981; CN111586120; CN111657619; CN111726754; CN111899451; CN111948680; CN112021719; CN112073079; CN112135282; CN112187306; CN112257163; CN112349001; CN112636776; CN112766692; CN112953591; CN113015151; CN113100517; CN113242477; CN106714091; CN106803298; CN106856506; CN106981897; CN107136622; CN107147423; CN107155090; CN107197011; CN107198839; CN107222233; CN107422634; CN107437956; CN107493563; CN107645305; CN107743298; CN107769811; CN107945344; CN107967737; CN108090705; CN108205196; CN108235294; CN108280914; CN108288366; CN108449105; CN108494422; CN108566530; CN108683880; CN108780351; CN108833236; CN108880581; CN108986400; CN109150205; CN109218657; CN109327681; CN109410523; CN109559493; CN109683129; CN109697778; CN109818641; CN110087153; CN110113682; CN110289918; CN110505325; CN110599029; CN110774287; CN111025054; CN111163448; CN111258429; CN111405106; CN111491240; CN111601294; CN111698745; CN111801936; CN111908300; CN111953941; CN112039548; CN112073080; CN112162493; CN112184933; CN112198808; CN112243077; CN112311916; CN112471670; CN112533114; CN112637317; CN112714367; CN112788535; CN112911419; CN112954253; CN113027533; CN113154940; CN113307122; CN106788545; CN106803764; CN106950536; CN106997694; CN107146345; CN107147960; CN107165552; CN107197112; CN107204787; CN107343269; CN107425871; CN107483071; CN107505880; CN107692373; CN107749767; CN107835125; CN107948013; CN107979705; CN108093383; CN108235155; CN108259057; CN108282178; CN108306765; CN108462514; CN108496374; CN108600678; CN108737546; CN108798411; CN108851313; CN108921758; CN108994851; CN109150225; CN109302197; CN109391928; CN109525650; CN109603024; CN109685951; CN109730391; CN109861714; CN110087183; CN110226797; CN110365702; CN110572458; CN110708615; CN110855799; CN111031412; CN111199630; CN111277288; CN111431550; CN111583487; CN111628796; CN111726726; CN111835370; CN111924018; CN111970728; CN112061922; CN112113550; CN112184933; CN112243077; CN112333645; CN112533114; CN112714367; CN112911419; CN113015037; CN113062678; CN113225720; CN113329350;

CN113332625; CN113347509; CN113367430; CN205792848; CN205793020; CN205793050;
CN113470303; CN113470321; CN113541716; CN205883235; CN205901954; CN205902043;
CN113542923; CN113572491; CN113615901; CN205810816; CN205916064; CN205945719;
CN113674498; CN113676851; CN113747297; CN205959269; CN205986902; CN205996978;
CN113778105; CN113825054; CN113825107; CN206004656; CN206039680; CN206077376;
CN1197294; CN1257468; CN1408188; CN1507593; CN206096911; CN206100301; CN206117699;
CN1545016; CN1589043; CN1630384; CN1703056; CN206117800; CN206133726; CN206135891;
CN1741678; CN1836405; CN1892719; CN1914858; CN206135909; CN206136002; CN206147120;
CN1918819; CN1928587; CN1960529; CN201063621; CN206163093; CN206179157; CN206193840;
CN201114001; CN201114014; CN201114576; CN206211993; CN206251088; CN206258583;
CN201160277; CN201252543; CN201266933; CN206270500; CN206270684; CN206332666;
CN201266995; CN201315618; CN201339488; CN206340158; CN206341217; CN206362933;
CN201369833; CN201383874; CN201407495; CN206363393; CN206379947; CN206402216;
CN201465128; CN201557163; CN201571103; CN206432989; CN206461606; CN206490667;
CN201577149; CN201663600; CN201742391; CN206506711; CN206627996; CN206657241;
CN201760092; CN201801143; CN201878142; CN206672339; CN206674106; CN206686164;
CN201967775; CN201976243; CN201995099; CN206686379; CN206740983; CN206740987;
CN202026349; CN202150916; CN202256356; CN206741661; CN206759468; CN206807441;
CN202257879; CN202435521; CN202443555; CN206850766; CN206856868; CN206865750;
CN202488445; CN202535356; CN202563622; CN206865751; CN206865752; CN206922937;
CN202633448; CN202652198; CN202652441; CN206964107; CN206991396; CN207010666;
CN202713330; CN202773006; CN202798852; CN207010670; CN207039585; CN207041026;
CN202841426; CN202957929; CN202998240; CN207053689; CN207055746; CN207075002;
CN203057260; CN203138678; CN203154653; CN207083235; CN207092877; CN207115660;
CN203166896; CN203180910; CN203181048; CN207149052; CN207184472; CN207200689;
CN203181051; CN203251293; CN203261329; CN207283712; CN207283713; CN207285289;
CN203261440; CN203289556; CN203352572; CN207339834; CN207369188; CN207399198;
CN203352579; CN203504679; CN203632733; CN207440873; CN207442836; CN207460157;
CN203661053; CN203675299; CN203720611; CN207460159; CN207473711; CN207505154;
CN203722766; CN203734708; CN203802973; CN207518724; CN207573346; CN207573636;
CN203840328; CN203849945; CN203872357; CN207639712; CN207677907; CN207799763;
CN203968111; CN204103913; CN204103920; CN207835440; CN207835441; CN207882978;
CN204156859; CN204168286; CN204180068; CN207882987; CN207884777; CN207884780;
CN204181007; CN204190756; CN204231420; CN207884896; CN207897089; CN208046662;
CN204241946; CN204244441; CN204258843; CN208112616; CN208128235; CN208158824;
CN204291130; CN204331993; CN204334825; CN208158895; CN208160146; CN208210308;
CN204425558; CN204428841; CN204442568; CN208227009; CN208227010; CN208227011;
CN204467052; CN204481990; CN204482596; CN208272194; CN208285422; CN208337889;
CN204496586; CN204498120; CN204539265; CN208354715; CN208384127; CN208461806;
CN204540899; CN204557164; CN204557771; CN208522733; CN208597072; CN208623660;
CN204559563; CN204576579; CN204578743; CN208638506; CN208654810; CN208692370;
CN204597986; CN204598107; CN204601419; CN208707625; CN208707631; CN208849757;
CN204613733; CN204630581; CN204630895; CN208748759; CN208873015; CN208888601;
CN204633988; CN204697219; CN204697237; CN208924218; CN208971499; CN208986972;
CN204707142; CN204707225; CN204733158; CN209103500; CN209105387; CN209170604;
CN204740568; CN204759518; CN204761433; CN209201160; CN209232073; CN209330109;
CN204761629; CN204795007; CN204810472; CN209358525; CN209378417; CN209419605;
CN204836150; CN204859160; CN204887481; CN209448737; CN209449760; CN209475423;
CN204926401; CN204929142; CN204943419; CN209517520; CN209573364; CN209608641;
CN204948056; CN204948057; CN204956093; CN209659462; CN209693058; CN209711671;
CN204967900; CN204993322; CN205003816; CN209805812; CN209839897; CN209844940;
CN205005042; CN205017449; CN205029658; CN209861110; CN209966375; CN209982569;
CN205080563; CN205092862; CN205093660; CN210041856; CN210057196; CN210112291;
CN205123631; CN205142210; CN205160721; CN210119817; CN210201819; CN210201820;
CN205195913; CN205262492; CN205285289; CN210201824; CN210205632; CN210271289;
CN205302208; CN205305116; CN205321310; CN210274068; CN210297685; CN210327934;
CN205336262; CN205336365; CN205356325; CN210331655; CN210353392; CN210428594;
CN205377858; CN205377996; CN205407801; CN210431489; CN210491211; CN210502567;
CN205430220; CN205430466; CN205453954; CN210515545; CN210578542; CN210670143;
CN205510026; CN205510034; CN205510414; CN210694232; CN210721734; CN210724784;
CN205540044; CN205541396; CN205545236; CN210745135; CN210781115; CN210807256;
CN205545653; CN205565830; CN205585365; CN210809459; CN210912130; CN210955415;
CN205589146; CN205596108; CN205610869; CN211044480; CN211062111; CN211128077;
CN205610942; CN205622810; CN205637923; CN211129370; CN211181164; CN211239395;
CN205643713; CN205644718; CN205657683; CN211266925; CN211375841; CN211429301;
CN205657686; CN205665837; CN205681595; CN211656213; CN211702081; CN211830806;
CN205719002; CN205720956; CN205750934; CN211863405; CN211880588; CN211880592;

CN211930865; CN211985971; CN212009646; CN212009666; CN212012627; CN212034114; CN212064373; CN212086183; CN212086190; CN212086503; CN212112552; CN212137792; CN212258950; CN212275984; CN212278228; CN212305625; CN212381370; CN212392880; CN212486496; CN212518959; CN212518960; CN212518962; CN212572531; CN212572532; CN212572533; CN212572534; CN212624175; CN212727291; CN212752249; CN212785339; CN212812045; CN212850486; CN212875788; CN212966252; CN213028012; CN213072632; CN213072636; CN213074660; CN213126029; CN213152384; CN213188438; CN213213529; CN213279638; CN213299327; CN213305391; CN213339293; CN213342295; CN213365596; CN213365675; CN213402994; CN213461881; CN213473476; CN213521869; CN213585843; CN213585867; CN213661611; CN213754494; CN213781031; CN213957637; CN213990906; CN214012068; CN214014422; CN214045606; CN214070167; CN214205723; CN214209177; CN214228242; CN214256296; CN214267950; CN214309148; CN214337897; CN214338068; CN214414238; CN214427684; CN214480576; CN214480589; CN214481082; CN214541509; CN214544552; CN214587164; CN214627379; CN214675135; CN214756327; CN214808414; CN214851548; CN215072389; CN215075812; CN215177233; CN215186743; CN215187234; CN215187399; CN2919273; DE10017056; DE102008002966; DE102011089225; DE102013222854; DE102014213058; DE102015208313; DE102017004854; DE102018005757; DE102018205888; DE112005001435; DE202004005525; DE202008012183; DE202011110280; DE202013002661; DE202014103541; DE202017004029; DE202017106985; DE202018100630; DE502005005729; DE60143590D1; DE602004017116; DE60310798; DE60315528T2; DK1558013T3; DK1587293T3; EP1188342; EP1380157; EP1635546; EP1656767; EP1706947; EP1713255; EP1732050; EP1737136; EP2533469; EP2608511; EP2872079; EP3047465; EP3095252; EP3123839; EP3191262; EP3201703; EP3737088; EP3790266; EP3792140; ES1137334; ES1248050; ES2304443T3; ES2315628T3; ES2536483T3; ES2555614; ES2717506T3; ES2826564T3; ES2841076T3; ES2867928T3; FI114264; FR3062534; GB0818198D0; GB2410137; GB2482985; GB2490691; GB2496983; IL230346D0; IL273677D0; IN2007CH00237; IN2015KN00399; IN201621009701; IN201711031175; IN201841028629; IN201917014724; IN201941015771; IN202011052132; ITMI20070196; ITTV20120057; JP2002171336; JP2003198738; JP2003204398; JP2003244166; JP2003516663; JP2004032394; JP2005051468; JP2005109834; JP2005159534; JP2005348056; JP2006020304; JP2006033558; JP2006311192; JP2007502565; JP2008017062; JP2008017063; JP2008153976; JP2012072536; JP2014127814; JP2015516749; JP2016101450; JP2017500827; JP2021535706; JP3722094; JP3989748; JP5113166; JP5390569; JP6499191; KR100675306; KR100746770; KR100823445; KR100851089; KR100900903; KR100941468; KR100995999; KR101076050; KR101237946; KR101237947; KR101394972; KR101566782; KR101628893; KR101998152; KR101998153; KR102083564; KR20000054086; KR20010101793; KR20020037733; KR20020045927; KR20020089631; KR200247569; KR20030014201; KR20030089770; KR20040027680; KR20040090461; KR20050000671; KR20060056004; KR20060060310; KR20060076974; KR20070008090; KR20070074427; KR20080002127; KR20080031065; KR20080073532; KR20090022167; KR20090095201; KR20100007412; KR20110012343; KR20120100538; KR20150058891; KR20160058095; KR20160116818; KR20170039334; KR20170085845; KR20180032839; KR20190016398; KR20190113433; KR20190127047; KR20200121670; MX2010003777; NL1042535; NL2011636; NL2013946; PT1558013; RU193782; RU2001123677; RU200454; RU207807; RU2234711; RU2491639; RU2526376; RU2689275; RU2705716; RU2756699; SE533791; TW200620848; TW200638731; TW200816003; TW200826621; TW200849846; TW201014210; TW201214341; TW201516984; TW201531047; TW201804819; TW201903720; TW201906395; TW201947991; TWI259015; TWI306347; TWI519087; TWI639982; TWM273003; TWM289883; TWM315918; TWM353581; TWM361336; TWM408890; TWM422722; TWM453923; TWM457251; TWM458752; TWM459479; TWM491230; TWM496313; TWM497967; TWM509477; TWM514166; TWM535971; TWM541085; TWM569529; TWM573920; TWM578443; WO2001078246; WO2002087205; WO2002095612; WO2005011274; WO2005015840; WO2005067158; WO2006007132; WO2008059073; WO2008096238; WO2008096252; WO2011087677; WO2011087679; WO2011087680; WO2011087681; WO2011087683; WO2011087684; WO2011087685; WO2011087686; WO2011087687; WO2011130367; WO2012022986; WO2012082017; WO2012139515; WO2012153079; WO2013153429; WO2014014916; WO2015042002; WO2015057073; WO2015063771; WO2015109002; WO2015137795; WO2015148505; WO2015189691; WO2016000911; WO2016038597; WO2016130992; WO2016135362; WO2016165231; WO2016167877; WO2017013473; WO2018035008; WO2018071904; WO2018156001; WO2018156002; WO2018156003; WO2018156005; WO2018171062; WO2018210344; WO2019102356; WO2019161553; WO2019163149; WO2019209143; WO2019227534; WO2020109887; WO2020141709; WO2020243801; WO2020261061; WO2021004148; WO2021048437; WO2021062308; WO2021169824; WO2021199023; WO2021213193; and WO2021218781.

SUMMARY OF THE INVENTION

The present invention relates generally to a hearing aid or hearing aid-like structure adapted to remedy hearing loss in humans, which in addition to performing standard hearing aid functions (e.g., amplification, equalization, voice discrimination/background suppression), supports a wireless intercom communication mode for wirelessly communicating voice between respective hearing aids, e.g., for domestic use between multiple people wearing hearing aids in close proximity. Preferably, the devices automatically communicate between members of a pair, and support various telephony operations, such as conferencing, hold, transfer, forwarding, automated answering, interactive voice response, and the like. The devices may be strictly peers, or have an asymmetric disposition. For example, one hearing aid may be a master, and perform external communication functions, while the other may act as a slave to the master and have more limited functionality (and therefore longer battery life, lower cost, lighter weight, etc.). The hearing aids may form an ad hoc network, and operate in a centralized, decentralized, or hybrid manner.

The hearing aid preferably also interfaces with typical consumer electronics, such as smart phones, to provide the benefits of hearing aid technology (digital equalization, directional microphone or microphone arrays, noise reduction, feedback suppression, and T-coil.

In one embodiment, the hearing aid device has a camera, and is configured to acquire lip images of a person speaking. Isolation of the lips may be performed in conjunction with a direction-finding microphone array or Bluetooth direction finding. By synchronizing the sounds in the environment with lip movements of the speaker, background sounds may be suppressed, and artificial intelligence employed to improve comprehensibility. Lipreading may also be of benefit when communicating with a mute participant in a conversation, when watching television with the sound unavailable (such as in a sports bar), or even in a noisy environment where the speaker cannot be heard over ambient noise.

Further, the hearing aid may include real time speech translation for multilingual conversations. In that case, the hearing aid preferably communicates with a linked smartphone which provides translation services. The smartphone may further offload the translation to a cloud service through WiFi, 4G, 5G, 6G, etc.

The hearing aid may also provide speech to text conversion, which, for example, can display on a smartphone, electronic display glasses, VR goggles, etc., or simply for archival purposes. The transcript may be used for translation of speech, closed captioning of a video of the conversation, etc. In some cases, the transcript may be transmitted to another person, along with the spoken audio, to assist in comprehension, or simply provide a communication alternate. Consistent with this mixed mode communication, a test-to-speech channel may be provided, to permit one participant to communicate using mainly speech and another participant to participate through mainly text.

The hearing aid may include inertial sensors, such as accelerometers and gyroscopes, in addition to magnetometers and GPS, directional Bluetooth, etc., which can determine, especially in an environment with other similarly equipped intercommunicating hearing aids, can permit automatic switching between potential communication partners depending on orientation, distance, and activity, while isolating ambient sounds and conversations between unlikely communication partners. For example, if a number of people form groups in a room, the groups may be automatically detected, based on people facing each other within a distance range of 0-2 meters. On the other hand, persons facing away from the wearer would not typically be considered part of the conversation, even if within the distance criteria. Similarly, if a communication group is formed, a person moving in proximity would not be joined to the conversation unless they decelerate or otherwise appear to insinuate themselves in the group. Likewise, a participant in a conversation may leave the conversation by turning away from the other participant(s), and accelerate away.

In another embodiment, the hearing aid is used in a walkie talkie style radio communication system. In that case, frequency equalization to account for hearing loss is less critical, though generally, if the equalization feature is available, it may advantageously be used regardless of degree of hearing loss. Assuming that the devices are power constrained, Bluetooth is a preferred communication protocol, and class 1, 2, or 3 modes may be employed depending on desired range. Alternately, WiFi, UWB, or other protocols may be employed. A multihop mesh network may be implemented to extend effective range. An auxiliary transceiver may also be used to extend range, e.g., a goTenna, LTE, 4G, 5G, 6G, GMRS, FRS, 900 MHZ ISM, DECT radio, or the like. When using an infrastructure-based communication, information routing may be according to IP address, with local address translation (LAT) as needed. For example, if each set of hearing aids is paired with a smartphone, that relays communications through the cellular phone network, then in regions will good cellular coverage, no ad hoc/peer-to-peer communications are required. Further, the hearing aid may include an LTE/4G/5G/6G transceiver and directly communicate with a cellular network, alleviating the need for a companion device.

The hearing aids may support a Bluetooth communication profile linked to a cellphone, though the functions may be implemented without requiring a cellphone or other Bluetooth host device. When a Bluetooth host device is provided, the user interface for the system may reside on the cellphone, except perhaps volume controls and simple buttons. When a Bluetooth host is not provided, the hearing aids may employ a user interface based on control buttons, a touch pad interface, voice commands, gestures (e.g., received through an optical sensor such as a camera, lidar, radar, capacitive sensor, or the like). When worn, the preferred user feedback is audible and/or tactile/proprioceptive.

According to one embodiment, a low power implementation is provided, with a sound trigger activation, which wakes the microcontroller from a sleep state in which functionality other than hearing aid sound processing is limited or absent, and upon hearing a sound, enters a wake mode able to process speech to perform keyword spotting. While the processor is awakened, the radio transceiver is turned on, and the initial communication protocol steps are performed. At the same time, the radio transceiver determines whether it is the target of an addressed communication from another radio. For example, the radio awakens every 2.5-10 seconds to determine whether there is a packet destined for it. A mesh radio architecture is preferably employed, to limit maximum transmission distances, especially in a congested environment. If a keyword is detected, the processor determines what command is requested to be performed, and takes appropriate steps. The microprocessor and radio may reenter a sleep state of no further communication is received for 2.5 seconds. The channel otherwise remains open to avoid communication latencies during a conversation.

The microcontroller preferably buffers sounds, so that if there is a deferred decision on a command, or for other reasons, the recorded sound may be later processed or transmitted. Therefore, a buffer, e.g., a circular buffer, may be maintained with, e.g., 30 seconds of speech stored. For example, using an adaptive vocoder sampling at 8 kHz, and 8-bit resolution, the 30 second buffer requires 240,000 bytes. Practically, the available memory may be 512 kB. This same memory space may be used for mesh network packet storage before forwarding, and other purposes. Therefore, the microcontroller performs memory management, and prioritization, to ensure that the requirements for highest priority uses are met.

The present system preferably operates using a hands-free, display-free user interface, and preferably employs an interactive voice interface. The interactive voice interface preferably includes a spoken keyword spotting processor within the hearing aids, which may have e.g., a vocabulary of 8-255 spoken words. The processor preferably employs a micropower microprocessor, e.g., ARM M0, M3, or M33 core (e.g., nRF5340, Rajan, B., Bhavana, B., Anusha, K. R., Kusumanjali, G., & Pavithra, G. S. (2020). IoT based Smart and Efficient Hearing Aid using ARM Cortex Microcontroller. 2020 International Conference on Smart Technologies in Computing, Electrical and Electronics (ICSTCEE). doi: 10.1109/icstcee49637.2020.9277110 10.1109/ICSTCEE49637.2020.9277110), optionally with a neural processing accelerator, to implement a convolutional neural network. In general, each hearing aid is symmetric, and therefore each contains a processor. A pair of hearing aids includes a communication channel between the pair, though a single hearing aid may be used. This opens the possibility of shared processing or parallel processing between the two processors, and also the possibility of alternation between the processors in order to balance power consumption. Preferably, the neural network may be trained, i.e., the neural network is not fixed, to allow updating of the keywords. See also,

- Abi Sen, Adnan Ahmed, Ayman Ahmad S. Aljohani, Nour Mahmoud Bahbouh, and Omar Alhaboob. "Designing a smart bracelet based on arduino for deaf parents to interact with their children." In 2021 8th International Conference on Computing for Sustainable Global Development (INDIACom), pp. 380-384. IEEE, 2021.
- Brennan, Robert L., Stephanie Steffler, Jeffrey Dods, and James He. "Hearing aid and Extreme Edge IoT Acceleration." In 2021 IEEE International Midwest Symposium on Circuits and Systems (MWSCAS), pp. 684-687. IEEE, 2021.
- Deepu, S. P., and Ramesh Kini. "Design and implementation of a signal processing ASIC for digital hearing aids." Microprocessors and Microsystems 93 (2022): 104616.
- Fedorov, Igor, Marko Stamenovic, Carl Jensen, Li-Chia Yang, Ari Mandell, Yiming Gan, Matthew Mattina, and Paul N. Whatmough. "TinyLSTMs: Efficient neural speech enhancement for hearing aids." arXiv preprint arXiv: 2005.11138 (2020).
- Gebelein, Udo, and Stefan Rapp. "A Hearing Aid to Visualize the Direction of Sound." Studientexte zur Sprachkommunikation: Elektronische Sprachsignalverarbeitung 2020 (2020): 69-76.
- Jeyaranjani, J., and A. Nesarani. "Internet of things for hearing impaired people." In 2018 Second International Conference on Intelligent Computing and Control Systems (ICICCS), pp. 1943-1946. IEEE, 2018; Divya, R., and R. Chinnaiyan. "Reliable smart earplug sensors for monitoring human organs based on 5G technology." In 2018 Second International Conference on Inventive Communication and Computational Technologies (ICICCT), pp. 687-690. IEEE, 2018. Pavlidou, Antonia, and Benny Lo. "Artificial ear-a wearable device for the hearing impaired." In 2021 IEEE 17th International Conference on Wearable and Implantable Body Sensor Networks (BSN), pp. 1-4. IEEE, 2021.
- Karrenbauer, Jens, Simon Klein, Sven Schönewald, Lukas Gerlach, Meinolf Blawat, Jens Benndorf, and Holger Blume. "SmartHeaP-A High-level Programmable, Low Power, and Mixed-Signal Hearing Aid SoC in 22 nm FD-SOI." In ESSCIRC 2022-IEEE 48th European Solid State Circuits Conference (ESSCIRC), pp. 265-268. IEEE, 2022.
- Lei, Jiaxin, Xin Li, Wenjing Chen, Anhe Wang, Qingquan Han, Shuo Bai, and Milin Zhang. "Design of a Compact Wireless EEG Recorder With Extra-High Sampling Rate and Precise Time Synchronization for Auditory Brainstem Response." IEEE Sensors Journal 22, no. 5 (2021): 4484-4493.
- Pavlovic, Caslav, Volker Hohmann, Hendrik Kayser, Louis Wong, Tobias Herzke, S. R. Prakash, zezhang Hou, and Paul Maanen. "Open portable platform for hearing aid research." The Journal of the Acoustical Society of America 143, no. 3 (2018): 1738-1738.
- Gong, Zheng, and Youshen Xia. "Two speech enhancement-based hearing aid systems and comparative study." In 2015 5th International Conference on Information Science and Technology (ICIST), pp. 530-534. IEEE, 2015.
- Ranjbar, Parivash, Amin Saremi, and Dag Stranneby. "Real-time implementation of monitor algorithm on an ARM microprocessor to be used as a wearable vibrotactile aid." International Journal of Engineering Technology and Scientific Innovation 4, no. 5 (2019): 2456-1851.
- Scherer, Moritz, Kiran Menachery, and Michele Magno. "SmartAid: A Low-Power Smart Hearing Aid For Stutterers." In 2019 IEEE Sensors Applications Symposium (SAS), pp. 1-6. IEEE, 2019.
- Seifert, Christopher, Guillermo Payá-Vaya, Holger Blume, Tobias Herzke, and Volker Hohmann. "A mobile SoC-based platform for evaluating hearing aid algorithms and architectures." In 2015 IEEE 5th international conference on consumer electronics-Berlin (ICCE-Berlin), pp. 93-97. IEEE, 2015.
- Sneha, Talapala, Ssneha Balasubramanian, R. Vaishali, A. Beulah, and S. Angel Deborah. "Home security system for the hearing impaired." In 2021 5th International Conference on Computer, Communication and Signal Processing (ICCCSP), pp. 1-5. IEEE, 2021; Angdresey, Apriandy, Ivana Valentine Masala, Vivie Deyby Kumenap, Michael George Sumampouw, Kristian Alex Dame, and Ivan Daniel Reynaldo Riady. "A Communication Assistant Application for the Deaf." In 2021 Sixth International Conference on Informatics and Computing (ICIC), pp. 1-6. IEEE, 2021;
- Xu, Dawei, Jiaqi Gao, Fudong Wu, Lijuan Shi, Yijie She, and Zhao Jian. "Design of Auxiliary Hearing Compensation System Based on Bluetooth for Deaf Children." In 2020 International Conference on Virtual Reality and Visualization (ICVRV), pp. 213-217. IEEE, 2020.

For example, the library of keywords may include a set of names or labels, which can be updated depending on the user's address book. In a population with hearing loss, pronunciation may change over time and become poor, and the keyword recognition system is preferably tuned to that possibility and adaptive to changes. Typically, reprogramming the neural network weights is performed on a smartphone or cloud processing system.

The system preferably also includes a cognitive assessment mode, to determine when the user is lucid or has diminished cognitive capacity. In the former case, direct control over system operation is preferred. In the latter case, the system preferably imposes filters in order to avoid objectively undesirable or unintended actuation of system functions. The system preferably also has an emergency mode which automatically issues an emergency alert as appropriate.

The emergency alert may be issued to nearby communication partners, as well as through communications over WiFi (internet) and Bluetooth. For example, a paired cellphone may automatically call 911, with an automated message or voice communication to the user or another caregiver or responsible party.

The system may operate similarly to an Amazon Alexa voice assistant, though with some important differences. An amazon Alexa has a single "wake word", and therefore provides only a single concurrent option for local speech processing. While this may be a technological implementation choice, the issue is deeper. According to the design, after awakening, digitized voice signals are communicated remotely, and basically no activity of an Alexa voice assistance is possible without control by a cloud server. In contrast, the present technology provides a limited vocabulary, and permits local processing and action, in most cases not requiring any remote processing of speech. While remote speech recognition processing in the cloud is not precluded, a basic set of intercom functionality is available in its absence.

The system operates by processing sounds produced by the wearer, listening for keywords. The keyword may be a recognized name of a person with whom audible communications are frequent. Upon hearing the keyword/name, the system may request confirmation, or proceed directly to opening a communication channel with a device associated with that person. In the simplest case, the other person also wears hearing aids, and therefore the process is symmetric. In other cases, the system initiates contact through another modality, such as through a linked cellphone, DECT, voice over WiFi, VOIP, or the like.

The communication channel may be dropped after a timeout period of no voice communication, or in response to a communication termination command, such as "Bye". Communication may be reestablished by speaking the name of the person. Similarly, a conference call or group conversation may be established using simple commands, such as "add <name>".

When the wireless communication and audible communication are both concurrently available, the system preferably performs echo suppression, for example by subtracting the audible channel from the wirelessly communicated information. In general, the sonic delay of an acoustic transmission will be lower than the packet delay of the wireless communication. However, if the packet delay is longer, then the audible channel may dominate.

The system has a number of modes of operation, for example, acoustic communication without intercom, direct hearing aid-to-hearing aid wireless communication, communications mediated by Bluetooth hosts (e.g., cellphone), Voice over WiFi, peer-to-peer conferencing; central node intermediated conferencing, etc.

For example, when two people are adjacent to each other in the same room, an inferred communication mode may be preferred in which all nearby persons are engaged in a group chat, though with an override option to provide private communications. On the other hand, when distances are greater or physical or visual barriers are present, such as people in different rooms, an individually addressed radio frequency communication mode is preferred.

When line of sight is present between intended targets, acoustic, ultrasonic, optical, infrared, or microwave communications may be employed.

When a person wearing the device speaks, the sounds are broadcast over a short-range channel to all nearby receivers. A wearer of a receiver may speak a decline command to shut down the channel. The wearer may also speak a command to open a private channel rather than a public one.

The opening of a private communication channel may be activated by a targeted wake word, representing the name of the person with whom the communication is to be conducted. When the word is spoken by the wearer, a digital processor monitoring the local microphone of the hearing aid recognizes the word (from a limited recognized vocabulary) and determines a target communication partner.

The distance to the targeted hearing aid may be determined by receive signal strength, proximity to a beacon or transmitter, and/or triangulation. If the distance is short, for example, where each hearing aid is in acoustic communication range as determined by the ability of the microphone of one to sense sounds from the speaker of the other, or based on a Bluetooth received signal strength indicator (RSSI). If the distance is longer, then no direct acoustic communication is available, but the Bluetooth radio frequency communications are available. If no direct Bluetooth is available, then communications may be possible through pairing with respective cellular phones. Automatic handover between modes is preferred.

The system preferably distinguishes between a wake word pronunciation, and a conversational pronunciation and/or context. Therefore, casual use of the wake word during conversation will not trigger unwanted activation of the system. On the other hand, intentional use of the wake word in proper pronunciation will open communications if the communication partner is not within ear shot, or even conference in multiple parties to form a group conversation.

Cessation of the communication may be triggered by silence for an extended period, or a stop word, such as "goodbye". Further, to save power, the communication may be intermittent, with the Bluetooth channel reestablished after short breaks without requiring the wake word to trigger commencement of communication.

The hearing aids may be binaural, with each ear having a separate but coordinated Bluetooth channel.

According to one aspect, an intercom system made of at least two sets of hearing aids is provided, each set of hearing aids being associated with one user having one or two hearing aids, wherein each hearing aid includes a wireless communication module present to facilitate direct communication between the persons having hearing loss, i.e., an elderly couple or a domestic partner, both with some hearing loss living in the same home to communicate using the wireless communication module present within the hearing aid devices of the system. The wireless communication module may be a Bluetooth module which facilitates pairing and communication between two hearing aid devices using a Bluetooth or Bluetooth Low Energy (BLE) communication protocol over a Bluetooth network.

The intercom system may include a plurality of hearing aid devices comprising a wireless communication module such as, for example, Bluetooth or a BLE module, to conduct communication between at least two users of the hearing aids directly through the worn hearing aid device.

The radio transceiver may also be other than Bluetooth (IEEE-802.15.1), for example Zigbee (IEEE-802.15.4), WiFi (IEEE 802.11), Mesh networking for personal area network (IEEE-802.15.5), or body area network (IEEE-802.15.6). While compliance with IEEE-802 standards is not required, it facilitates interoperability. The system may also be multimodal, for example including WiFi, Bluetooth and Zigbee. ldapwiki.com/wiki/IEEE % 20802; www.rfwireless-world.com/Articles/IEEE_802.html; en.wikipedia.org/wiki/Bluetooth; en.wikipedia.org/wiki/Wi-Fi; en.wikipedia.org/wiki/Zigbee; en.wikipedia.org/wiki/IEEE_802.15

In some cases, where line of sight between participants is available, optical communications may be employed, for example IrDA (en.wikipedia.org/wiki/Infrared_Data_Association), etc.

Proximity of the devices may be determined based on received signal strength, triangulation or trilateralization (or use of more or less than three signals with associated locational ambiguity or overspecification).

The typical system listens for incoming communications on a Bluetooth or another wakeup signaling channel, e.g., 15-150 kHz. See, AS3933 LF Receiver IC, www.sciosense.com/products/wireless-sensor-nodes/as3933-lf-receiver-ic/; Gavrikov, Paul, Pascal E. Verboket, Tolgay Ungan, Markus Müller, Matthias Lai, Christian Schindelhauer, Leonhard M. Reindl, and Thomas Wendt. "Using Bluetooth Low Energy to trigger an ultra-low power FSK wake-up receiver." In 2018 25th IEEE International Conference on Electronics, Circuits and Systems (ICECS), pp. 781-784. IEEE, 2018. This permits a standard Bluetooth transmitter Nordic Semiconductor nRF 52832, to wake a receiver, without requiring the Bluetooth receiver to be on before reception. A nRF5340 or nRF52833 SoC may also be employed. Preferably, BLE direction finding and/or Bluetooth Mesh protocols are supported.

The architecture therefore provides that a local sound emission from a person triggers a wakeup of a microphone signal processing circuit, and associated downstream processing. In some cases, the microphone signal processing circuit and keyword spotting processor are distinct from the microcontroller managing the radio transceiver, and may be a low power microcontroller such as a low voltage, low clock rate ARM Cortex M0, or an application specified integrated circuit. The keyword spotter may have two stages; a low threshold, e.g., 75% probability of any valid keyword being present, to trigger the next phase of analysis. In the next phase, the main microcontroller wakes up, and the radio is initiated. The main microcontroller then completes the analysis, to determine presence of a specific keyword with high probability, e.g., 92-98% probability discrimination.

With the main microcontroller active, the system may provide ambiguity resolution for keywords or simple command structures/grammars. See US patent and Patents Application Nos. 20140025380; U.S. Pat. Nos. 9,053,708; 8,629,789; 9,151,633; 20150081444; 8,682,726; 11,189,273; 20190005953; 20170132931; 9,551,582; 20160025500; 10,127,816; 9,129,505; 20140097957; 20140226855; 9,922,256; 9,746,916; 20160299959; 9,389,681; 10,928,498; 9,602,807; 20140168369; 9,208,566; 10,409,836; 20150043770; 11,019,246; 20200195833; 10,594,916; 20190387152; 20210117681; 9,354,310; 20210118442; 20150324568; 20190182415; 10,419,655; 20210072370; 20170055130; 20200064458; 10,890,653; 8,953,889; 20200151206; 20210118440; 9,275,051; 20200264311; 20140316785; 9,190,063; 8,762,152; 9,076,448; 20200309930; 20180373200; 9,097,536; 20200082198; 10,969,740; 10,912,480; 10,641,861; 20200384264; 10,589,087; 20210181674; 20150290454; 20160120432; 20200333426; 20210134286; 20200110170; 10,761,206; 20210360199; 8,994,591; 20210358193; 20210360197; 10,785,365; 20210119955; 20210360195; 9,197,736; 20210358194; 10,302,810; 20180217292; 20200116893; 20140337733; 20210224658; 20210392231; 20200379079; 10,467,811; 20170289341; 20210392175; 20210392296; 20140323142; 20210392295; 20210207974; 20210120206; 20210112154; 9,595,115; 20200264310; 20210358195; 9,060,683; 20210360196; 20210117712; 20210360198; 20210358227; 8,660,355; 8,917,716; 20180115794; 10,154,295; 9,854,288; 20150099941; 20150150031; 20180352014; 20140266787; 9,814,425; 8,708,903; 20150350727; 10,684,350; 20150250393; 9,137,558; 20150290453; 20140194702; 20150269825; 20210183406; 20140063255; 10,805,370; 20210029184; 20210400235; 9,820,657; 8,880,296; 11,159,767; 20210314523; 20210109974; 9,256,806; 20210117623; 20210409234; 20210117479; 20200182995; 20150338915; 20210117214; 20170362585; 10,620,700; 9,215,980; 8,747,313; 8,968,195; 20210117780; 20160066788; 20150105631; 20150154317; 20140121476; 20190057509; 20210150736; 10,929,987; 20200127988; 20140055284; 20210117624; 20140249429; 9,107,586; 8,727,978; 9,801,542; 11,045,271; 8,652,038; 20150359467; 8,764,651; 8,626,246; 9,028,405; 20190154439; 9,820,658; 9,533,096; 9,215,583; 20160379082; 20180293802; 10,729,336; 20200020171; 10,610,111; 20180083816; 10,367,674; 10,438,415; 8,938,306; 11,051,704; 9,118,771; 20140120981; 20150057518; 9,460,346; 20200193640; 20160287166; 20180168459; 9,143,638; 10,769,431; 20170364746; 20200281480; 20140071272; 8,630,965; 20190087656; 9,907,473; 20140168716; 9,773,167; 20140104059; 9,319,555; 20140143064; 20170257474; 9,557,162; 10,666,784; 9,916,519; 20150024800; 20210034386; 20180189352; 9,351,640; 20170017837; 9,462,107; 20180248995; 20140253977; 20190320056; 9,888,105; 20160295062; 20150244850; 8,977,293; 8,886,222; 10,270,896; 9,444,924; 20180189356; 10,115,041; 8,747,336; 9,609,107; 20140351765; 20180191860; 8,831,365; 20190277970; 9,600,069; 9,952,323; 20180231660; 20150063714; 8,660,891; 10,605,922; 20150285625; 10,295,669; 9,703,892; 8,684,900; 20140181100; 20210117661; 10,423,862; 20190156162; 20190278983; 8,989,718; 20140180825; 20210113099; 8,666,376; 20160373891; 10,929,654; 8,805,339; 20190020530; 8,737,986; 20170235931; 10,156,900; 9,234,744; 20150326570; 20190117809; 10,833,912; 9,754,287; 11,093,865; 9,865,176; 20210166159; 20140333794; 8,711,440; 8,684,922; 20140025502; 8,843,396; 11,110,191; 20150125832; 20200020356; 10,803,482; 10,013,766; 9,204,796; 20160180384; 8,718,617; 8,798,594; 20140046761; 10,307,060; 9,113,076; 8,725,126; 20150054774; 20140324572; 8,843,395; 20180211395; 20140012665; 8,995,973; 20140232889; 20190307328; 9,271,133; 9,195,993; 8,638,363; 20150304797; 20170236407; 20160035082; 20140344065; 20170140219; 9,785,975; 8,774,777; 10,872,636; 20150011194; 20140164113; 8,768,313; 20140012664; 20180233028; 10,977,799; 20200077892; 20190038133; 9,886,845; 9,390,436; 9,775,520; 8,958,779; 20140214526; 20170347886; 20140273998; 8,798,592; 8,688,088; 9,110,996; 8,755,776; 20150019329; 20180184907; 20140077946; 20160140834; 20210193179; 8,805,110; 10,362,940; 20140163425; 9,384,500; 8,798,595; 8,995,968; 20180096203; 10,911,894; 20210186329; 20210241607; 20140214527; 8,737,972; 8,655,891; 8,713,418; 9,811,728; 8,990,235; 9,565,512; 20170215028; 8,929,877; 10,517,479; 10,594,689; 9,386,150; 20140315527; 11,102,201; 8,626,736; 20140129332; 9,223,878; 20140025494; 8,832,100; 9,901,252; 9,031,986; 20160360965; 8,712,395; 20140236718; 20190122266; 9,454,772; 9,471,925; 8,688,671; 20200287898; 11,062,357; 9,076,175; 20210342890; 20160225027; 8,768,319; 9,804,712; 20180025010; 20140089089; 8,631,018; 9,918,183; 9,075,779; 20150068069; 10,571,926; 10,922,957; 8,680,991; 20160253342; 20140080428; 20140122243; 9,811,589; 20140215513; 10,038,756; 20200320776; 10,571,925; 10,585,942; 9,271,023; 20210144517; 9,201, 979; 8,819,659; 8,812,526; 10,592,930; 20200192388; 20200363241; 8,724,829; 9,008,724; 20150358525; 9,692,984; 20210018604; 11,002,837; 9,058,406; 8,886,206; 20210255294; 20140139608; 8,755,837; 20160167164; 8,849,259; 20170074652; 20140193087; 8,855,712; 9,104,915; 20140169686; 9,204,038; 20150022675; 20210089040; 20200284883; 9,208,384; 8,855,372; 8,873,853; 20140219566; 20200285855; 20200225673; 9,314,182; 20200285912; 11,153,503; 10,788,836; 20210287430; 9,186,082; 20200363815; 20200409376; 20190278091; 20200285464; 11,069,082; 10,719,134; 20200285788; 20200285977; 20180329511; 20190033415; 20180143275; 9,946,076; 20210133568; 10,816,629; 20190033414; 20180143281; 20140089243; 20210256825; 10,585,156; 20190362610; 10,534,058; 9,786,145; 10,955,504; 20210127415; 10,416,264; 20180144467; 11,195,396; 10,718,842; 20160085999; 10,916,113; 20190011521; 20200341095; 10,925,083; 20200221487; 20190035245; 20190349728; 9,224,096; 9,941,959; 10,373,462; 10,354,505; 20160110975; 20170237484; 20200244357; 20190158176; 10,476,589; 10,404,368; 10,243,652; 20210298049; 20190123820; 20150228004; 20190326986; 20210195457; 10,693,556; 11,133,863; 8,948,596; 20180198520; 20140143818; 8,977,132; 10,084,538; 8,811,191; 9,019,855; 9,088,310; 20210012282; 8,650,606; 20140010542; 20140301490; 8,806,559; 20140047489; 20160173195; 20210314925; 9,577,746; 9,660,729; 20150222358; 20140282783; 8,949,918; 20200286505; 20150227890; 20200101981; 11,161,519; 20190361917; 20180117447; 10,022,613; 20210282736; 20210081752; 20210352690; 10,532,268; 20180117446; 10,046,228; 20200387896; 20180326291; 20180264347; 20200358872; 20210367804; 10,195,513; 20210058367; 10,985,934; 20200344084; 20210307036; 20200358636; 20210234719; 20210029080; 20210234720; 20210234721; 20210360673; 11,115,230; 20200389429; 10,880,266; 20200412691; 20210218538; 10,142,276; 20210374547; 20200358879; 11,190,374; 20190358515; 10,789,590; 20200220746; 20210021570; 20140344718; 11,130,042; 20180078843; 10,902,080; 20210067577; 8,676,937; 20170232300; 20190109810; 9,849,364; 20200356618; 20210133272; 10,963,531; 20210200830; 20200358858; 20200394246; 20210274526.

The wakeup signal for the main microcontroller optionally sends out a beacon for hearing aids of other persons, to awaken them as well, on the presumption that a speech communication is imminent, or that processing or packet forwarding may be required imminently. The beacon is typically a short-range communication, since the Bluetooth radio is not awakened yet. After the main microcontroller is awakened, any beacon can likely wait unto the processing routine is completed, and need not be proactive before the need for communication is determined. This is because the main microcontroller has significant processing capability. However, in some cases, preemptive beacons are desirable even before a processing result is available. By preemptively awakening the microcontroller early, latencies may be reduced, and coordinated action between hearing aids facilitated. For example, in natural conversation, a wake word or keyword may be part of a human conversation, and this preamble to the conversation needs to be communicated to the communication partner. If the system delays too long in waking up and transmitting the initial words, there will be an unnatural delay in the conversation thereafter. As a result, the system should be queued up to transmit the initial words (as required by system logic) immediately, and in some cases, the stream may be broadcast before a determination is made regarding the requirement to reproduce the speech.

The receiving system may therefore receive a beacon signal, which may be a broadcast or addressed communication, and then awaken, including full radio functionality. An audio stream may then be received, which is buffered, pending a confirmation commands to replay the stream. Where a mesh network is required to pass the stream to the desired endpoint(s), the beacon and packets of the stream may be distributed as the further reaches of the mesh network come online.

Because of latencies and power consumption, a preferred architecture employs a set of heterogeneous devices, in which the hearing aids and other ultra-low power devices are spared unnecessary activation in favor of other devices, which may include intelligent switches, routers, hotspots and relays, infrastructure, and the like. Such other devices are likely to have "always-on" radio transceivers and microcontrollers, and therefore permit aggressive power saving protocols in the ultra-low power devices.

It is noted that in some cases, the "awakening" comprises an increase in clock rate and corresponding system processing capacity. In that case, the wakening latency may be short. In other cases, portions of the integrated circuit may be powered down, and require microseconds or milliseconds to power up, stabilize and initialize (as required). In other cases, power supply circuits may be started, which may require tens of milliseconds or more to stabilize. In the case of a Bluetooth radio, it must listen before broadcast, and take other steps defined by protocol before transmitting data.

Bluetooth radio devices typically support multiple low-power modes, some of which may be proprietary to the device itself. The Windows Bluetooth driver stack requires that a Bluetooth radio support the following three device power states: Active (D0), Sleep (D2), and Off (D3). Device power management for a Bluetooth radio is expected to operate in a consistent way across all system power states. The Bluetooth radio does not enter a special power management mode when the system enters modern standby. Instead, the Bluetooth radio is transitioned in and out of the Sleep (D2) state based on idle time-outs that are managed by BthPort. To support wake from modern standby on Bluetooth-attached HID input devices, the radio stays in the Sleep (D2) state and is armed for wake. Only paired Bluetooth HID device are allowed to wake the system during modern standby. The Bluetooth radio is expected to have a very low power consumption-less than one milliwatt—in the Sleep (D2) state if no devices are connected through RF links. The power consumption can be expected to vary based on the number of associated devices, the types of those devices, and their activity patterns. See docs.microsoft.com/en-us/windows-hardware/design/device-experiences/bluetooth-power-management-for-modern-standby-platforms The Bluetooth radio must also support the capability to turn off the radio through the radio management user interface. After the Bluetooth radio is turned off through this user interface, the radio is transitioned to the Off (D3) power state, in which it is expected to consume nearly zero watts.

In the D0 active state, the Bluetooth radio is actively communicating with an associated device on behalf of an application on the operating system.

In the Sleep (mostly idle with a low-rate duty cycle) D2 state, the Bluetooth radio is in a low-power state. The system has been paired with a remote Bluetooth device, but there is no connection between the two. That is, the device has been disconnected. The Bluetooth controller must be able to generate a wake signal (to the SoC if the radio is not integrated) when new data arrives from the paired device. Or, the Bluetooth radio has no associations. Or, the Bluetooth radio has an active connection that is idle (no data being sent/received) and the link is in sniff mode. In this state, the average power consumption is <4 milliwatts, and the exit latency to active is <100 milliseconds.

In the Off state D3, the Bluetooth radio is completely off (zero watts) or in a low-power state in which no radio state is preserved. The Bluetooth radio is not capable of generating a wake signal to the SoC in this state. The Bluetooth radio is also not able to emit or receive any radio signals-all RF components are powered off. Power consumption is zero or near zero, but the exit latency to active is <2 seconds. Note that if the sending radio is "Off", and the receiving radio is also "Off", the end-to-end turn-on latency will be <4 seconds, plus the delay in communicating the turn-on command, which cannot be communicated directly through the Bluetooth radio.

When the radio does not have any associated devices, the device is transitioned to D2 and persists it in that state until the pairing process begins. When the radio is associated with one or more devices, the Bluetooth driver uses an idle time-out to decide when to transition the Bluetooth radio from D0 to D2. This algorithm may use the pattern of Bluetooth usage by the operating system and applications to determine when to transition the radio to the D2 state. For example, the radio transitions to D2 several seconds after the last key press on a Bluetooth keyboard if there is no other activity on the Bluetooth radio.

The state of the Bluetooth radio transmitter is tied directly to the device power state. The radio transmitter is expected to be on when the radio is in the Active (D0) or Sleep (D2) power state. The radio transmitter must be turned off when the radio transitions to the Off (D3) state.

When the Bluetooth radio is turned on, the radio is transitioned to the Active (D0) state, the radio re-initialized, and then child protocol drivers are re-enumerated. When the radio transitions to Active (D0), any required GPIO lines must be toggled as part of the normal D0 sequence for the Bluetooth radio.

As discussed above, the invention provides various out of Bluetooth communication band mechanisms for waking communication partners, either in a broadcast or addressed mode. In the addressed mode, an out of band communication may communicate an 8-32 bit address and header to other nodes of an ad hoc network. The recipient of such a communication extracts a mode indicator, address information, and optionally forwarding information, which is processed without turning on the main microcontroller CPU processor. For example, in a 32 bit 15 kHz transmission, 8+2 bits may be address plus error coding, for each of two addressed targets, 8+2 bits may be protocol/action plus error coding, and the remaining two bits may be part of an emergency response protocol mechanism. The message consumes about 2 milliseconds to transmit. The AS3933 permits a 32-bit wakeup pattern.

Other out-of-band signals may include an ultrasonic beacon detectable by nearby microphones, optical emission, e.g., IrDA wakeup signal, or the like. Further, the system may remain in the D2 sleep state (and not move into D2 off state), and periodically listen for other nodes on the network. For example, all of the nodes may turn on the Bluetooth radios, and listen to the network every ten seconds for synchronization messages, including which nodes are present, and either explicit (e.g., physical location reference) or implicit (e.g., RSSI, angle of arrival, time of arrival) location information. A node will initialized by listening continuously for over ten seconds, to capture two synchronization periods, and thereafter calibrate its own clock to the actual period used by the other nodes in the network. The node then wakes up shortly before the synchronization messages are exchanged, and sequentially enumerate the nodes of the network within range. Various known mobile ad hoc network protocols may be used to arbitrate the message passing.

See, U.S. Pat. Nos. 11,082,344; 20190116544; 11,032,752; 20200287834; 20210367889; 20190297670; 11,082,324; 20200052997; 20140068105; 20150264627; 10,015,720; 20210367878; 10,912,149; 9,608,912; 20180014241; 9,756,549; 20150264626; 10,602,424; 20150249595; 9,001,645; 9,548,918; 20140247804; 9,386,502; 9,438,386; 11,129,045; 9,119,130; 9,510,264; 9,030,939; 20180376368; 9,232,458; 8,934,496; 8,942,197; 20140029624; 20210243671; 9,444,727; 9,331,931; 20140105033; 20170373979; 8,995,251; 20170272361; 8,885,630; 10,959,157; 11,050,671; 20190059041; 10,230,637; 10,178,019; 10,575,339; 9,906,291; 20170034041; 20180352581; 20200015146; 10,944,669; 9,515,874; 20140126348; 20180006833; 20170302478; 20170180262; 20170054717; 9,602,420; 20140126426; 10,326,617; 8,819,191; 9,917,785; 20160156450; 20140036912; 20140269759; 20140330947; 9,219,682; 20150271899; 9,949,129; 20180109954; 8,867,329; 9,071,533; 8,923,422; 20200359296; 9,166,845; 9,232,389; 9,590,790; 8,718,055; 9,225,589; 8,806,633; 20140105211; 20180013630; 20150002336; 9,615,266; 9,734,457; 20140222727; 9,426,716; 20140376361; 20140223155; 9,218,216; 9,652,720; 9,609,725; 20140222725; 20170324849; 9,563,440; 9,154,370; 20150186798; 10,904,097; 20140222726; 20150188801; 20150327260; 9,094,324; 9,793,948; 20140304427; 8,971,188; 9,769,821; 9,860,140; 10,038,766; 20140129876; 8,908,536; 11,159,430; 9,418,340; 8,942,301; 20150200810; 9,130,863; 9,240,913; 9,491,051; 9,072,100; 20140092753; 20160021647; 20210029038; 20150110159; 9,037,896; 20140126610; 20140022906; 9,264,349; 9,176,832; 8,948,229; 20150200846; 20160080030; 20200296001; 20150195136; 20140092752; 9,197,380; 20140006893; 20150341275; 9,577,914; 20140222728; 9,973,596; 9,503,359; 20150372903; 20190036900; 20190173200; 20140016643; 9,020,008; 20150350018; 20140281670; 10,559,892; 20150237130; 9,236,904; 10,277,476; 20170126647; 20140222996; 20190297004; 20140222983; 20150341140; 9,436,917; 20140379900; 9,712,433; 10,122,695; 8,923,285; 9,391,878; 20140269402; 20140376427; 9,673,858; 20150195212; 20140108643; 8,699,368; 9,332,072; 20150195144; 10,412,074; 9,413,479; 20160021009; 8,738,944; 20140064172; 9,553,772; 9,537,593; 20140029445; 20150155637; 20150200738; 20140126354; 9,716,528; 20150188751; 20150111591; 10,425,294; 20140105015; 20150319077; 8,817,665; 8,964,762; 20210126642; 9,544,220; 20140219133; 8,949,959; 20140029432; 20140219078; 9,426,020; 8,799,510; 9,485,153; 9,413,643; 9,432,248; 11,031,938; 8,984,277; 10,148,537; 9,473,412; 10,097,469; 9,516,025; 9,100,305; 8,774,051; 20160020988; 9,178,772; 9,565,111; 9,391,784; 8,699,333; 20140222730; 9,385,933; 8,787,392; 9,077,772; 9,723,538; 9,306,841; 9,525,617; 9,667,536; 9,124,482; 9,106,555; 9,847,889; 20150334031; 20140126423; 20150156199; 20170237669; 9,432,312; 9,531,635; 20140129734; 9,794,179; 20170054644; 20170078170; 20190363951; 8,874,788; 9,602,379; 8,756,449; 20140222729; 20150188934; 9,286,473; 11,128,554; 9,350,645; 10,310,944; 8,908,626; 20140219103; 9,306,833; 9,398,035; 20140105027;

20150195216; 20150195184; 9,774,522; 9,443,204; 9,253,021; 20180146007; 20180145841; 20160021010; 9,967,170; 10,581,932; 8,842,630; 20150195185; 9,411,916; 20150186642; 20160028763; 9,553,773; 20140219114; 20150186775; 20140222998; 9,785,509; 9,369,351; 9,553,796; 9,473,364; 9,490,419; 9,462,040; 20210029653; 9,900,342; 20170364409; 20150207725; 10,887,851; 9,614,770; 9,832,242; 9,374,281; 9,900,169; 8,937,886; 20150188935; 20160381087; 20170163527; 20140092769; 20160021599; 9,450,642; 10,028,198; 20150193697; 10,200,404; 20180302836; 20160234272; 10,270,606; 9,225,616; 20140222731; 20150195192; 10,454,834; 10,320,613; 8,908,621; 8,630,291; 20140269413; 20140222975; 9,794,797; 8,774,050; 20140222748; 9,369,177; 9,654,389; 9,294,488; 9,667,501; 9,059,929; 20160021013; 9,128,689; 20140372585; 9,497,215; 20140095864; 20150318892; 9,198,203; 9,626,628; 9,338,065; 20160021018; 8,800,010; 8,638,667; 9,485,174; 20200111028; 9,210,045; 9,628,362; 20160277201; 9,426,035; 8,743,768; 20180083862; 20150195126; 9,276,845; 20160028762; 20150003428; 20150195149; 9,544,018; 20140245055; 8,934,366; 10,540,605; 20160028754; 20160142248; 9,001,669; 9,705,766; 10,320,657; 20160330107; 8,861,390; 8,879,604; 20160028764; 10,039,046; 10,231,253; 9,853,883; 9,426,040; 20140328346; 9,565,108; 20150186799; 20180310222; 20150193693; 20150195171; 20140379896; 9,848,422; 20160134161; 20160028751; 20140222997; 9,413,779; 20150092560; 20160028752; 9,143,456; 20180124812; 9,450,972; 9,013,983; 9,749,410; 10,681,608; 9,647,494; 9,281,865; 9,491,076; 9,444,598; 20160021596; 20140269592; 20160020997; 20160132397; 20180049043; 9,563,854; 10,785,809; 9,407,646; 8,761,285; 9,270,584; 20160380776; 9,350,683; 9,521,158; 20160026542; 20150030033; 9,154,407; 9,356,858; 20150023174; 20160149805; 20150200713; 8,824,471; 20140372577; 9,317,378; 9,503,466; 9,401,863; 20150193695; 20150195146; 20150180772; 9,698,864; 20160248661; 20160134539; 20190317749; 8,891,534; 20160028750; 9,450,978; 20150063365; 9,698,867; 9,160,760; 9,641,382; 20170295081; 9,019,846; 8,879,613; 10,686,689; 10,038,617; 20140136881; 9,306,620; 20180302312; 20160212740; 9,893,985; 9,876,747; 20210105668; 8,954,582; 9,634,982; 20160182121; 8,667,084; 20160028755; 9,674,207; 9,692,644; 9,635,050; 20150193694; 10,171,332; 20170164264; 20150193696; 9,001,676; 20150195296; 10,051,546; 9,870,537; 9,356,875; 9,231,965; 20170187661; 9,172,636; 9,722,905; 10,097,471; 20150333997; 20150195176; 10,103,970; 20160150501; 10,218,619; 20150026268; 8,780,953; 9,955,456; 10,075,360; 10,368,288; 9,311,670; 9,705,914; 9,036,509; 20150264554; 8,874,477; 20140286377; 9,654,937; 20170251339; 20170099226; 20170099684; 10,602,329; 9,549,363; 20190297556; 10,943,273; 20180068358; 20150023369; 10,104,712; 8,971,318; 20150023363; 20150195145; 20180054771; 10,420,006; 20210192582; 20180054853; 10,945,188; 20160224951; 20190342817; 10,356,111; 20200187018; 10,764,809; 10,868,625; 10,567,975; 20170149639; 20170206512; 20190334644; 9,979,619; 9,615,264; 20140081793; 9,818,136; 20150311948; 20150043519; 9,088,983; 10,163,137; 20160028609; 20150043384; 9,172,613; 9,590,896; 9,559,750; 9,722,909; 8,891,588; 20150071295; 20150373615; 10,587,501; 20190363976; 20170075778; 9,842,034; 10,545,845; 8,843,241; 8,929,375; 9,532,332; 11,067,869; 20210232015; 10,303,035; 20190243207; 20190243206; 11,016,357; 20190155122; 20200026141; 20210149266; 20160154290.

After the messages are passed and if no messages require further action, the radios reenter the D2 sleep state. If a message requires action by one of the nodes, that node remains active, and either processes the received command, which may, for example, indicate that the node is an intended recipient of a pending communication, or the node may be requested to forward a packet to a radio which is not in direct communication with a requestor.

While this arrangement imposes potentially significant latencies, the base usage may be about 1% of continuous active D0 power consumption. Further, this potentially avoids the need for out-of-band signaling.

In an embodiment, in direct connection of hearing aid devices over the Bluetooth network, the BLE or Bluetooth enabled hearing aid devices are paired together to form a mesh network enabling direct communication between the users of the connected hearing aid devices with each other over the mesh network without the use of a network hub. In an embodiment, the mesh network is partially connected or fully connected mesh topology.

In an embodiment, the wireless communication module or specifically a Bluetooth module configured within each of the hearing aid devices pairs with a mediator network hub device in a star network, where each of the hearing aid devices behaves as a peripheral node of a network, and pairs with the mediator network hub device working as a central node. The central node or a mediator network hub device creates a Bluetooth or BLE network to facilitate the Bluetooth enabled hearing aid devices to pair to facilitate the users of the hearing aid devices to communicate with each other through the mediator network hub device in star network.

In an embodiment, each of the plurality of hearing aid devices may include their separate Bluetooth enabled mediator network hub device paired with each of the Plurality of hearing aid devices. The mediator network hub device paired with the first hearing aid device connects with at least one other mediator network hub device paired with at least one second hearing aid device to facilitate a communication between the first and the at least one second hearing aid device. In an embodiment, the mediator network hub device paired with the first hearing aid device connects with the at least one other mediator network hub devices over a Bluetooth or a BLE network. The mediator network hub devices connects the hearing aid devices with the BLE network to facilitate wireless communication between at least two sets of hearing aid devices of the system.

In an embodiment, the intercommunication system includes a first hearing aid device and at least one second hearing device. The first hearing aid device comprises a first bone conducting microphone with a first data conversion module, a first Bluetooth or BLE module, a first amplifier and a first speaker. The at least one second hearing aid device comprises a second Bluetooth or BLE module, a second bone conducting microphone with a second data conversion module, a second amplifier and a second speaker. In an embodiment, the first data conversion module and the second data conversion module both is a combination of an Analog to Digital Converter (ADC) and Digital to Analog Converter (DAC).

According to one aspect, a method of working of present intercommunication system where the first bone conducting microphone with the first data conversion module catches the sound signal transmitting through the skull bones of the first user and digitizes said sound signal that can be transmitted over a BLE or Bluetooth network without distorting, where the bone conducting microphone eliminates the background environmental noise and ambient sound. The first Bluetooth or BLE module configured within the first hearing device transmits said digitized sound signals to at least one second hearing aid device coupled with the first hearing aid device over a BLE or Bluetooth network. When the digitized sound data from the first hearing aid device is received by the second hearing aid device using the second Bluetooth or BLE module, the second microphone with the second data conversion module configured within the second hearing aid device re-converts said digitized sound data into the analog sound signal which is then amplified by the second amplifier and emitted by the second speaker of the second hearing aid device into the ears of the second user.

In an embodiment, a hearing aid is provided, comprising: an input port configured to receive a signal representing sounds; an output port configured to output an electrical signal representing acoustic waves; a wireless transceiver, configured to bidirectionally communicate audio signals; and a digital processor configured to: receive an audio signal from the wireless transceiver; define the output electrical signal based on the signal from the input port, the communicated audio signals, and an audio equalization profile; and implement a speech controlled user interface, configured to select a counterparty wireless transceiver for communication through the wireless transceiver from a plurality of counterparty wireless transceivers based on a spoken command.

The hearing aid may further comprise a housing, wherein the wireless transceiver, digital processor and a self-contained power source are contained within the housing. The hearing aid may further comprise a microphone configured to produce the signal representing sounds and a speaker configured to generate the acoustic waves, the microphone and the speaker being contained within the housing, wherein the housing is an intraaural housing, and the microphone comprises a bone conduction microphone.

The hearing aid may further comprise at least one sensor selected from the group consisting of an accelerometer, a gyroscope, an absolute position sensor, and a relative position sensor, wherein the digital processor is further configured to select the counterparty dependent on a signal from the sensor.

The wireless transceiver may comprise at least one of a Bluetooth transceiver and a Bluetooth Low Energy transceiver configured to implement a mesh network.

The digital processor may be further configured to perform keyword spotting from among a plurality of predetermined keywords.

The digital processor may be further configured to perform keyword spotting using a convolutional neural network.

The spoken command may comprise a human name.

The hearing aid may further comprise at least one mediator network hub device communicatively coupled with the wireless transceiver, configured to facilitate communications between the wireless transceiver and a respective wireless transceiver of another hearing aid. The wireless transceiver may be configured to communicate through a Bluetooth mesh network.

It is another embodiment to provide a Bluetooth enabled intercom system, comprising; and at least one mediator network hub device communicatively coupled with a Bluetooth or BLE network interface; a plurality of Bluetooth enabled hearing aid devices, each comprising a Bluetooth module, a microphone with a data conversion module, an amplifier and a speaker.

The microphone may comprise a bone conduction microphone.

At least two Bluetooth enabled hearing aid devices may be communicatively coupled through the Bluetooth or BLE network. The at least two Bluetooth enabled hearing aid devices may be communicatively coupled through the at least one mediator network hub device.

In an embodiment, the first hearing aid device and the second hearing aid device are connected over a BLE network through a mediator network hub device that pairs with the first hearing aid device and the second hearing aid device. The first hearing aid device and a second hearing aid device are each associated with a separate mediator network hub device paired with the respective hearing aid device using a BLE network, where the mediator network hub device connects with other mediator network hub devices associated with at least one other hearing aid device over a Bluetooth, BLE network, 4G/LTE network, 5G network, 6G network, the internet, or Wi-Fi (n/ac/ax) network to facilitate communication between the hearing aid devices.

It is an embodiment to provide a Bluetooth hearing aid, comprising: a housing; a microphone configured to produce a microphone output signal representing sounds transduced by the microphone; an earphone speaker configured to convert an output electrical signal into acoustic waves; a Bluetooth wireless transceiver, configured to bidirectionally communicate digital information packets; and a digital processor, wherein the microphone, Bluetooth wireless transceiver, and digital processor are each contained within the housing, the digital processor being configured to: receive an audio signal from the Bluetooth wireless transceiver for conversion to the output electrical signal; control an amplitude of the output electrical signal in a frequency-specific manner for conversion to the output electrical signal; implement a keyword spotting process for recognition of at least eight different keywords comprising identification of a plurality of counterparty wireless transceivers; selectively dependent on a recognized keyword initiate a communication through the Bluetooth wireless transceiver with a particular counterparty wireless transceiver or group of counterparty wireless transceivers, and terminate the communication with a terminate spoken command.

It is also an object to provide a hearing aid, comprising: a microphone configured to produce a microphone output signal representing sounds transduced by the microphone; an earphone speaker configured to convert an output electrical signal into acoustic waves; a wakeup processor, configured to generate a wakeup signal dependent on a sound transduced by the microphone, and a radio frequency signal; and a Bluetooth wireless transceiver module, responsive to the wakeup signal; the Bluetooth wireless transceiver module having an automated processor configured to: bidirectionally stream audio signals; equalize the output electrical signal dependent on a hearing profile; spot a plurality of different keywords; and selectively control a pairing selected from a plurality of possible pairings of the Bluetooth wireless transceiver module dependent on a spotted keyword of the plurality of different keywords.

An objective of the present disclosure is to provide a hearing aid intercommunication system that may facilitate the partial or complete hearing impaired persons to communicate with each other even when travelling or when away from each other using the Bluetooth network enabled hearing aid devices of present system, where the Bluetooth or BLE protocol facilitates uninterrupted and stable connection and communication between the hearing aid devices.

Another objective of the present disclosure is to provide a bone conduction microphone configured within each of the hearing aid devices of the system to capture sound data of the users passing through the skull bones of the user preventing introduction of noise or ambient sound within the communication.

Another object is to provide a Bluetooth or BLE enabled intercommunication system that may be used by the group of bikers riding together to communicate with each other while riding and even with helmet worn, where the bikers can be a person with or without hearing disability. The communication supports groups, individual peer-to-peer communications, and subgroups.

Various objects, features, aspects and advantages of the inventive subject matter will become more apparent from the following detailed description of preferred embodiments, along with the accompanying drawing figures in which like numerals represent like components.

It is therefore an object to provide a hearing aid, comprising a housing; a microphone configured to produce a microphone output signal representing sounds transduced by the microphone; a speaker configured to convert an output electrical signal into acoustic waves; a wireless transceiver, configured to bidirectionally communicate audio signals; and a digital processor configured to: receive an audio signal from the wireless transceiver; define the output electrical signal based on the microphone output signal, the received audio signal, and an audio equalization profile; and implement a speech controlled user interface, configured to: select a counterparty wireless transceiver for communication through the wireless transceiver from a plurality of counterparty wireless transceivers based on a selection spoken command, and terminate the communication with a terminate spoken command, wherein the microphone, speaker, wireless transceiver, and digital processor are each within the housing.

The housing may be an intraaural housing.

The microphone may comprise a spatial array of microphones.

The microphone may comprise a bone conduction microphone.

The speaker may comprise an earphone.

The wireless transceiver may comprise a Bluetooth or BLE transceiver.

The wireless transceiver may be configured to implement a mesh network.

The digital processor may be further configured to perform keyword spotting.

The keyword spotting may recognize between 5 and 255 different keywords.

The digital processor may be further configured to perform keyword spotting using a convolutional neural network.

The hearing aid may further comprise a trigger circuit responsive to the microphone, configured to turn on the digital processor.

The selection spoken command may comprise a human name.

It is another object to provide a Bluetooth enabled intercom system, comprising: at least one mediator network hub device communicatively coupled with a Bluetooth or BLE network; and plurality of Bluetooth enabled hearing aid devices communicably coupled with the at least one mediator network hub device to facilitate intercommunication between the plurality of Bluetooth enabled hearing aid devices over the Bluetooth network.

Each of the plurality of hearing aid devices may further comprise a data conversion module, a bone conduction microphone, an amplifier and a speaker.

The data conversion module may comprise an Analog to Digital Converter (ADC) and a Digital to Analog Converter (DAC).

The speaker may be a bone conduction speaker.

The plurality of Bluetooth enabled hearing aid devices may be communicably coupled with each other through a Bluetooth module enabled in the Bluetooth network.

The at least one mediator network hub device may be selected from the group consisting of a smartphone, a laptop, a wearable smart device, a dedicated network hub device, a personal smart assistant or any other portable network device that may pair at least one of the plurality hearing aid devices with the network.

The at least one mediator network hub device may be selected from the group consisting of a Wi-Fi router or Wi-Fi card, a switch, an internet dongle, any third party domestic smart assistant or any portable wireless network device.

It is another object to provide a Bluetooth enabled intercom system, comprising: a Bluetooth or BLE network; at least one mediator network hub device communicatively coupled with the Bluetooth or BLE network; a first Bluetooth enabled hearing aid device of a first user comprising a first Bluetooth module, a first bone conduction microphone with a first data conversion module, a first amplifier and a first speaker; and at least one second Bluetooth enabled hearing aid device of at least one second user comprising a second Bluetooth module, a second bone conduction microphone with a second data conversion module, a second amplifier and a second speaker.

The first Bluetooth enabled hearing aid device may be communicatively coupled with the at least one second Bluetooth enabled hearing device over the Bluetooth or BLE network.

The first Bluetooth enabled hearing aid device and at least one second Bluetooth enabled hearing aid device may be communicatively coupled through the at least one mediator network hub device.

A sound signal from the first user may be captured by the first bone conduction microphone through a skull bone of the first user and converted into an electrical signal.

The converted electrical signal may be digitized by the first data conversion module and transmitted to the at least one second Bluetooth enabled hearing aid device enabled within the Bluetooth network.

The at least one second Bluetooth enabled hearing aid device may be coupled with the network using the second Bluetooth module, receives and re-converts the digitized signal from the first hearing aid device again into an analog audio signal using the second data conversion module, amplifies the re-converted analog audio signal using the second amplifier, and emits an amplified analog audio signal into an ear of at least one second user using the second speaker.

The first data conversion module and the second data conversion module may be an Analog to Digital Converter (ADC) and a Digital to Analog Converter (DAC) respectively.

The second speaker may be a bone conduction speaker.

It is a still further object to provide a method of intercommunication, comprising: receiving and converting into an electrical signal, by a first bone conduction microphone of a first Bluetooth enabled hearing aid device; a sound signal to be transmitted from a first user to at least one second Bluetooth enabled hearing aid device of at least one second user; converting, using a first data conversion module, the electrical signal into a digital data capable of being transmitted over a Bluetooth network; transmitting, by a first Bluetooth module, the digital data to at least one second Bluetooth enabled hearing aid device communicatively coupled within the Bluetooth network; receiving, by a second Bluetooth module of the at least one second Bluetooth enabled hearing aid device, the digital data transmitted by the first Bluetooth enabled hearing aid device; re-converting, by a second data conversion module of the at least one second Bluetooth enabled hearing aid device, received digital data again into an analog sound signal; amplifying, by a second amplifier of the at least one second Bluetooth enabled hearing aid device, the re-converted analog sound signal; and emitting, by a second speaker of the at least one second Bluetooth enabled hearing aid device, the amplified analog sound signal into an ear of the at least one second user.

The first and the at least one second Bluetooth enabled hearing aid device may be communicatively coupled over the Bluetooth network directly using the first Bluetooth module and the second Bluetooth module in a mesh network. The first and the at least one second Bluetooth enabled hearing aid device may be communicatively coupled over the Bluetooth network directly using the first Bluetooth module and the second Bluetooth module in a mesh network.

The microphone of the first Bluetooth enabled hearing aid device may comprise a bone conduction microphone, and the first Bluetooth enabled hearing aid device is contained within an intraaural housing with a self-contained power supply.

The first and the at least one second Bluetooth enabled hearing aid device may be communicatively coupled over the Bluetooth network through at least one mediator network hub device in a star network.

The at least one mediator network hub device may pair with the first and the at least one second Bluetooth enabled hearing aid device to communicatively couple them over the Bluetooth network.

The at least one mediator network hub device may be selected from the group consisting of a smartphone, a laptop, wearable smart device, a dedicated network hub device, a personal smart assistant, a Wi-Fi router or Wi-Fi card, a switch, an internet dongle, any third party domestic smart assistant and any other portable wireless network device.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENTS

Figure 1:
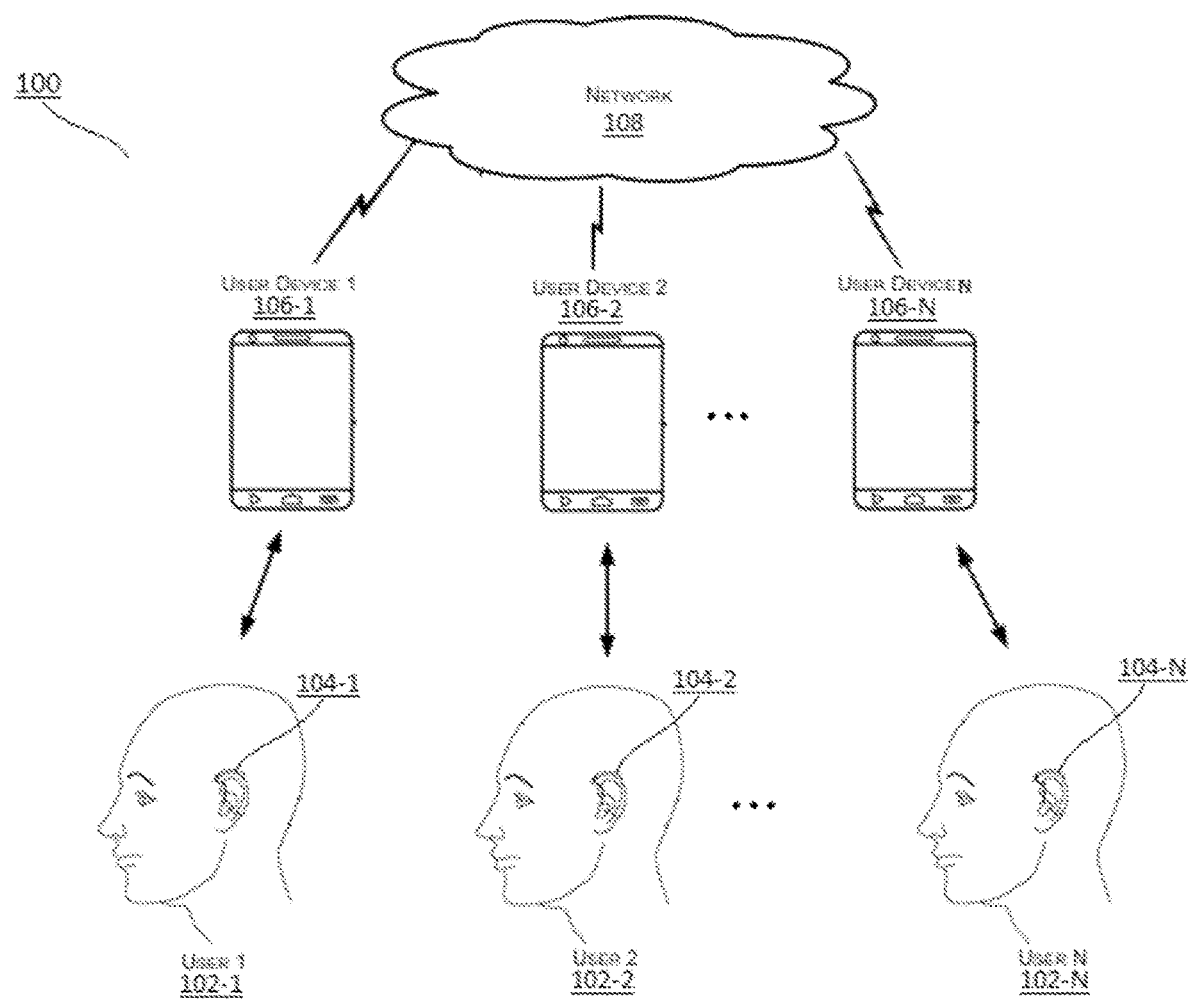
FIG. 1 illustrates one exemplary embodiment of present intercommunication system with smartphones serving as a mediator network hub to connect the hearing aid devices with the network.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

According to one aspect, the present invention generally relates to the Bluetooth enabled intercom system, more particularly the present disclosure provides a system of wireless communication enabled hearing aid devices with an inbuilt communication module to facilitate direct wireless communication transmission between two or more users through devices over a communication network. The communications may be addressed, and targeted based on the address. The address may correspond to a human name. The addressing may be extracted from a voice input, by a process of keyword spotting. The communication module may be a radio frequency communication, infrared or optical communication, ultrasonic communication, or the like. The communication channel is established by spoken commands, preferably continuous keyword spotting from a microphone input, to control establishment of communication channel(s), and dropping of those channels are conclusion of a conversation or timeout. The devices are preferably capable of performing hearing aid functions, though the devices may be wireless headphones.

FIG. 1 depicts one exemplary embodiment of a Bluetooth enabled intercom system 100 that is provided to facilitate the domestic partners with hearing disability living in the same home and sharing living quarters to communicate with each other directly through their worn hearing aid devices 104 wirelessly by connecting with each other directly or through the mediator network hub device in various topologies, over a Bluetooth enabled network.

In an aspect, the Bluetooth enabled intercom system 100 is made of a plurality of Bluetooth enabled hearing aid devices 104-1, 104-2 . . . 104-N (which are collectively referred to as hearing aid device 104, hereinafter) wearable by multiple partial or complete hearing impaired users or by bikers 102-1, 102-2 . . . 102-N (which are collectively referred to as user devices 102, hereinafter) riding in a group to directly communicate with each other through the hearing aid device 104 connected with each other through a BLE network. In an aspect, each of the plurality of hearing aid device 104 is communicatively coupled with other hearing aid devices 104 over a network 108 to facilitate transfer of data and communication between at least two of the plurality of hearing aid devices 104 of present system 100.

In an aspect, the Bluetooth enabled intercom system 100 of present disclosure may further include a plurality of user devices 106-1, 106-2 . . . 106-N (which are collectively referred to as user device 106, hereinafter) which are provided to work as a wireless intermediary hub to get paired with at least one hearing aid device 104-1 using the Bluetooth or BLE network to connect it with at least one other hearing aid devices (104-2 . . . 104-N) through the at least one other intermediary hub device or a user device (106-2 . . . 102-N) over the network 108. The devices are capable of pairing with a plurality of other devices over Bluetooth or other wireless communication interface. The communication protocol preferably permits opening a communication channel without security, though secure protocols with encryption and key exchange may also be supported. The at least one other user device 106 is further paired according to the communication protocol with at least one other hearing aid device 104 to facilitate communication. The one user device 106 paired with the at least one hearing aid device 104 communicatively couples with the at least one other user devices 106 over a network 108 where the network 108 is a Bluetooth or a BLE network. In an embodiment, the network is an internet, Wi-Fi, GSM network or a CDMA network. The user device 106 can include variety of computing systems including, but not limited to, a smartphone, laptop computer, desktop computer, portable computer, personal digital assistant, handheld device and a wearable smart device such as smart watch.

In an aspect, each Bluetooth enabled hearing aid device 104 of present system 100 is paired with a separate user device 106 of their respective user 102 using a Bluetooth network that connects the Bluetooth enabled hearing aid device 104 of said user 102 with the network 108 allowing the user 102-1 to communicate with other users (102-2 . . . or 102-N) having a hearing aid devices (104-2, . . . 104-N) communicatively coupled with the network 108 using respective user device (106-2, . . . 106-N) of the other users (102-2, . . . 102-N). In an embodiment the network 108 is also a Bluetooth or BLE network. In another embodiment, the network 108 is a wireless network which can be implemented as one of the different types of networks, such as, the internet, Wi-Fi, LTE network, CDMA network, and the like.

In another embodiment, each of the hearing aid devices 104 of present system 100 includes a module compatible with the IEEE 802.11ax standard and Bluetooth 5.1, 5.2, or 5.3/BLE, and is configured to be paired with respective user device 106 of the user 102 or a base station or hotspot. In an embodiment, the user device 106 is Bluetooth enabled smart phone that pairs with the hearing aid device 104 over a Bluetooth Low Energy (BLE) network. In an embodiment, the user devices 106 may discover available hearing aid devices 104, verify communication connections, identify devices available or compatible for connection service or send broadcast service request to one or more user devices.

The communication module may help discover available hearing aid devices 104 and identify necessary software components, data, or any other devices dependent information or parameters, if any, that need to be uploaded from the Bluetooth module to user device 106 to enable effective pairing or connection. Software components may be, for example, a device driver, an application, a special code or algorithm, an executable object or device dependent data, parameter, information, etc. That is, the tethering device may be useful for establishing the communication protocol, but the communications themselves may be directly between the earpieces without intermediate. The communications may also be between tethering devices, with the earpieces limited to communication with the tethering device. Hybrid techniques are possible.

Where the tethering device is reliably present, speech recognition or keyword spotting may be performed in the tethering device and not the hearing aid or earpiece. In that case, a micropower or nanopower implementation within the hearing aid or earpiece is not required, and rather a higher power implementation, such as on a smartphone host processor, may be employed. Further, if the smartphone is reliably connected to a cellular network, then the processing may be further shifted to the cloud or cellular base station processor.

The user device 106 communicatively couples the hearing aid device 104 with the network 108 to facilitate communication between said hearing aid device 104 and the other hearing aid devices 104 of the system 100 over the network 108. The network 108 includes a Bluetooth Low Energy (BLE) network through which the user devices 106 connect with each other to allow communication between their paired hearing aid devices 104. The user device 106, using the BLE protocol, connects with other user devices 106 in a mesh topology creating a mesh network, and facilitating each of the hearing aid devices 104 paired with the user device 106 to communicate with one or more other hearing aid device 106.

In an embodiment, each of the Bluetooth enabled hearing aid devices 104 of present system 100 further includes a microphone, which may be, but not limited to, a bone conducting microphone. The hearing aid devices 104 may further include a data conversion module, an amplifier and a speaker. In an embodiment, the data conversion module may upload necessary data from the Bluetooth module to the user device 106 so that the user 102 can output digital content to the speaker of the hearing aid device 104. Hearing aid device 104 may coordinate or manage the voice communication between a user device 106 to send or transmit the audio data to the hearing aid devices 104. In an embodiment, the bone conduction microphone is configured within the first hearing aid device 104-1 receives or captures sound signals of first user 102-1. In an embodiment, the bone conduction microphone is configured adjoining the surface of the hearing aid device coupling with the ear bone when worn by the user 102 allowing the microphone to pick up the sound signals transmitting through the ear bone the user 102 when he or she communicates, eliminating the environmental or background noise from entering and admixing with the input sound data. In an embodiment, the collected or captured input sound data and converted into the electrical signals, by the bone conduction microphone, is then converted into a digital signals by the data conversion module of the first hearing aid device 104-1 to avoid distortion during transmission of said digital signals to one or more second hearing aid devices (104-2, . . . , or 104-N). In an embodiment, the analog output electrical signal from the bone conduction microphone is converted into a digital signal using the data conversion module to prevent data loss or corruption by maintaining the integrity of the data.

In an embodiment, the data conversion module present within the at least one second hearing aid device (104-2, . . . , or 104-N) re-converts said digitized sound signal or digital signals again into the analog sound. The amplifier present within the at least one second hearing aid device (104-2, . . . , or 104-N) of present system 100 is configured to amplify said analog sound and emit it directly into the ear of the second user using the speaker provided within the at least one second hearing aid device (104-2, . . . , or 104-N). In an embodiment, the speaker is a bone conduction speaker that transmits the sound signals as a vibration through the bones of the second user.

In an embodiment, the present Bluetooth enabled intercommunication system also allows team of two or more hearing impaired users 102 to communicate with each other during travelling or when outside of home or even when they are at completely different locations. In an example, during the adventure trips or when travelling together, the users 102 may communicate directly using their worn hearing aid devices 104 which works as a wireless intercom facilitating wireless communication between the users 102 over a Bluetooth network, where the smartphone or any other smart user device 106 pairs with the hearing aid devices 104 using Bluetooth network to connect the hearing aid devices 104 with the network 108 for communication between two users 102 having a hearing aid devices 104 connected over the network 108. In an embodiment, the network 108 connecting two smart user devices 106 is a Bluetooth or a BLE network or a combination or both classic Bluetooth and BLE. In an embodiment, the network 108 is an internet or IrDA, home RF, HiperLan2, Wi-Fi or GSM network or CDMA network, wherein Wi-Fi is of any standard including 802.11ax, 802.11ac, 802.11n, 802.11 g, 802.11b and 802.11a. In an embodiment, the hearing aid devices 104 may include a radio adapter implemented to enable data/voice transmission among devices through radio links. A RF transceiver coupled with antenna is used to receive and transmit radio frequency signals. The RF transceiver may also convert radio signals into and from electronic signals. The RF transceiver is connected to an interface which may perform analog-to-digital conversion, digital-to-analog conversion, modulation/demodulation and other data conversion functions.

Figure 2:
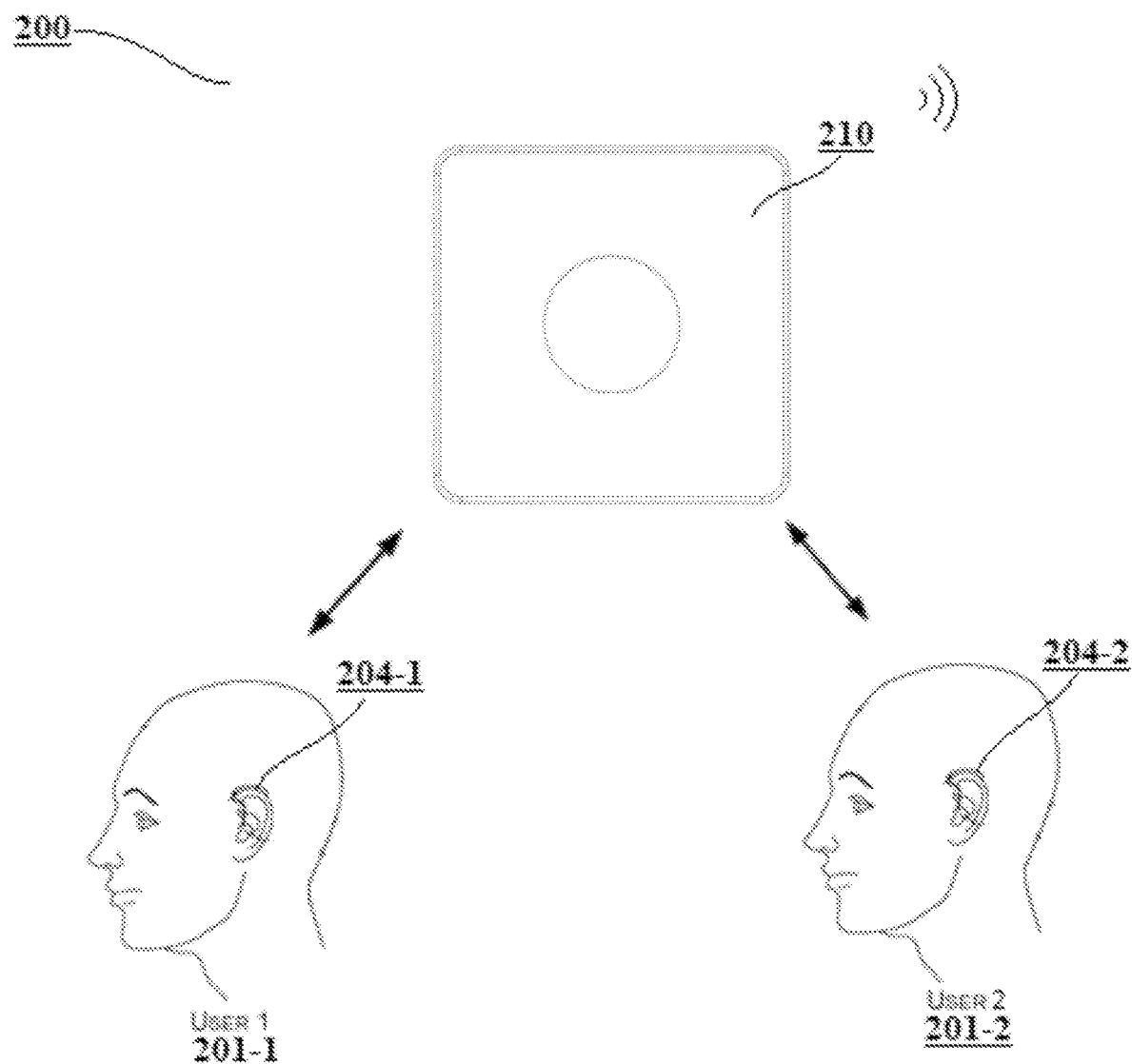
FIG. 2 illustrates another exemplary embodiment of present intercommunication system with a dedicated network hub device that connects the hearing aid devices over a Bluetooth/BLE network.

FIG. 2 depicts one another exemplary embodiment of present Bluetooth enabled intercom system 200. In an aspect, the intercom system 200 may include a Bluetooth enabled dedicated wireless network hub device 210 that creates a Bluetooth network for one or more hearing aid devices 204 to get paired with and communicate over said created Bluetooth network. In an embodiment, the dedicated wireless network hub device uses Bluetooth Low Energy (BLE) or Bluetooth protocol to create a Bluetooth network and to allow multiple Bluetooth enabled hearing aid devices 204 of different users 201 to couple and communicate with each other. In an embodiment, two or more Bluetooth enabled hearing aid devices 204 of present system 200 are communicably coupled with the dedicated mediator network hub device 210 over the Bluetooth network created by the mediator network hub device 210 in a network topology, such as, but not limited to, star topology, bus topology, etc. In a star network topology, the mediator network hub device 210 is a central node and each of the one or more hearing aid devices 204 are peripheral nodes. In an embodiment, the communication from transmitting node or transmitting hearing aid device 204 first reaches to the central node or a mediator network hub device 210 from where is reaches to one or more receiving peripheral nodes or one or more other hearing aid devices 204 connected with the mediator network hub device 210 in a star topology network.

In one aspect, the dedicated wireless network hub device 210 may be a third party domestic smart assistant such as Amazon Echo or Google Assistant that may create a Bluetooth network to allow connection between the hearing aid devices (201-1 and 201-2) of present system 200 with the created Bluetooth network and hence with each other when the users (102-1 and 102-2) are at home or when the system 200 is being used by a domestic partners sharing the same living quarters. In an embodiment, the dedicated wireless network hub device 210 is a compact portable device that allows easy carrying by the users 202 while travelling or while out of the living quarter for any possible reason. In one aspect, the dedicated wireless network hub device 210 is any of, but not limited to, a Wi-Fi router or Wi-Fi card, switch, Hotspot, or any other portable wireless network device.

Figure 3:
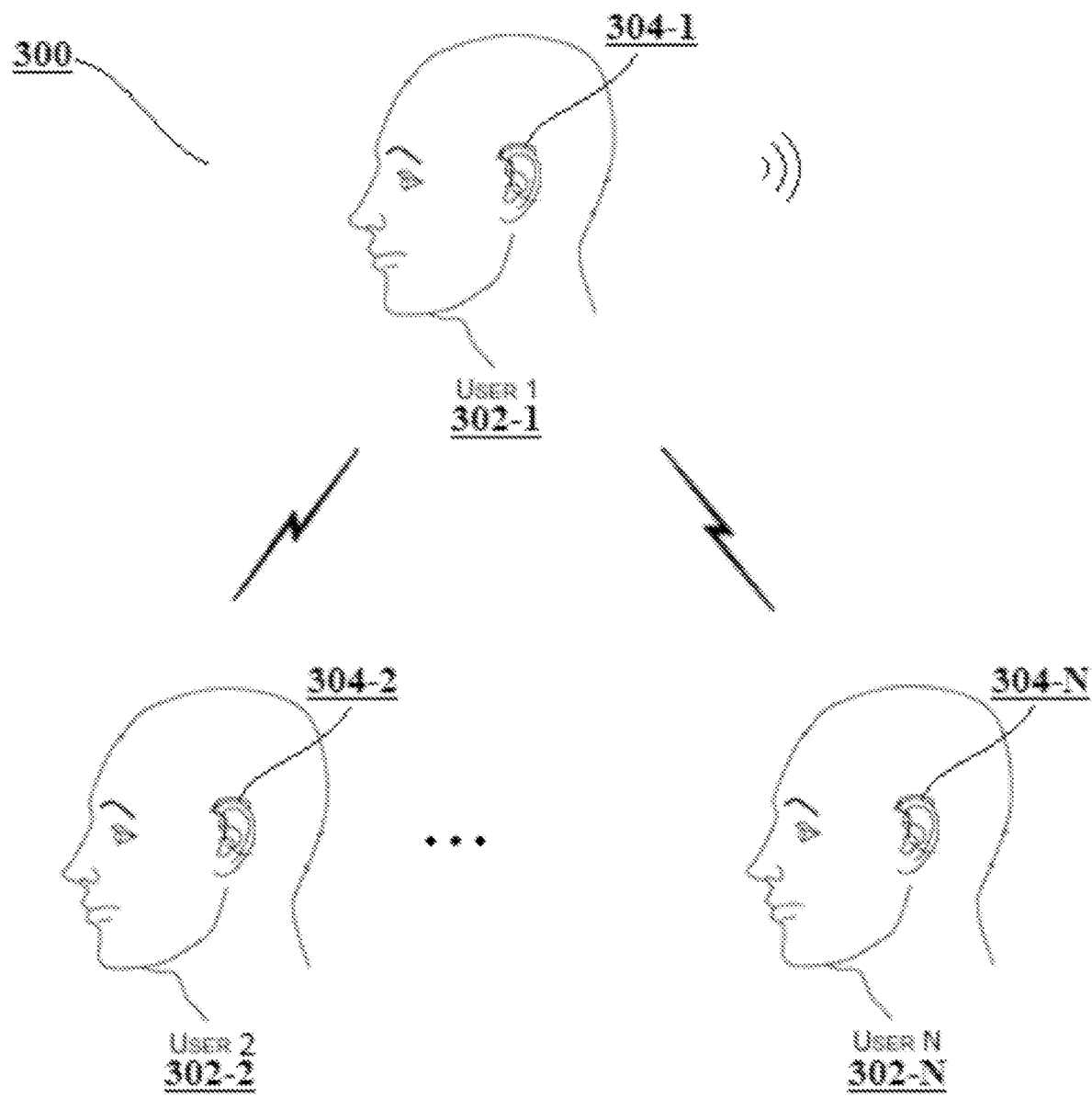
FIG. 3 illustrates one another exemplary embodiment of present intercommunication system where the hearing aid devices are directly connected with each other over a Bluetooth/BLE network eliminating the need of an intermediary hub devices.

FIG. 3 show one another exemplary embodiment of present intercommunication system 300 where the hearing aid devices 304 are directly connected with each other eliminating the need of an intermediary hub devices.

In an aspect, at least one of a plurality of hearing aid device 304 of the system 300 may create a wireless network behaving as a network host device to which other nearby hearing aid devices (304-2 . . . 304-N) of a system 300 present within a specific range around the network host hearing aid device 304-1 which may connect to communicate with the network host hearing aid device 304-1 as well as with each other over a network created by the network host hearing aid device 304-1.

In an aspect, multiple hearing aid devices 304 are connected using Bluetooth modules configured within each of the plurality of hearing aid device 304, where the Bluetooth module may use any of the subprotocol within the Bluetooth standard.

In an embodiment, one of the hearing aid devices 304-1 involved in the communication may create a network using the Bluetooth module working as a network host device thus eliminating need of an intermediate hub device or any other smart user device. In an embodiment, the at least one other hearing aid device (304-2 ... 304-N) may directly connect the network created by the first hearing aid device 304-1 using their respective Bluetooth modules configured within each of the other hearing aid devices (304-2, ..., 304-N). In an embodiment, one hearing aid device 304-1 may communicate and exchange information with Bluetooth module as part of negotiating the output services to be provided. As an example, in communication with Bluetooth module, the hearing aid device 304-1 may inform the information apparatus 100 of the make, model, identification, version, type of input language, type of device driver software, type of services provided, type of components available for data communication, etc. for a selected hearing aid device 304 such as a bone conducting microphone and speaker. As another example, Bluetooth module may send one or more messages to hearing aid device 304 inquiring about what software component or data, if any, the Bluetooth module needs to upload to enable output to a specific type of hearing aid device 304.

The communication between the Bluetooth module and the hearing aid devices 304 is secured using authentication and data encryption. Authentication is used to prevent unwanted access to services, while encryption is used to prevent eavesdropping. Security procedures may be implemented by software, hardware or a combination of both, in various steps and stages of communication between the hearing aid devices 304 or Bluetooth modules and the network 108.

In an embodiment, the method of working of the present intercommunication system 300 where the first hearing aid device 304-1 of the first user 302-1 working as a network host creates a Bluetooth network and facilitates at least one secondary hearing aid device (304-2, ..., 304-N) of at least one second user (302-2, ..., 302-N) present within the Bluetooth network range of the first hearing device 304-1 to pair with the first hearing aid device 304-1 for communication transmission over said created Bluetooth network. The first hearing aid device 304-1 and at least one second hearing aid devices (304-2, ..., 304-N) connected directly with each other forming a mesh network or in mesh topology to enable direct communication between the first hearing aid device 304-1 and at least one second hearing aid devices (304-2, ..., 304-N) or between two or more second hearing aid devices over a BLE mesh network.

Although in various embodiments, the implementation of systems is explained with regards to different network devices, those skilled in the art would appreciate that, the system 300 can fully or partially be implemented using any other possible wireless network device and the method of working of the same can be achieved with minor modifications, without departing from the scope of present disclosure.

Figure 4:
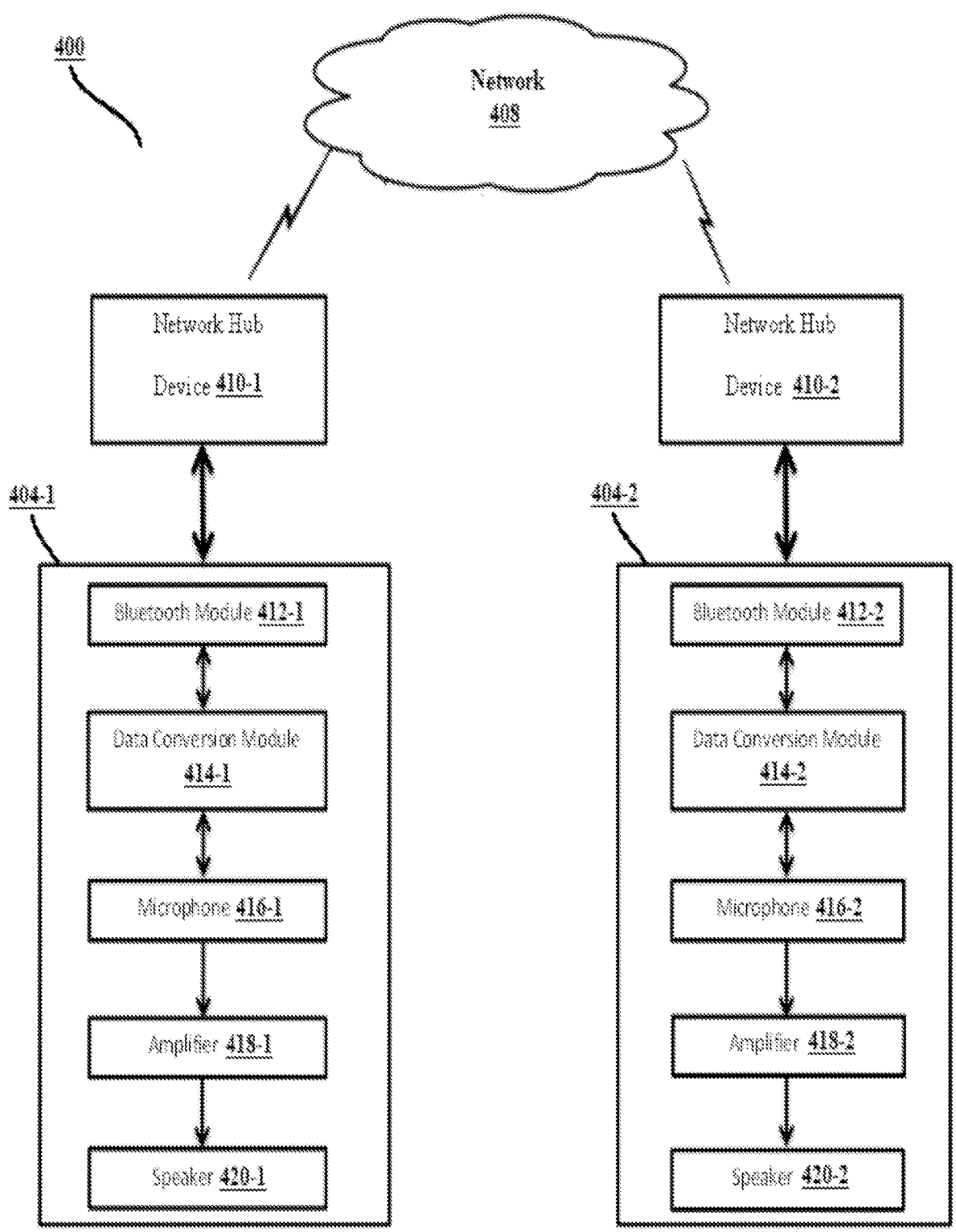
FIG. 4 is a block diagram illustrating data transmission between the components of the hearing aid devices and network to facilitate intercommunication over a Bluetooth or BLE network.

FIG. 4 shows a block diagram of present Bluetooth enabled intercom system 400 illustrating the data transmission between components of the hearing aid device 404 to facilitate wireless communication between the users over the network 408. In an embodiment, the users may have hearing impairments. In an embodiment, the Bluetooth module 412-1 of the first hearing aid device 404-1 pairs with the intermediate network hub device 410-1 that further connects the first hearing aid device 404-1 with the network 408. In an embodiment, the Bluetooth module 412-1 of the first hearing aid device 404-1 may send a pair request to the network hub device 410-1 to connect to the network 408. In an alternate embodiment, the network hub device 410-1 may broadcast a connection request to discover available hearing aid devices 404. The network hub device 410-1 exchanges service information in communication with hearing aid devices 404 associated with the Bluetooth module 412-1 in a service negotiation process. The user may then select one or more available hearing aid devices 404 based on the service information provided such as drivers corresponding to a particular hearing aid device model and make. Using a device-dependent or specific driver, the hearing aid device 404 may process input and output content. Various type of audio codec may be used to encode or decode the audio data to enable audio conferencing such as but not limited to, WebRTC, MP3, MP4, 3GP, RTP, etc. that a speaker or a microphone understands (herein referred to as audio data). For example, the audio data may include a hearing aid device specific input format, encoding, protocols or data that can be understood or used by a particular hearing aid device make and model.

In an embodiment, the hearing aid device 404 is synchronized with network hub device 410. After hearing aid device 404 is paired with the network hub device 410, the network hub device 410 identifies the components (software component, data, information or parameters) necessary to enable output or input, the Bluetooth module 412-1 may coordinate with the network hub device 410 to upload to the Bluetooth module 412-1 the components stored in a memory or storage unit of the network hub device 410. In an embodiment, a software component is stored in the memory unit of the Bluetooth module 412-1 as an installation wizard or a user interface to capture a user's preferences for audio output operation. Examples of user preferences may include, without limitation, type of noise cancellation required, audio input method and audio quality parameters, default volume adjustments, security information, etc. Additional application software may be installed or upgraded to newer versions in order to, for example, provide additional functionalities or bug fixes.

The first microphone 416-1 is configured within the first hearing device 404-1 to capture the audio signals from the first user and send it to the first data conversion module 414-1 which converts the analog sound signals in to the digital signals to transmit it to the second hearing aid device 404-2 over the network 408. In an embodiment, the microphone is a bone conduction microphone that converts sound waves of the first user into electrical signals without an environmental noise which is converted into a digital signal by the first data conversion module 414-1.

In an embodiment, the second hearing aid device 404-2 is coupled with the network 408 using the second Bluetooth module 412-2 configured within it to receive the digital signals transmitted from the first hearing aid device 404-1. The second data conversion module 412-2 configured within the second hearing device 404-2 re-converts the digital signals again into an analog sound signals which is then amplified by the second amplifier 418-2 before emitting into the ear of the second user through the second speaker 420-2. In an embodiment, in return communication transmission, the second hearing aid device 404-2 switches responsibility by behaving as a transmitting hearing aid device to transmit the communication from the second user, on the other end, the first hearing aid device 404-1 behaves as a receiving hearing aid device to receive the communication and emit it into the ear of the first user to allow two side communication using the hearing aid devices 404 of present system 400. In an aspect, the second speaker 420-2 is a bone conduction speaker to that transmits the sound signals in ear of the second user as a vibration signals directly through the skull bones of the second user.

Figure 5:
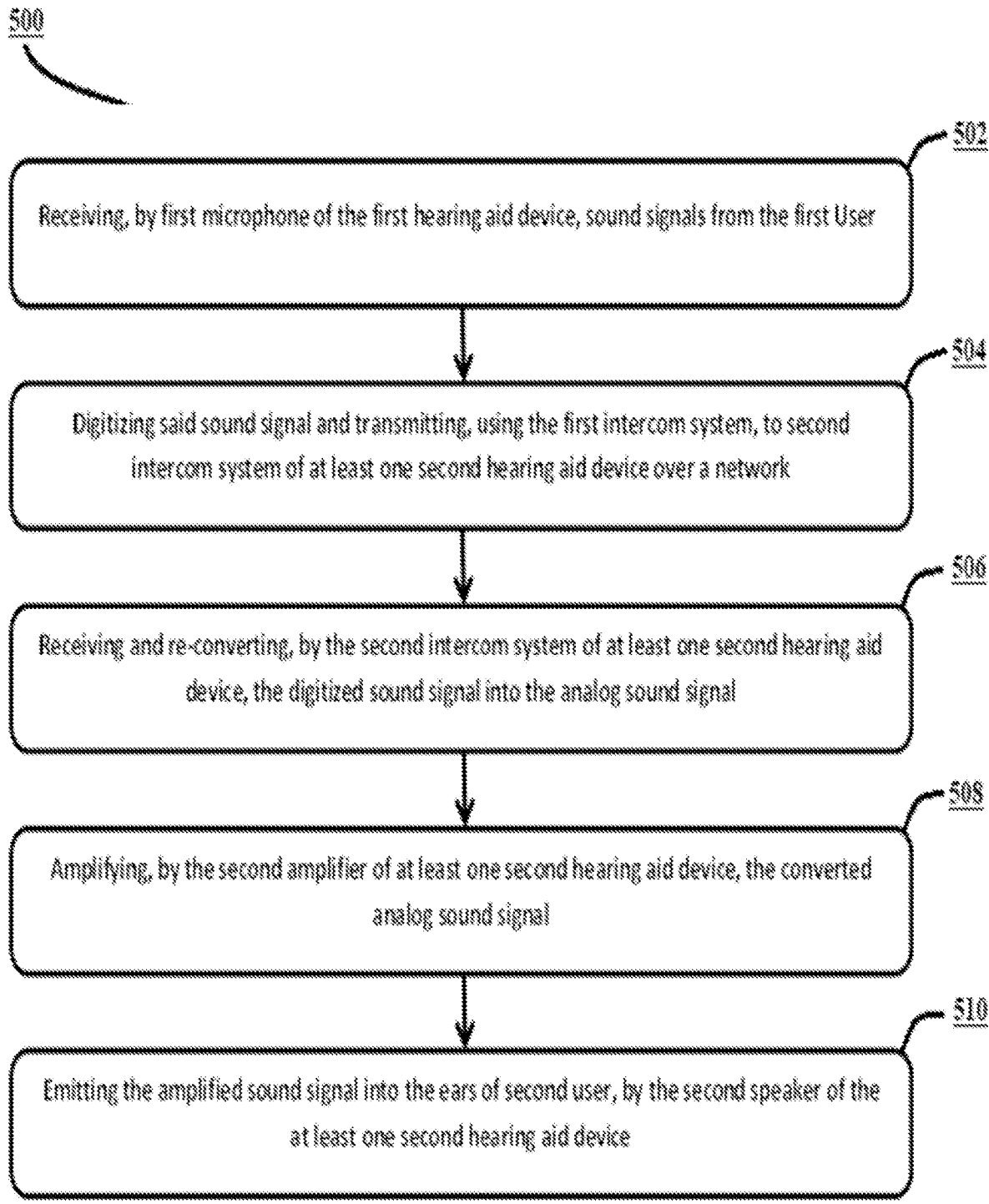
FIG. 5 is a flow diagram illustrating a method of hearing aid facilitation using the intercommunication system in accordance with various embodiments of the present disclosure.

FIG. 5 shows a flow diagram illustrating a method 500 of hearing aid facilitation in accordance with above explained various embodiments of the present disclosure.

In an aspect, the method of working 500 of the present Bluetooth enabled intercom system 100 comprising steps of receiving a voice or sound signal from the first user by the first microphone of the first hearing aid device as step 502; digitizing said received sound signal by the first data conversion module and transmitting said digitized data using the first communication module of the first hearing aid device 504; receiving and re-converting said digitized data again into the analog voice signal, by the second communication module and the second data conversion module of the second hearing aid device respectively at step 506; amplification of said re-converted voice signals 508 to increase its intensity; and emission of said amplified voice signals into the ears of the second user at step 510 allowing the wireless communication between the two users using their worn hearing aid devices.

In an embodiment, the method of working 500, where the first bone conduction microphone configured within the first hearing aid device captures the voice or sound signals of the first user transmitting through his/her bones and provides an output electrical signals which is further converted by the first data conversion module of the first hearing aid device into the digital signals before the transmission over the Bluetooth network. The data conversion module is a combination of both Analog to Digital Converter (ADC) and the Digital to Analog Converter (DAC). In an embodiment, the analog to digital converter (ADC) of the first data conversion module digitizes the analog sound signals of the first user to make it capable of being transmitted to at least one second hearing aid device of the second user using the Bluetooth module.

In an embodiment, the first hearing aid device and at least one second hearing aid device is communicatively coupled with the network using their respective Bluetooth modules, directly or through any other network hub device. In an embodiment, the first Bluetooth module of the first hearing aid device 104-1 works as a network host to communicatively couple with at least one second hearing aid device directly. In one another embodiment, the first hearing aid device and at least one second hearing aid device is coupled to the network through the intermediate network device. The intermediate network device can be any of, but not limited to, a smartphone, a laptop, wearable smart device, dedicated network hub device, personal smart assistant or any other portable network device that may pair the hearing aid devices with the network.

In an embodiment, the first hearing aid device transmits the digitized sound signal to the at least one second hearing aid device communicatively coupled with the first hearing aid device over the network. Once received the digitized sound data from the first hearing aid device, the second data conversion module present within the second hearing aid device re-converts said digitized sound data again into the analog sound signal. In an aspect, the second data conversion module is a digital to analog converter (DAC) which converts the digital sound signals to analog sound or voice signals.

It is noted that the hearing aids may communicate using analog communications.

In an embodiment, the re-converted voice signals are then amplified by the second amplifier present within the at least one second hearing device. The amplified sound is then poured out by the second speaker configured within the second hearing aid device into the ears of the second user.

Figure 6:
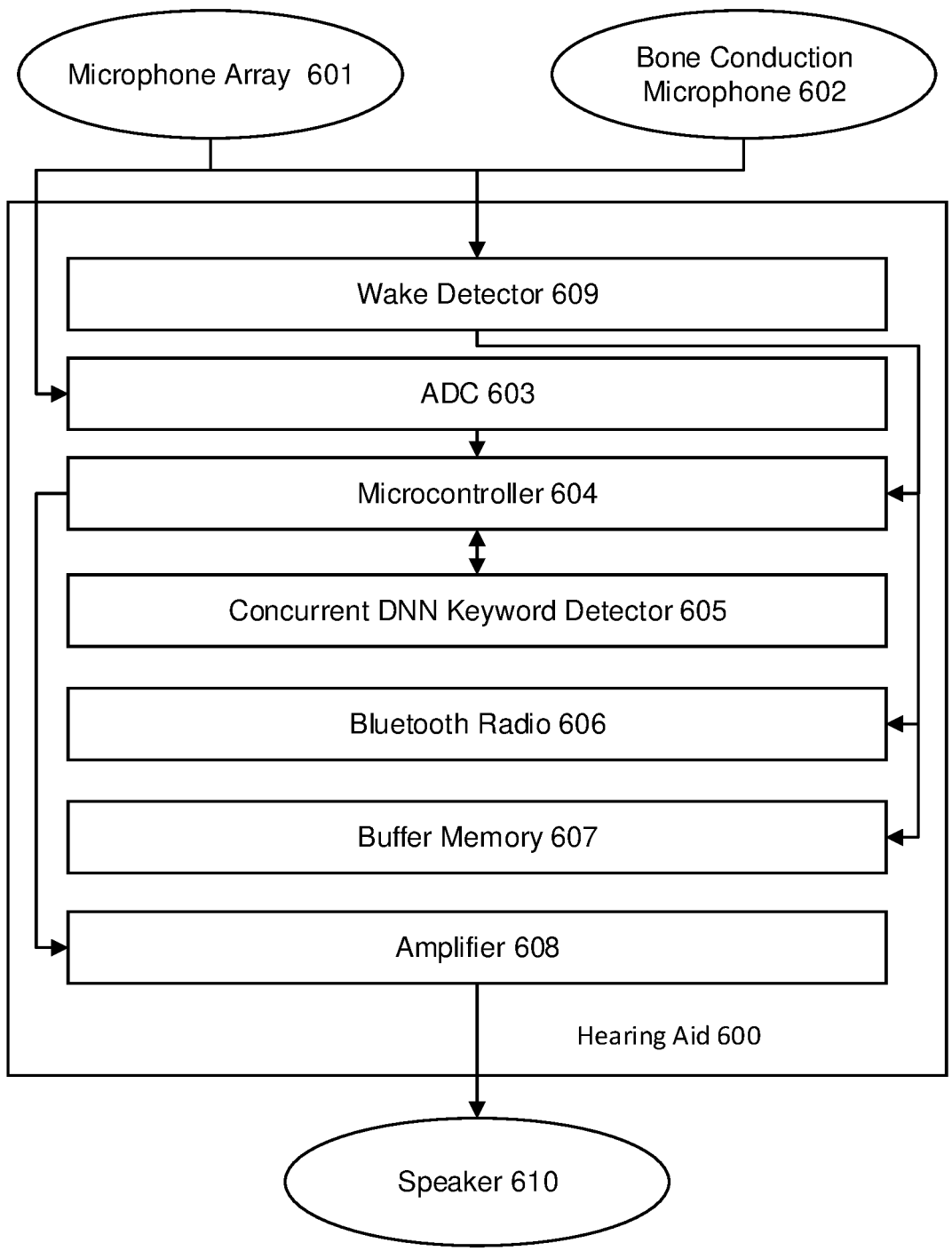
FIG. 6 is a schematic drawing illustrating an embodiment of the invention providing a Bluetooth addressable intercom.

FIG. 6 shows a schematic diagram of a hearing aid 600 with a Bluetooth radio 606 for implementing a wireless intercom and voice control using a concurrent DNN keyword detector 605. Each hearing aid 600 provides a microphone array 601 to assist in sound localization, for noise reduction and improved signal to noise ratio. A microcontroller 604 controls the system, and provides echo suppression, and assistance in pairing assisted communications. A bone conduction microphone 602 is also provided. The signals from the microphone array 601 and the bone conduction microphone 602 are digitized with a multichannel analog to digital converter 603. The microcontroller 604 stores the received sounds in a buffer memory 607. A Bluetooth radio 606 transceiver is provided, which is persistently paired with another Bluetooth transceiver of a hearing aid inserted into the wearer's other ear. Therefore, the system of a pair of hearing aids provides two arrays of microphones, which can be used to map a sound field around the wearer. The digitized audio from the microphone arrays is then processed by a digital signal processor (software implemented within the microcontroller 604 or discreet) in the respective hearing aid 600, which performs the typical hearing aid functions of frequency equalization and noise suppression, and the sounds amplified with amplifier 608 and fed to a miniature speaker 610. In some cases, the digital processing is performed by one of the hearing aids, while the other processor essentially controls its associated Bluetooth transceiver, to achieve power savings and coordination between the pair of hearing aids. To equalize battery drain, the processing responsibility may periodically shift between right and left channels. On the other hand, the two processors may distribute portions of the processing load as part of a parallel processing system.

Typically, a bone conduction microphone 602 does not require an array configuration (and is treated as a scalar unitary signal), and therefore the system may process a single signal, and ignore one signal from the other hearing aid. It is preferable to have common hardware between the hearing aids in a pair, both for uniformity, and to ensure operation if only one hearing aid is used, or if the battery of one hearing aid is exhausted.

The system preferably has a wake detector 609 to detect speech from the wearer (and ignore other speech or noises), to which then powers up the microcontroller 604, which may otherwise remain asleep. The microcontroller 604 filters the speech, and passes the filtered speech to a keyword spotting processor comprising a concurrent deep neural network keyword detector 605, wherein the keyword spotting provides for detection of a plurality of different keywords, which upon detection, trigger specific actions or code module execution, in the manner of a vectored interrupt. Further, the system is preferably adaptive, to both speaker (wearer) characteristics, and to new keywords, though the adaptivity may be achieved through a server or tethered device and need not be implemented on the host processor of the hearing aid.

Another feature that may be included is speech translation and/or reiteration. That is, when the far field microphone array of the hearing aid system hears sounds, in most cases, these are amplified and then reproduced with noise reduction and equalization through the speaker. However, according to one embodiment, the sounds are intercepted, and for example, passed to a speech-to-phoneme or speech-to-text converter, though the intermediate state need not be a discrete result. The phonemes, text or other intermediate are then optionally translated into a different language or dialect, and a speech synthesizer then recreates the speech, in a different language, dialect, and/or pronunciation. For example, persons with hearing disability may gave garbled speech which is difficult for others to understand. However, using an intelligent algorithm the content of the speech may be extracted, and that content reiterated to the user with a more comprehensible voice or pronunciation. Because of the need for a large dictionary and processing, the translation and comprehension process may be offloaded to a paired cellphone, dedicated or shared on-premises processor, or cloud processing resource.

Similarly, where the external processing resource is available, after waking, the hearing aid may communicate the keyword to the remote processor for keyword spotting or speech recognition. Typically, the speech will precede the waking and linking to the external processing resource, so the audio signal(s) are buffered locally, and transmitted as data packets (as opposed to a real-time audio stream) to the external processing resource.

A typical usage of the system is to facilitate one-to-one communications or group conversations between people who may each have hearing impairments, and are wearing compatible hearing aid devices. However, not all participants in the conversation need to be so-equipped. (Of course, remote intercom would be limited or unavailable, depending on available resources.) When the conversation is between two people, the system preferably blocks out all external noises, and may center each speaker in the other's soundfield. On the other hand, the system may detect orientation, and accurately spatialize the soundfield so that head movements naturally change hearing. Likewise, in a group chat, each speaker may be distinguished within the soundfield by synthetic location, to isolate sources, or the speakers may be accurately localized based on their physical relationships and head position. The system may automatically determine the mode, or hybridize different modes, based on a speech understanding model, or a spoken keyword/key phrase such as "please repeat?", indicative of poor comprehension, and an implicit request for more intelligible content.

The communication is initiated, for example, by a spoken request. The system may also be operable by a smartphone virtual interface, another remote control (e.g., Bluetooth), control buttons on the hearing aids, or the like. However, for the targeted population and usage, consistently available "zero touch" speech control is preferred. The commands, while nominally not natural language speech, are contextually natural language, and therefore the learning curve will be short, and accidental control an unusual occurrence. In order to further reduce incidence of unintentional control, a consciousness detector may be provided, to avoid sleep or delirium from permitting activation. Further, the keyword spotting is preferably limited to isolated keywords or keyphrases, so that names and words in conversation to not unnecessarily alter system operation.

The system may include a fall detector, such as an accelerometer or shock sensor, and may further include one or more photoplethysmographic (PPG) sensors to detect blood oxygenation, blood glucose, carbon monoxide, pH, lactic acid, or certain other blood chemistry. An electromyographic sensor or electroencephalographic sensor may also provide brain activity readings. When the hearing aid is inserted in the ear canal, it is possible to pick up EEG signals locally, which may provide sensitive detection of transient ischemic attacks (TIA) or stroke based on asymmetric changes in brainwave pattern. These sensors readings are typically not communicated between the wearer of the hearing aid and a conversant, though in the case of caregivers, this information may be useful and communicated either as data to an app on a smartphone, to a remote server, or verbally communicated.

When clinical or clinically-relevant data is available, the device or a linked device may analyze the data and determine emergency conditions, personalized medicine parameters (such as pharmaceutical dose or timing), maintain a clinical record of readings, etc. Since the hearing aids are typically provided in pairs, each hearing aid may have a set of sensors, providing a basis for sensing asymmetry. For example, in case of a stroke, various parameters may acutely become asymmetric, which can be sensed in real time, perhaps before symptoms are recognized. The asymmetries may be detected within the pair of hearing aids, or in a linked device such as a smartphone.

According to one embodiment, a switched voice channel communication scheme is implemented. A plurality of people in an environment, and preferably all people in the environment, have communication devices configured as hearing aids. Each person is identified by a unique identifier, such as a name, nickname, number, or the like. The hearing aids are connected either directly or indirectly to a switching endpoint, which manages authentication, channel assignment, switching, conferencing, etc. The switching endpoint may be a server executing Asterisk, e.g., Asterisk 20.0.1 www.asterisk.org. Each link is encrypted and authenticated with the switching endpoint. One person moves in proximity to another person, and begins talking. The switch identifies both people, their relative proximity, and the initiation of voice communication, and automatically creates a radio frequency voice channel between the two. Because the people are in proximity, the channel as established is a direct peer-to-peer communication channel, and the speech does not need to pass through the switching endpoint, which might consume more power. To cease the communication, one participant may utter a keyword and command, such as "Xiamazen Disconnect" ("Xiamazen" being a nonsense word with uncommon phonemes). In another example, a person seeks to communicate with another person not in physical proximity. The person utters "Xiamazen call Robert". The wake word "Xiamazen" causes the system to wake, and pass the subsequent arguments to a command processor. The word "call" is interpreted as a command to establish a communication channel. Tge word "Robert" is an argument of the command "call", and causes a lookup in an address book, and reading of the contact properties, which is, for example, a MAC or other radio address for the hearing aid of a person identified as "Robert". The switching endpoint then opens a communication channel with Robert, and requests authorization to establish the channel. Robert may accept or decline the communication, such as by saying "OK" or "No". If the communication is authorized, the communication is then established through the switching endpoint between the caller and Robert. The call passes through the endpoint in this case because the two people are not near each other. In a further example, a group conversation is sought to be established, between a diverse group both in proximity to the caller and distant. In this case, the caller identifies the group by individual or predetermined group characteristics, such as location, role, etc. The switching server determines the endpoint identities of all targets, and sends an invitation to each targeted person. In this case, the invitation is not in the form of a communication channel, but rather digital data that defines an interaction with the targeted person. The targeted person may refuse the communication, accept, or elect other options. If the person accepts, the switching endpoint determines the best type of communication channel: local infrastructure, cellular infrastructure, VOIP, peer-to-peer, multihop ad hoc network, etc. In some cases, a local group peer-to-peer communication is established, which may be encrypted using a group encryption key, which may be distributed by the switching endpoint in the initial invitation or subsequently.

When personal, private or sensitive data is communicated, it may be sent as an encrypted communication. Typically, a Bluetooth or BLE link is encrypted. However, when communicating over a network, various stages may decrypt and reencrypt the data. This therefore requires a trusted intermediary. However, by encrypting the contents of the communication separate from the communication protocol, the intermediary need not be trusted. Further, cryptolopes and transcryption technologies exist (proxy key cryptography, atomic key cryptography) that allow intermediated communications that avoid required trust in the intermediaries. Similarly, data sent to a repository may be encrypted at rest and in transit.

When establishing a communication channel between peers, a key exchange protocol, such as a Diffie Helman or the like, may be used to ensure a private communication between endpoints. In a multihop network, the packet header may be unencrypted, while its contents encrypted. In a group communication, A technology similar to IEEE-802.11i may be employed. en.wikipedia.org/wiki/IEEE_802.11i-2004. Note that Bluetooth does not typically support WiFi standard group communication security technologies.

IEEE 802.11 supports multicast and broadcast messages. One example in which multicast. In an infrastructure network (that is, a network using an access point), multicasts are only sent from the access point to the mobile devices. Mobile devices are typically not allowed to send broadcasts directly; however, they can initiate a broadcast by sending the message to the access point, which then broadcasts it on the station's behalf (to both the wireless devices and any attached wired LAN).

Pairwise keys cannot be used for broadcasts. Each mobile device has a different set of pairwise keys so it would be necessary to send multiple copies of the broadcast, each encrypted differently. Therefore, a separate key hierarchy is maintained specifically for use in encrypting multicasts. This is called the group key hierarchy. Unlike pairwise keys, all the mobile devices and the access point share a single set of group keys. This allows all the stations to decrypt a multicast message sent from the access point. While this solves a problem, it also creates one: how to handle the case in which a mobile station leaves the network. If a mobile device chooses to leave the Wi-Fi LAN, it should notify the access point by sending an IEEE 802.11 disassociate message. When it does this, the access point erases the copy of the pairwise keys for the departing mobile device and stops sending it messages. If the device wants to rejoin later, it must go through the whole key establishment phase from scratch. In the case of the group key, even though the device has left the network, it can still receive and decrypt the multicasts that are sent because it still has a valid group key available. This is not acceptable from a security standpoint; if a device leaves the network, it should no longer be allowed any access at all.

The solution to this problem is to change the group key upon each new session and also when a device leaves the network. Negotiating the pairwise keys is complicated because it starts with no secure connection in place and incurs the risk of attacks from simple snooping to message forgery. Group keys may be deferred until each participant is authenticated and has a pairwise key, and then the secure link used to send the group key value. This provides a significant simplification and means that the actual group key values can be sent directly to each station without concern about interception or modification. Group key distribution is done using EAPOL-Key messages, as for pairwise key. However, only two messages are needed, not four.

The access point (or designated master) performs the following steps during group key distribution: Create a 256-bit group master key (GMK). Derive the 256-bit group transient key (GTK) from which the group temporal keys are obtained; After each pairwise secure connection is established: Send GTK to mobile device with current sequence number; and Check for acknowledgment of receipt. Because it is necessary to update the group key from time to time, a method is needed to perform the update without causing a break in the service. This would be a problem if the mobile device could store only a single group key because it takes time to go round each device and give them all the new key value. Multiple keys may be stored in the mobile device, allowing for sequenced rekeying. Each transmitted frame carries a 2-bit field called KeyID that specifies which key should be used for decryption. Pairwise keys are sent with a KeyID value of 0. But the other three key storage slots may be used for group key updates.

Suppose that the current group keys are installed into KeyID 1. When we want to update, the authenticator sends the new key with instructions to put it at KeyID 2. During this key update phase, multicasts are still sent using KeyID 1 until all the attached stations have been informed of the new key. Finally, the authenticator switches over and all the multicasts from then on (until the next key change) are sent with KeyID 2.

In the case of pairwise keys, the PMK is produced by the upper-layer authentication method (or by using preshared keys). This process doesn't apply for the group keys because the key is not generated per device. However, because the object of the group keys is only to protect messages and not provide authentication, there is no need to tie the key into the identity of any specific device. The access point (or master node) allocates a GMK simply by choosing a 256-bit cryptographic-quality random number. Once the GMK is selected, it is necessary to derive the group temporal keys. Two keys are required: Group Encryption key (128 bits); and Group Integrity key (128 bits). The combination of these two keys forms a 256-bit value, the GTK. This is the value that is sent by the access point to each attached station. The GTK is derived from the GMK by combining with a nonce value and the MAC address of the access point. Given that the GMK is completely random to start with, this is arguably an unnecessary step but it does provide consistency with the pairwise key case.

If a security server is implemented, the authentication phase is completed using an upper-layer authentication. If successful, this both authenticates the supplicant and authorizes it to join the network. If using a preshared key, authentication is assumed and subsequently verified during the four-way key handshake. Given that the peer-to-peer authentication for encrypted group communications is not fully standardized, it is not necessary to comply with IEEE-802 family protocols.

Once authorized, the mobile device and access point perform a four-way handshake to generate temporal keys and prove mutual knowledge of the PMK. Finally the access point computes and distributes group keys. Only after all these phases have completed is user data finally allowed to flow between the authenticator and the supplicant. At last, the communications link is open for business and all the keys are available to implement the encryption and protection needed.

IEEE 802.11i provides a Robust Security Network (RSN) with a four-way handshake and a group key handshake. These utilize the authentication services and port access control described in IEEE 802.1X to establish and change the appropriate cryptographic keys. The RSN is a security network that only allows the creation of robust security network associations (RSNAs), which are a type of association used by a pair of stations (STAs) if the procedure to establish authentication or association between them includes the 4-Way Handshake. Two RSNA data confidentiality and integrity protocols are provided, TKIP and CCMP.

The initial authentication process is carried out either using a pre-shared key (PSK), or following an EAP exchange through 802.1X (known as EAPOL, which requires the presence of an authentication server, though a lightweight server may be implemented within the network). This process ensures that the client station (STA) is authenticated with the access point (AP). Note that the protocol may be modified to permit decentralized and/or infrastructureless communication modes. After the PSK or 802.1X authentication, a shared secret key is generated, called the Pairwise Master Key (PMK). In PSK authentication, the PMK is actually the PSK, which may be derived from another key such as a WiFi password by putting it through a key derivation function that uses SHA-1 as the cryptographic hash function. If an 802.1X EAP exchange was carried out, the PMK is derived from the EAP parameters provided by the authentication server.

The four-way handshake is designed so that the access point (or authenticator) and wireless client (or supplicant) can independently prove to each other that they know the PSK/PMK, without ever disclosing the key. Instead of disclosing the key, the access point (AP) and client encrypt messages to each other—that can only be decrypted by using the PMK that they already share—and if decryption of the messages was successful, this proves knowledge of the PMK. This same scheme may be employed to provide secure peer-to-peer communications between ad hoc nodes, with one node taking the place of the access point. SSL style security may also be employed.

The PMK is designed to last the entire session and should be exposed as little as possible; therefore, keys to encrypt the traffic need to be derived. A four-way handshake is used to establish another key called the Pairwise Transient Key (PTK). The PTK is generated by concatenating the following attributes: PMK, AP nonce (ANonce), STA nonce (SNonce), AP MAC address, and STA MAC address. The product is then put through a pseudo-random function. The handshake also yields the GTK (Group Temporal Key), used to decrypt multicast and broadcast traffic.

The actual messages exchanged during the handshake are depicted in the figure and explained below (all messages are sent as EAPOL-Key frames): The AP sends a nonce-value (ANonce) to the STA together with a Key Replay Counter, which is a number that is used to match each pair of messages sent, and discard replayed messages. The STA now has all the attributes to construct the PTK. The STA sends its own nonce-value (SNonce) to the AP together with a Message Integrity Code (MIC), including authentication, which is really a Message Authentication and Integrity Code (MAIC), and the Key Replay Counter which will be the same as Message 1, to allow AP to match the right Message 1. The AP verifies Message 2, by checking MIC, RSN, ANonce and Key Replay Counter Field, and if valid constructs and sends the GTK with another MIC. The STA verifies Message 3, by checking MIC and Key Replay Counter Field, and if valid sends a confirmation to the AP.

The Pairwise Transient Key (64 bytes) is divided into five separate keys: 16 bytes of EAPOL-Key Confirmation Key (KCK)—Used to compute MIC on WPA EAPOL Key message. 16 bytes of EAPOL-Key Encryption Key (KEK)—AP uses this key to encrypt additional data sent (in the 'Key Data' field) to the client (for example, the RSN IE or the GTK). 16 bytes of Temporal Key (TK)—Used to encrypt/decrypt Unicast data packets. 8 bytes of Michael MIC Authenticator Tx Key-Used to compute MIC on unicast data packets transmitted by the AP. 8 bytes of Michael MIC Authenticator Rx Key-Used to compute MIC on unicast data packets transmitted by the station The Group Temporal Key (32 bytes) is divided into three separate keys: 16 bytes of Group Temporal Encryption Key-used to encrypt/decrypt Multicast and Broadcast data packets. 8 bytes of Michael MIC Authenticator Tx Key-used to compute MIC on Multicast and Broadcast packets transmitted by AP. 8 bytes of Michael MIC Authenticator Rx Key-currently unused as stations do not send multicast traffic. The Michael MIC Authenticator Tx/Rx Keys in both the PTK and GTK are only used if the network is using TKIP to encrypt the data.

The Group Temporal Key (GTK) used in the network may need to be updated due to the expiration of a preset timer. When a device leaves the network, the GTK also needs to be updated. This is to prevent the device from receiving any more multicast or broadcast messages from the AP. To handle the updating, 802.11i defines a Group Key Handshake that consists of a two-way handshake: The AP sends the new GTK to each STA in the network. The GTK is encrypted using the KEK assigned to that STA, and protects the data from tampering, by use of a MIC. The STA acknowledges the new GTK and replies to the AP.

CCMP is based on the Counter with CBC-MAC (CCM) mode of the AES encryption algorithm. CCM combines CTR for confidentiality and CBC-MAC for authentication and integrity. CCM protects the integrity of both the MPDU Data field and selected portions of the IEEE 802.11 MPDU header.

RSNA defines two key hierarchies: Pairwise key hierarchy, to protect unicast traffic; and GTK, a hierarchy consisting of a single key to protect multicast and broadcast traffic. The description of the key hierarchies uses the following two functions: L (Str, F, L)—From Str starting from the left, extract bits F through F+L−1. PRF-n-Pseudorandom function producing n bits of output, there are the 128, 192, 256, 384 and 512 versions, each of these output these number of bits. The pairwise key hierarchy utilizes PRF-384 or PRF-512 to derive session-specific keys from a PMK, generating a PTK, which gets partitioned into a KCK and a KEK plus all the temporal keys used by the MAC to protect unicast communication.

The GTK is be a random number which also gets generated by using PRF-n, usually PRF-128 or PRF-256, in this model, the group key hierarchy takes a GMK (Group Master Key) and generates a GTK.

"The Protected Frame field is 1 bit in length. The Protected Frame field is set to 1 if the Frame Body field contains information that has been processed by a cryptographic encapsulation algorithm. The Protected Frame field is set to 1 only within data frames of type Data and within management frames of type Management, subtype Authentication. The Protected Frame field is set to 0 in all other frames.

When the bit Protected Frame field is set to 1 in a data frame, the Frame Body field is protected utilizing the cryptographic encapsulation algorithm and expanded as defined in Clause 8. Only WEP is allowed as the cryptographic encapsulation algorithm for management frames of subtype Authentication."

IEEE 802.11i-2004: Amendment 6: Medium Access Control (MAC) Security Enhancements (PDF), IEEE Standards, 2004 Jul. 23.

"IEEE 802.11-2007: Wireless LAN Medium Access Control (MAC) and Physical Layer (PHY) specifications". IEEE. 2007 Mar. 8.

"The Evolution of 802.11 Wireless Security" (PDF). ITFFROC. 2010 Apr. 18.

See, U.S. Patent App. and Pat. Nos. 20020073202; 20030085997; 20040246960; 20050099960; 20050108391; 20050153624; 20070171851; 20070250718; 20080002578; 20080006615; 20080037785; 20080126801; 20080140577; 20080159294; 20080280559; 20090074006; 20090077444; 20090109916; 20090150982; 20090182997; 20090196304; 20090207819; 20090216970; 20090265737; 20090276841; 20090310582; 20090325575; 20100067462; 20100080152; 20100093364; 20100119069; 20100138671; 20100220643; 20100234022; 20100267386; 20100278221; 20100281267; 20100293293; 20110039589; 20110069630; 20110090879; 20110103253; 20110231555; 20110289311; 20120009939; 20120009949; 20120009950; 20120127890; 20120129550; 20120129551; 20120163222; 20120224474; 20130010686; 20130011215; 20130061263; 20130086378; 20130148551; 20130156188; 20130275752; 20130324155; 20140059347; 20140098960; 20140115321; 20140115322; 20140139608; 20140143369; 20140211943; 20140228049; 20140273958; 20140314232; 20140324447; 20140328279; 20140379991; 20150092667; 20150188949; 20150200840; 20150207846; 20150222648; 20150237519; 20150264626; 20150264627; 20150358167; 20150381588; 20160019279; 20160098198; 20160099872; 20160110403; 20160167164; 20160204917; 20160239653; 20160239657; 20160239658; 20160241531; 20160241532; 20160357791; 20170199818; 20170228559; 20170255769; 20170295226; 20180004743; 20180014241; 20180089419; 20180123802; 20180139481; 20180152299; 20180152300; 20180152426; 20180165781; 20180173906; 20180176017; 20180181964; 20180262485; 20180268062; 20180316676; 20180337860; 20190007059; 20190020712; 20190146917; 20190235933; 20190253261; 20190306124; 20200026741; 20200119921; 20210019143; 20210144015; 20210182422; 20210218714; 20210248090; 20210286618; 20210319192; 20220044233; 20220045997; 20220114578; 20220116214; 20220207053; 20220270088; 20220303251; U.S. Pat. Nos. 6,157,618; 6,779,111; 6,813,248; 6,859,533; 6,937,726; 7,181,017; 7,286,665; 7,356,688; 7,379,427; 7,411,956; 7,412,519; 7,542,429; 7,706,750; 7,809,008; 7,817,634; 7,869,591; 7,970,004; 8,001,387; 8,036,191; 8,190,156; 8,244,275; 8,296,801; 8,307,395; 8,319,145; 8,386,799; 8,452,974; 8,457,022; 8,539,225; 8,548,492; 8,554,200; 8,554,255; 8,566,247; 8,631,217; 8,671,273; 8,730,828; 8,730,932; 8,731,457; 8,787,250; 8,787,942; 8,788,802; 8,805,400; 8,826,337; 8,830,946; 8,850,017; 8,873,754; 8,902,815; 8,904,181; 8,948,084; 8,977,240; 9,004,836; 9,071,498; 9,088,929; 9,167,427; 9,173,058; 9,231,757; 9,252,942; 9,320,024; 9,363,670; 9,401,787; 9,419,951; 9,454,312; 9,473,471; 9,485,170; 9,514,211; 9,519,591; 9,529,531; 9,538,495; 9,548,861; 9,641,340; 9,648,496; 9,690,949; 9,729,311; 9,756,549; 9,785,764; 9,825,924; 9,832,674; 9,852,285; 9,858,408; 9,928,264; 9,961,609; 9,973,488; 10,015,720; 10,063,479; 10,067,960; 10,075,518; 10,169,625; 10,210,321; 10,216,629; 10,268,634; 10,298,986; 10,305,693; 10,325,090; 10,339,339; 10,521,623; 10,523,445; 10,594,484; 10,599,485; 10,600,088; 10,602,424; 10,685,003; 10,692,085; 10,713,453; 10,764,263; 10,771,262; 10,853,592; 10,951,421; 10,965,653; 11,023,228; 11,042,719; 11,080,252; 11,089,094; 11,101,819; 11,170,062; 11,184,157; 11,210,220; 11,245,681; 11,284,255; 11,356,423; 11,488,152; and 11,531,628; and foreign Patent Nos. AT-320122; AU-2009249382; AU-2009294519; AU-2011228873; AU-2012203280; AU-2014281290; BE-362836; BR-0115536; BR-0115564; BR-0115567; BR-0115568; BR-PI0901637; CA-2372554; CA-2737664; CA-2793340; CA-2913589; CN-101051901; CN-101385274; CN-101478425; CN-102111269; CN-102160449; CN-102369629; CN-102404121; CN-102663116; CN-102804187; CN-102915336; CN-103297428; CN-103905189; CN-104079412; CN-104342753; CN-104737154; CN-104737166; CN-104739859; CN-104752201; CN-104866608; CN-104936307; CN-105247760; CN-105763566; CN-106550157; CN-106575297; CN-106663019; CN-106796598; CN-107077495; CN-107527805; CN-107635018; CN-107667364; CN-108388632; CN-108390876; CN-108810004; CN-109120616; CN-109547193; CN-109560926; CN-109687978; CN-110012126; CN-110035067; CN-110086599; CN-110098926; CN-110099043; CN-110134599; CN-110182024; CN-110190945; CN-110213245; CN-110247761; CN-110740116; CN-110851859; CN-110868707; CN-110881015; CN-110892691; CN-110933026; CN-111143327; CN-111342976; CN-111447060; CN-111447103; CN-111447276; CN-111586000; CN-111695095; CN-111698083; CN-111712809; CN-111901302; CN-111934885; CN-111967040; CN-112002385; CN-112102060; CN-112163232; CN-112199351; CN-112272174; CN-112311746; CN-112364376; CN-112436936; CN-112532580; CN-112579706; CN-112685763; CN-112733096; CN-112906059; CN-112912912; CN-112926958; CN-113014378; CN-113077054; CN-113079024; CN-113225302; CN-113297258; CN-113316765; CN-113316798; CN-113343244; CN-113344222; CN-113346996; CN-113434905; CN-113435891; CN-113574519; CN-113589904; CN-113595971; CN-113612750; CN-113706997; CN-113763385; CN-113765861; CN-113849861; CN-113868715; CN-113938286; CN-114051208; CN-114065261; CN-114095171; CN-114117496; CN-114219433; CN-114329502; CN-114329618; CN-114356945; CN-114385644; CN-114422189; CN-114448623; CN-114490840; CN-114640466; CN-114745189; CN-114758796; CN-114785500; CN-115202952; CN-115330161; CN-115361109; CN-115378908; CN-115396179; CN-115412259; CN-1863046; CN-87100555; CZ-20014650; DE-10118899; DE-102004009289; DE-102021130243; DE-60026439-D1; DE-60026439; DE-60027119; DE-60028645; DE-60033668; EP-0553360; EP-1043864; EP-1111838; EP-1113617; EP-1130843; EP-1187476; EP-1414184; EP-1699162; EP-1726178; EP-2016702; EP-2161872; EP-2206392; EP-2218206; EP-2249283; EP-2269361; EP-2277330; EP-2281406; EP-2281408; EP-2342858; EP-2430563; EP-2462461; EP-2547920; EP-2622881; EP-2629448; EP-2680528; EP-2689333; EP-2704352; EP-2704352-A4; EP-2892177; EP-2897340; EP-2947840; EP-2955900; EP-3011480; EP-3021292; EP-3170106; EP-3207471; EP-3257221; EP-3257222; EP-3257223; EP-3295388; EP-3304298; EP-3328023; EP-3328024;

EP-3328025; EP-3398073; EP-3410630; EP-3579524; EP-3754939; EP-3883177; EP-3908923; EP-3909003; EP-3968194; ES-2259592-T3; ES-2261135-T3; ES-2353888-T3; ES-2392601-T3; ES-2878574-T3; ES-2926930-T3; GB-2443227; GB-2478841; GB-2529256; HU-9602334-D0; HU-T69300; HU-T74735; IN-2008MN00681; IN-2010CN07998; IN-2010DN02925; IN-2010DN03829; IN-2010DN08109; IN-2011DN02888; IN-2012DN00494; IN-2012DN00495; IN-201817005495; IN-201941007221; IN-263374; IN-293770; IN-335018; JP-2001156920; JP-2001202010; JP-2001209306; JP-2001292397; JP-2001292414; JP-2001297569; JP-2001298638; JP-2001298682; JP-2001298683; JP-2001298692; JP-2001298696; JP-2001298697; JP-2001298698; JP-2001298699; JP-2001298700; JP-2001298701; JP-2001309058; JP-2001506547; JP-2002032175; JP-2002123726; JP-2002271567; JP-2002279049; JP-2002287632; JP-2002300145; JP-2003015808; JP-2003108527; JP-2003152695; JP-2003186609; JP-2003187097; JP-2004038304; JP-2004280820; JP-2004280821; JP-2006279367; JP-2006512806; JP-2007074341; JP-2007102797; JP-2008176040; JP-2008288837; JP-2009510978; JP-2010045744; JP-2010113181; JP-2010278482; JP-2011041080; JP-2011055309; JP-2011090384; JP-2011147047; JP-2011250399; JP-2011509539; JP-2012503393; JP-2013026954; JP-2013077900; JP-2013152362; JP-2014238888; JP-2014507032; JP-2014511535; JP-2014511587; JP-2014520444; JP-2014524204; JP-2014533445; JP-2016524250; JP-2017507392; JP-2018117340; JP-2019149727; JP-2020533403; JP-2022146998; JP-2022151535; JP-3651721; JP-3667800; JP-3745682; JP-3796649; JP-3808297; JP-3864249; JP-3934735; JP-4010766; JP-4084582; JP-4240757; JP-4330014; JP-4407011; JP-4412823; JP-4433559; JP-4433566; JP-4499699; JP-4814339; JP-5255065; JP-5286223; JP-5298394; JP-5308530; JP-5333613; JP-5446453; JP-5471150; JP-5494603; JP-5571259; JP-5799635; JP-5801482; JP-5878630; JP-5944927; JP-5979141; JP-6066927; JP-6115573; JP-6194886; JP-6408568; JP-6526684; JP-6962629; JP-6979527; JP-7109909; JP-H06176039; JP-H0711786; JP-H0749736; JP-H0769852; JP-H08204806; JP-H09244976; JP-H09325931; JP-H09507106; JP-H10135945; JP-H10285154; JP-H10511200; JP-H1185382; JP-WO2008146395; JP-WO2011027189; JP-WO2012169153; JP-WO2014010202; JP-WO2014083784; KR-100470071; KR-100942992; KR-101032016; KR-101046907; KR-101063354; KR-101260348; KR-101574871; KR-101612772; KR-101862722; KR-101940512; KR-101966767; KR-101994146; KR-101994636; KR-102030053; KR-102088848; KR-102240926; KR-102277967; KR-20040056485; KR-20080048764; KR-20080065633; KR-20090003705; KR-20100126856; KR-20110007209; KR-20110012085; KR-20110029773; KR-20110060952; KR-20110070633; KR-20140033086; KR-20140094002; KR-20150051568; KR-20150084628; KR-20150091713; KR-20160022608; KR-20160023871; KR-20160084114; KR-20180036093; KR-20180131056; KR-20190028088; KR-20200032412; KR-20220033195; KR-20220041377; KR-20220064567; KR-840000303; RU-1810542-C; RU-2373648; RU-2437238; RU-2440688; RU-2448436; RU-2779379-C1; SU-1070701; SU-1344536; SU-1705994; SU-665385; TW-200533145; TW-200729891; TW-200831583; TW-200926667; TW-201122159; TW-201202267; TW-201346408; TW-201429969; TW-201506653; TW-201532420; TW-201931827; TW-202145039; TW-202206925; TW-202247154; TW-I240533; TW-1261591; TW-1321939; TW-1477864; TW-1510939; TW-I767709; WO-2000043796; WO-2000069114; WO-2001078385; WO-2004085622; WO-2005084058; WO-2007121034; WO-2007134082; WO-2007147361; WO-2008008771; WO-2008054375; WO-2008070844; WO-2008155623; WO-2008155624; WO-2009034542; WO-2009034554; WO-2009037622; WO-2009053943; WO-2009057081; WO-2009133420; WO-2009133421; WO-2009134571; WO-2009140625; WO-2009141686; WO-2009142963; WO-2009146383; WO-2010031873; WO-2010038211; WO-2010107590; WO-2010121127; WO-2010132719; WO-2011016804; WO-2011016805; WO-2011016806; WO-2011019356; WO-2011019357; WO-2011027189; WO-2011045723; WO-2011114097; WO-2012050968; WO-2012169153; WO-2013078874; WO-2013083770; WO-2013091348; WO-2013097457; WO-2013152543; WO-2013152812; WO-2013155751; WO-2013155752; WO-2013158798; WO-2013163861; WO-2014010202; WO-2014034018; WO-2014083784; WO-2014088130; WO-2014150662; WO-2014205298; WO-2015027814; WO-2015035861; WO-2015101533; WO-2015103338; WO-2015105401; WO-2015105402; WO-2015126960; WO-2015139026; WO-2016014368; WO-2016064575; WO-2016128567; WO-2016128568; WO-2016128569; WO-2016193156; WO-2016196855; WO-2017139652; WO-2018028359; WO-2019092046; WO-2019152146; WO-2020146602; WO-2020146605; WO-2021014320; WO-2021154157; WO-2021258071; WO-2022081921; WO-2022161269; WO-2022202284; WO-2022244325; and ZA-202207567.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software.

As used herein in this document, the terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

I claim:

1. A hearing aid, comprising:
an input port configured to receive a signal representing sounds;
an output port configured to output an electrical signal representing acoustic waves;
a wireless transceiver, configured to bidirectionally communicate digital audio signals;
a memory, configured to store wireless transceiver addresses; and
a digital processor configured to:
receive a digital audio signal from the wireless transceiver;
define the electrical signal based on the signal representing sounds from the input port, the communicated digital audio signals, and an audio equalization profile; and
implement a speech controlled user interface, configured to access the memory, select a counterparty wireless transceiver for communication through the wireless transceiver from a plurality of counterparty wireless transceivers based on a spoken command and at least one wireless transceiver address stored in the memory.

2. The hearing aid according to claim 1, further comprising a housing, wherein the wireless transceiver, digital processor and a self-contained power source are contained within the housing.

3. The hearing aid according to claim 2, further comprising a microphone configured to produce the signal representing sounds, and a speaker configured to generate the acoustic waves, the microphone and the speaker each being contained within the housing, wherein the housing is an intraaural housing, and the microphone comprises a bone conduction microphone.

4. The hearing aid according to claim 1, further comprising at least one motion sensor selected from the group consisting of an accelerometer, a gyroscope, an absolute position sensor, and a relative position sensor, wherein the digital processor is further configured to select the counterparty dependent on a signal from the at least one motion sensor.

5. The hearing aid according to claim 1, wherein the wireless transceiver comprises at least one of a Bluetooth transceiver and a Bluetooth Low Energy transceiver configured to implement a mesh network.

6. The hearing aid according to claim 1, wherein the digital processor is further configured to perform keyword spotting from among a plurality of predetermined keywords.

7. The hearing aid according to claim 1, wherein the digital processor is further configured to perform keyword spotting using a convolutional neural network.

8. The hearing aid according to claim 1, wherein the spoken command comprises a human name, and the digital processor is further configured to look up an address stored in the memory corresponding to the human name.

9. The hearing aid according to claim 1, further comprising at least one mediator network hub device communicatively coupled with the wireless transceiver, configured to facilitate communications between the wireless transceiver and a respective wireless transceiver of another hearing aid.

10. The hearing aid according to claim 9, wherein the at least one mediator network hub device is communicatively coupled with a Bluetooth or a Bluetooth Low Energy network interface;
further comprising a plurality of Bluetooth enabled hearing aid devices, each comprising a digital processor, a memory, a Bluetooth or Bluetooth Low Energy transceiver, a microphone, a data conversion module, an amplifier and a speaker.

11. The hearing aid according to claim 10, wherein the hearing aid is communicatively coupled to at least one other hearing aid through the Bluetooth or Bluetooth Low Energy network interface.

12. The hearing aid according to claim 1, wherein the wireless transceiver is configured to communicate directly with a respective wireless transceiver of another hearing aid according to a Bluetooth mesh network protocol.

13. The hearing aid according to claim 1, further comprising a bone conduction microphone configured to generate the signal representing sounds.

14. The hearing aid of claim 1, wherein the hearing aid is directly communicatively coupled to at least two other hearing aids through a Bluetooth mesh network.

15. A method of intercommunication using a hearing aid according to claim 1, wherein the wireless transceiver comprises a Bluetooth or Bluetooth Low Energy transceiver, comprising:
receiving and converting into the electrical signal, by a microphone of the hearing aid; the acoustic waves to be transmitted from a first user to at least one second hearing aid of at least one second user;
converting, using a first data conversion module of the hearing aid, the electrical signal into the digital audio signals;
transmitting, by the Bluetooth or Bluetooth Low Energy transceiver, the digital audio signals to the at least one second Bluetooth hearing aid;
receiving, by the at least one second hearing aid, the digital audio signals transmitted by the hearing aid;
re-converting the received digital audio signals into an analog signal corresponding to the acoustic waves;
amplifying, by an amplifier of the at least one second hearing aid device, the re-converted received digital audio signals; and
emitting, by a speaker of the at least one second hearing aid, the amplified re-converted received digital audio signals into an ear of the at least one second user.

16. A hearing aid, comprising:
a microphone configured to receive acoustic waves and to generate therefrom an electrical signal representing the acoustic waves;
a speaker responsive to an output signal configured to produce audible sounds;
a Bluetooth or Bluetooth Low Energy wireless transceiver, configured to communicate information representing the electrical signal and to receive digital audio signals representing the audible sounds;
a memory, configured to store identifiers and associated addresses of other Bluetooth or Bluetooth Low Energy wireless transceivers; and
a digital processor configured to:
receive the digital audio signal from the Bluetooth or Bluetooth Low Energy wireless transceiver;
define the output signal based on the electrical signal, the digital audio signals, a noise cancellation process, and an audio equalization profile;

detect a speech command in the electrical signal to define an identifier of another Bluetooth or Bluetooth Low Energy wireless transceiver;

access the memory to determine the address corresponding to the identifier;

initiate a communication with the other Bluetooth or Bluetooth Low Energy wireless transceiver according to the address;

detect a speech command to terminate the communication; and terminate the communication.

17. The hearing aid of claim 16, wherein the communication with the other Bluetooth or Bluetooth Low Energy wireless transceiver according to the address is a communication through a Bluetooth mesh network.

18. The hearing aid of claim 16, wherein the communication with the other Bluetooth or Bluetooth Low Energy wireless transceiver according to the address is conducted through at least one mediator network hub device in a star network.

19. The hearing aid of claim 16, wherein the digital processor is further configured to receive a request from another Bluetooth or Bluetooth Low Energy wireless transceiver, and in response thereto, open a communication with the other Bluetooth or Bluetooth Low Energy wireless transceiver.

20. The hearing aid according to claim 16, wherein the digital processor is further configured to update the identifiers and associated addresses of other Bluetooth or Bluetooth Low Energy wireless transceivers stored in the memory.

\* \* \* \* \*